US012353687B2

(12) United States Patent
Heikkinen et al.

(10) Patent No.: US 12,353,687 B2
(45) Date of Patent: *Jul. 8, 2025

(54) CONTENT COLLECTIONS LINKED TO A BASE ITEM

(71) Applicant: Snap Inc., Santa Monica, CA (US)

(72) Inventors: Christie Marie Heikkinen, Sherman Oaks, CA (US); David Phillip Taitz, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,820

(22) Filed: Apr. 25, 2024

(65) Prior Publication Data
US 2024/0272776 A1 Aug. 15, 2024

Related U.S. Application Data

(63) Continuation of application No. 18/147,405, filed on Dec. 28, 2022, now Pat. No. 12,001,658.
(Continued)

(51) Int. Cl.
G06F 3/0484 (2022.01)
G06F 3/0482 (2013.01)
(Continued)

(52) U.S. Cl.
CPC .......... *G06F 3/0484* (2013.01); *G06F 3/0482* (2013.01); *G06F 3/04842* (2013.01);
(Continued)

(58) Field of Classification Search
CPC ....... H04L 9/321; H04L 51/046; H04L 51/52; H04L 63/0884; H04L 63/102;
(Continued)

(56) References Cited

U.S. PATENT DOCUMENTS 9,230,355 B1   1/2016  Ahuja et al.
10,127,290 B1  11/2018 Armstrong et al.
(Continued)

FOREIGN PATENT DOCUMENTS

CN   118647972 A   9/2024
CN   119256327 A   1/2025
(Continued)

OTHER PUBLICATIONS

"U.S. Appl. No. 18/089,702, Non Final Office Action mailed May 8, 2024", 12 pgs.
(Continued)

*Primary Examiner* — Benjamin M Thieu
(74) *Attorney, Agent, or Firm* — SCHWEGMAN LUNDBERG & WOESSNER, P.A.

(57) ABSTRACT

Systems and methods to facilitate content sharing are described. A second device of a second user selects a first user input content item that was shared to a first content collection by a first user using a first device. The second device is enabled to combine the first user input content item with a second user input content item to create a combined user input content item. In response to determining that the second device has shared the combined user input content item to the first content collection, the combined user input content item becomes accessible in association with the first user input content item in a second content collection. In response to a third device of a third user making a selection associated with the first user input content item, a collection interface is presented to enable the third device to navigate the second content collection.

20 Claims, 41 Drawing Sheets

Related U.S. Application Data

(60) Provisional application No. 63/369,363, filed on Jul. 25, 2022, provisional application No. 63/353,818, filed on Jun. 20, 2022, provisional application No. 63/365,648, filed on Jun. 1, 2022, provisional application No. 63/365,167, filed on May 23, 2022.

(51) Int. Cl.

| | | |
|---|---|---|
| *G06F 3/04842* | (2022.01) | |
| *G06F 3/04845* | (2022.01) | |
| *G06F 3/04847* | (2022.01) | |
| *G06F 9/451* | (2018.01) | |
| *G06T 19/00* | (2011.01) | |
| *G11B 27/036* | (2006.01) | |
| *G11B 27/10* | (2006.01) | |
| *G11B 27/34* | (2006.01) | |
| *H04L 9/32* | (2006.01) | |
| *H04L 9/40* | (2022.01) | |
| *H04L 51/046* | (2022.01) | |
| *H04L 51/52* | (2022.01) | |
| *H04L 65/61* | (2022.01) | |
| *H04N 5/265* | (2006.01) | |
| *H04N 23/611* | (2023.01) | |
| *H04N 23/62* | (2023.01) | |
| *H04N 23/63* | (2023.01) | |

(52) U.S. Cl.
CPC ...... *G06F 3/04845* (2013.01); *G06F 3/04847* (2013.01); *G06F 9/453* (2018.02); *G06T 19/006* (2013.01); *G11B 27/036* (2013.01); *G11B 27/102* (2013.01); *G11B 27/34* (2013.01); *H04L 9/321* (2013.01); *H04L 51/046* (2013.01); *H04L 51/52* (2022.05); *H04L 63/0884* (2013.01); *H04L 63/102* (2013.01); *H04L 65/61* (2022.05); *H04N 5/265* (2013.01); *H04N 23/611* (2023.01); *H04N 23/62* (2023.01); *H04N 23/632* (2023.01)

(58) Field of Classification Search
CPC ..... H04L 65/61; H04L 2209/60; H04L 51/10; G06F 3/0484; G06F 3/0482; G06F 3/04842; G06F 3/04845; G06F 3/04847; G06F 9/453; G06F 1/1686; G06F 2203/04803; G06F 9/451; G11B 27/036; G11B 27/102; G11B 27/34; G06T 19/006; H04N 5/265; H04N 23/611; H04N 23/62; H04N 23/632
See application file for complete search history.

(56) References Cited

U.S. PATENT DOCUMENTS

| | | | |
|---|---|---|---|
| 11,070,717 | B2 | 7/2021 | Cragg et al. |
| 11,119,628 | B1 | 9/2021 | Allen et al. |
| 2004/0217947 | A1 | 11/2004 | Fitzmaurice et al. |
| 2016/0196584 | A1 | 7/2016 | Franklin et al. |
| 2018/0027268 | A1* | 1/2018 | Cheng .............. G06F 16/00 375/240.26 |
| 2018/0048831 | A1* | 2/2018 | Berwick ............ G11B 27/031 |
| 2018/0182149 | A1 | 6/2018 | Chong et al. |
| 2018/0336931 | A1 | 11/2018 | Tandon et al. |
| 2018/0349008 | A1 | 12/2018 | Manzari et al. |
| 2019/0095436 | A1 | 3/2019 | Martinazzi et al. |
| 2019/0102364 | A1* | 4/2019 | Rochiramani ........ G06F 40/166 |
| 2019/0187880 | A1 | 6/2019 | Dalonzo |
| 2019/0313146 | A1 | 10/2019 | Kakuschke et al. |
| 2021/0073179 | A1* | 3/2021 | Berman ............. G06F 16/1873 |
| 2021/0103379 | A1 | 4/2021 | Adachi |
| 2021/0209239 | A1* | 7/2021 | Robinson ............ G06F 21/6209 |
| 2021/0299630 | A1* | 9/2021 | Kozhemiak ............. C25B 15/00 |
| 2021/0367914 | A1* | 11/2021 | Collins ................ G06F 16/489 |
| 2021/0383460 | A1 | 12/2021 | Sartori Odizzio et al. |
| 2022/0038402 | A1* | 2/2022 | Yang ..................... G06N 3/08 |
| 2022/0046078 | A1* | 2/2022 | Andreou ............ G06F 16/4393 |
| 2022/0130427 | A1 | 4/2022 | Allibhai et al. |
| 2023/0367464 | A1 | 11/2023 | Ji et al. |
| 2023/0376186 | A1 | 11/2023 | Boda et al. |

FOREIGN PATENT DOCUMENTS

| | | |
|---|---|---|
| CN | 119256328 A | 1/2025 |
| CN | 119318154 A | 1/2025 |
| WO | WO-2020186969 A1 | 9/2020 |

OTHER PUBLICATIONS

"U.S. Appl. No. 18/089,702, Notice of Allowance mailed Aug. 30, 2024", 5 pgs.
"U.S. Appl. No. 18/089,702, Response filed Aug. 2, 2024 to Non Final Office Action mailed May 8, 2024", 10 pgs.
"U.S. Appl. No. 18/089,702, Supplemental Notice of Allowability mailed Sep. 12, 2024", 3 pgs.
"U.S. Appl. No. 18/089,702, Supplemental Notice of Allowability mailed Dec. 5, 2024", 3 pgs.
"U.S. Appl. No. 18/089,721, Corrected Notice of Allowability mailed Jan. 2, 2025", 3 pgs.
"U.S. Appl. No. 18/089,721, Notice of Allowance mailed Sep. 18, 2024", 10 pgs.
"U.S. Appl. No. 18/089,745, Corrected Notice of Allowability mailed Jan. 21, 2025", 3 pgs.
"U.S. Appl. No. 18/089,745, Corrected Notice of Allowability mailed Dec. 2, 2024", 3 pgs.
"U.S. Appl. No. 18/089,745, Examiner Interview Summary mailed Aug. 19, 2024", 2 pgs.
"U.S. Appl. No. 18/089,745, Non Final Office Action mailed May 22, 2024", 16 pgs.
"U.S. Appl. No. 18/089,745, Notice of Allowance mailed Sep. 9, 2024", 10 pgs.
"U.S. Appl. No. 18/089,745, Response filed Aug. 21, 2024 to Non Final Office Action mailed May 22, 2024", 12 pgs.
"U.S. Appl. No. 18/089,874, Examiner Interview Summary mailed Jan. 29, 2025", 2 pgs.
"U.S. Appl. No. 18/089,874, Non Final Office Action mailed Oct. 23, 2024", 18 pgs.
"U.S. Appl. No. 18/089,874, Response filed Jan. 23, 2025 to Non Final Office Action mailed Oct. 23, 2024", 15 pgs.
"U.S. Appl. No. 18/147,102, Non Final Office Action mailed Dec. 19, 2024", 6 pgs.
"U.S. Appl. No. 18/147,405, Notice of Allowance mailed Jan. 29, 2024", 12 pgs.
"International Application Serial No. PCT/US2022/082542, International Preliminary Report on Patentability mailed Jul. 11, 2024", 7 pgs.
"International Application Serial No. PCT/US2023/022559, International Preliminary Report on Patentability mailed Dec. 5, 2024", 6 pgs.
"International Application Serial No. PCT/US2023/022574, International Preliminary Report on Patentability mailed Dec. 5, 2024", 7 pgs.
"International Application Serial No. PCT/US2023/022730, International Preliminary Report on Patentability mailed Dec. 5, 2024", 5 pgs.
"International Application Serial No. PCT/US2023/067162, International Preliminary Report on Patentability mailed Dec. 5, 2024", 7 pgs.
"International Application Serial No. PCT/US2023/067164, International Preliminary Report on Patentability mailed Dec. 5, 2024", 7 pgs.
"International Application Serial No. PCT/US2023/067170, International Preliminary Report on Patentability mailed Dec. 5, 2024", 6 pgs.

(56) References Cited

OTHER PUBLICATIONS

U.S. Appl. No. 18/089,874, filed Dec. 28, 2022, Combining Third-Party Content With User Content.
U.S. Appl. No. 18/089,721 U.S. Pat. No. 12,216,889, filed Dec. 28, 2022, Creating Augmented Content Items.
U.S. Appl. No. 18/984,594, filed Dec. 17, 2024, Automatic Camera Function Triggering for Content Augmentation.
U.S. Appl. No. 18/089,745, filed Dec. 28, 2022, Combining Content in a Preview State.
U.S. Appl. No. 18/089,702, filed Dec. 28, 2022, Creating Time-Based Combination Videos.
U.S. Appl. No. 18/147,102, filed Dec. 28, 2022, Unlocking Sharing Destinations in an Interaction System.
U.S. Appl. No. 18/147,405 U.S. Pat. No. 12,001,658, filed Dec. 28, 2022, Content Collections Linked to a Base Item.
U.S. Appl. No. 18/725,071, filed Jun. 27, 2024, Combining Content Items in a Shared Content Collection.

\* cited by examiner

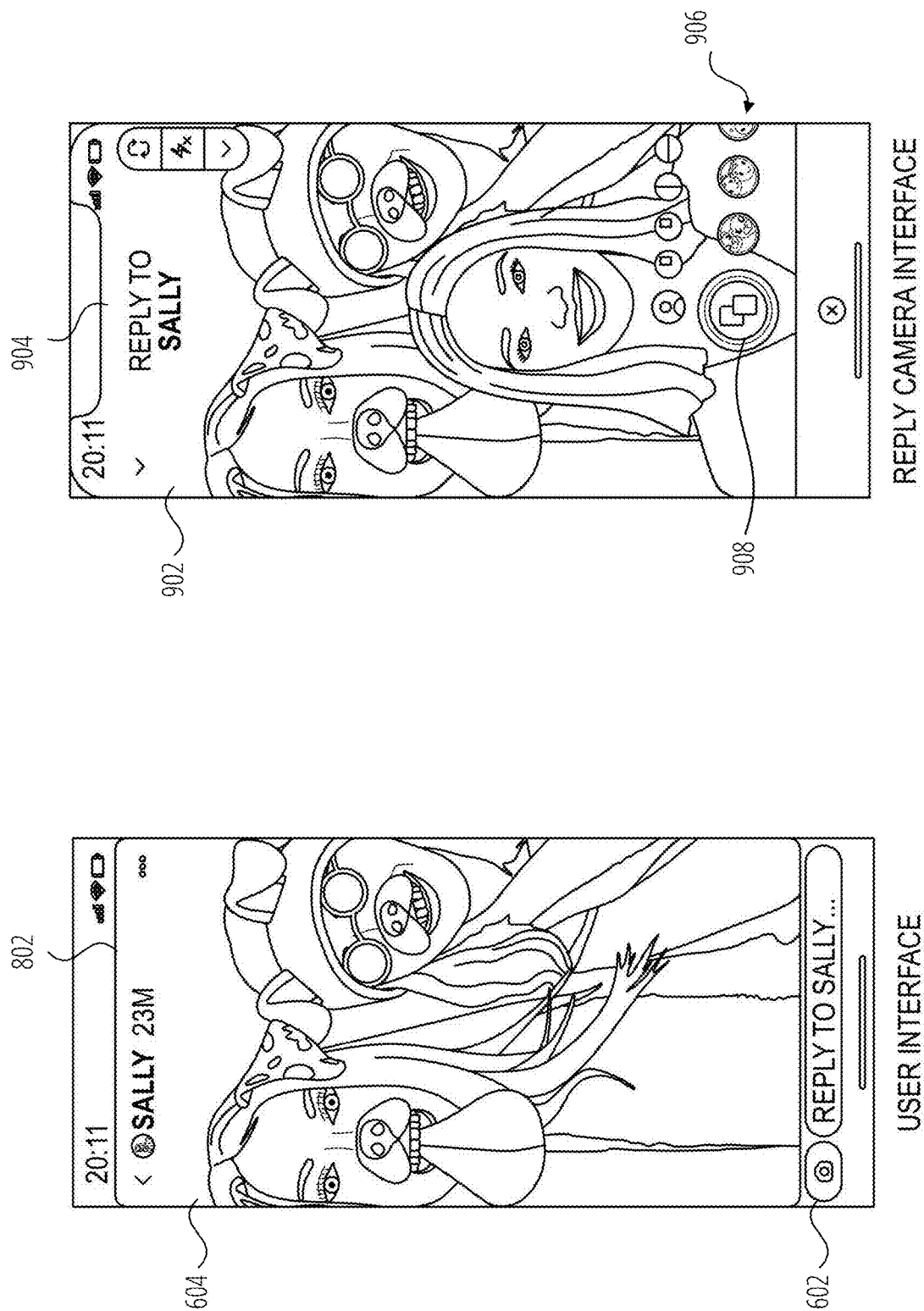

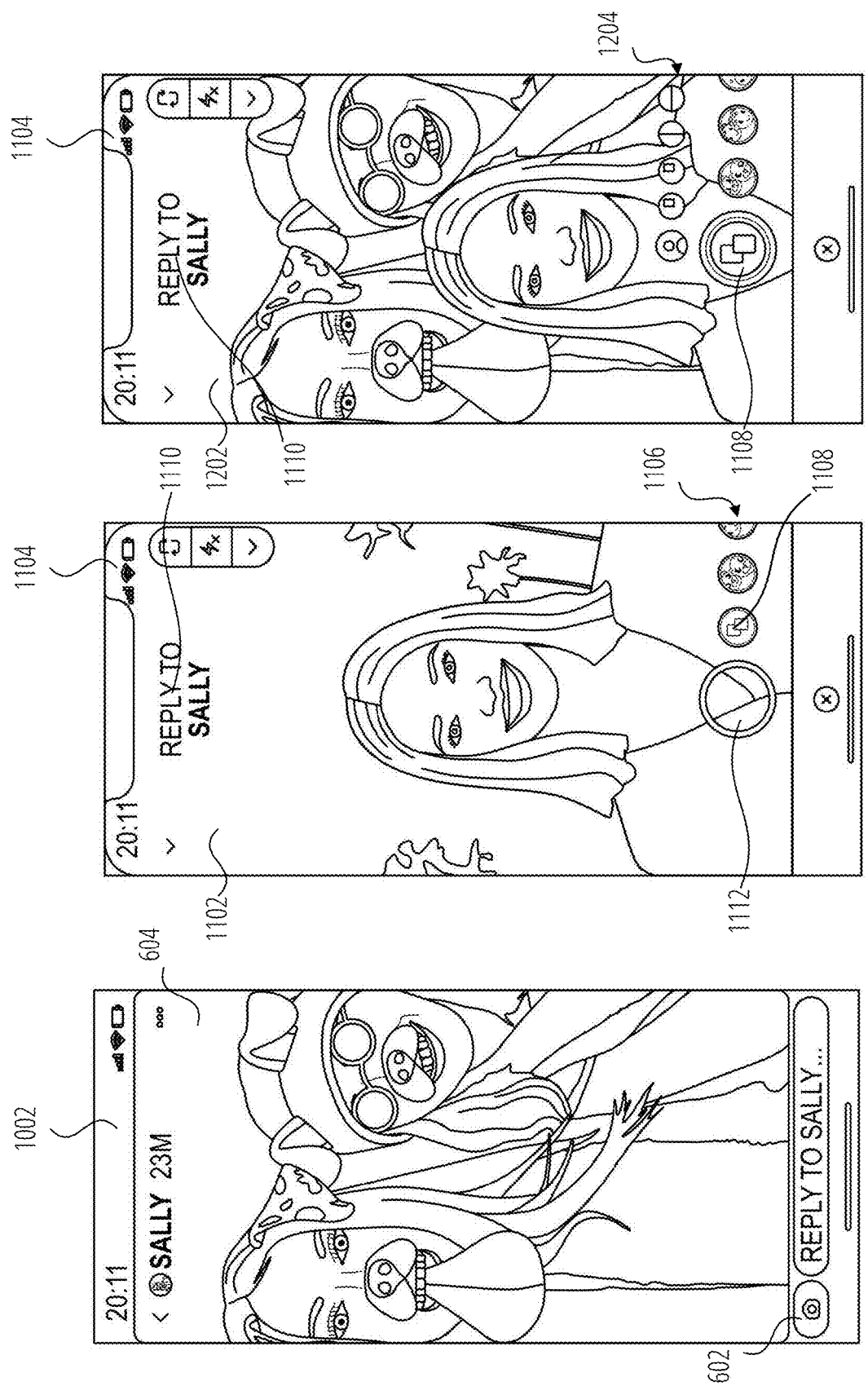

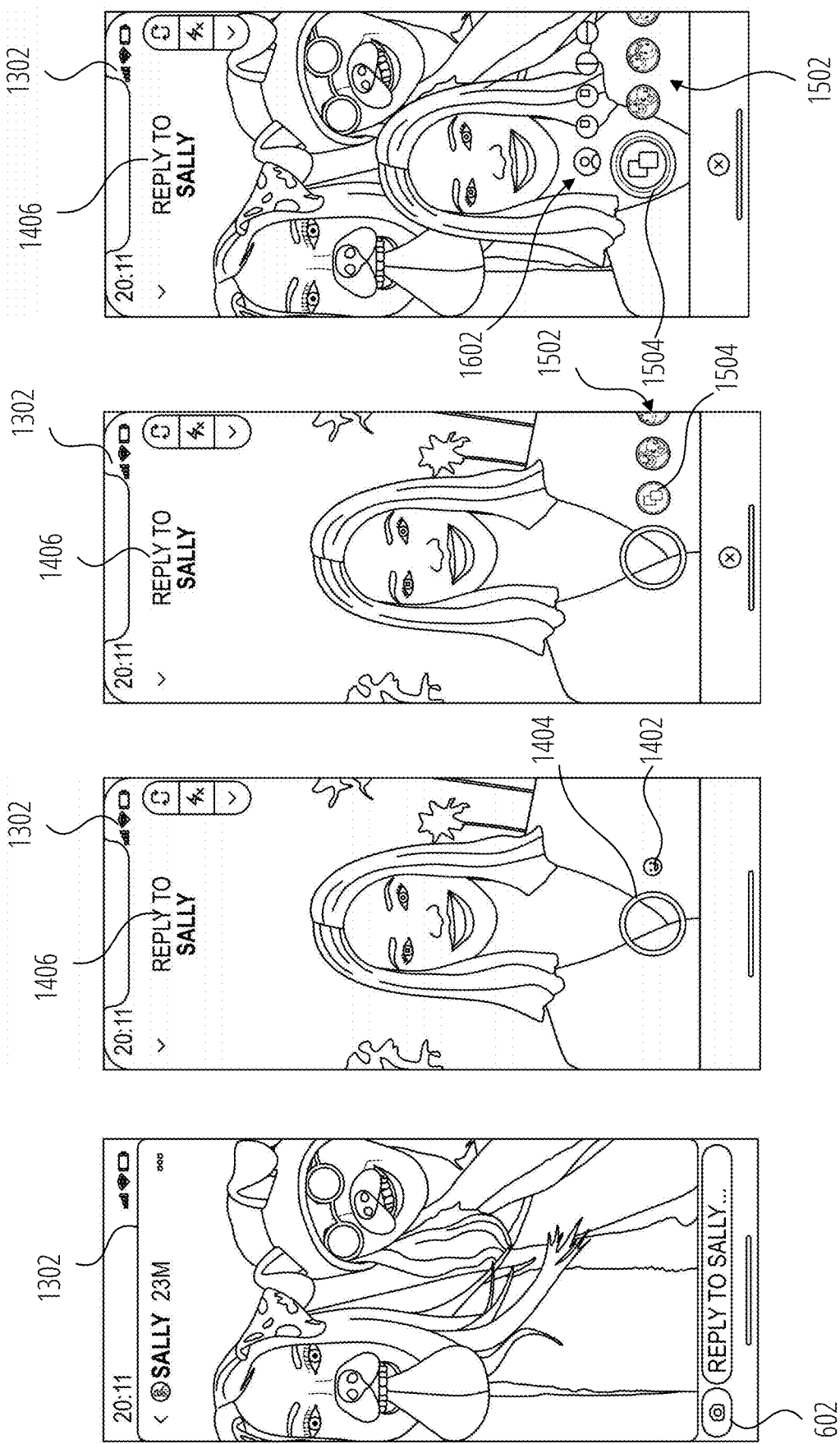

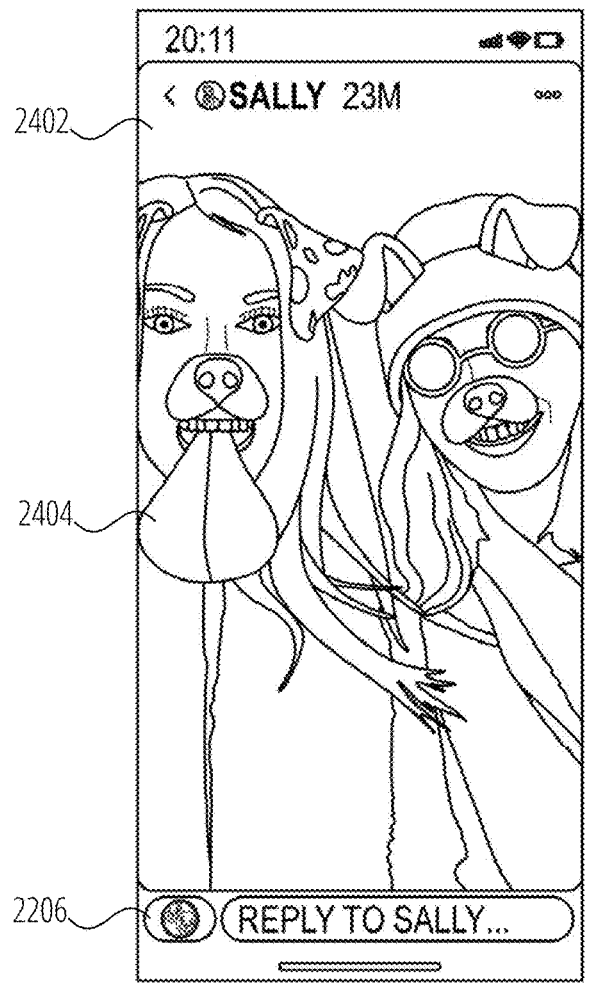
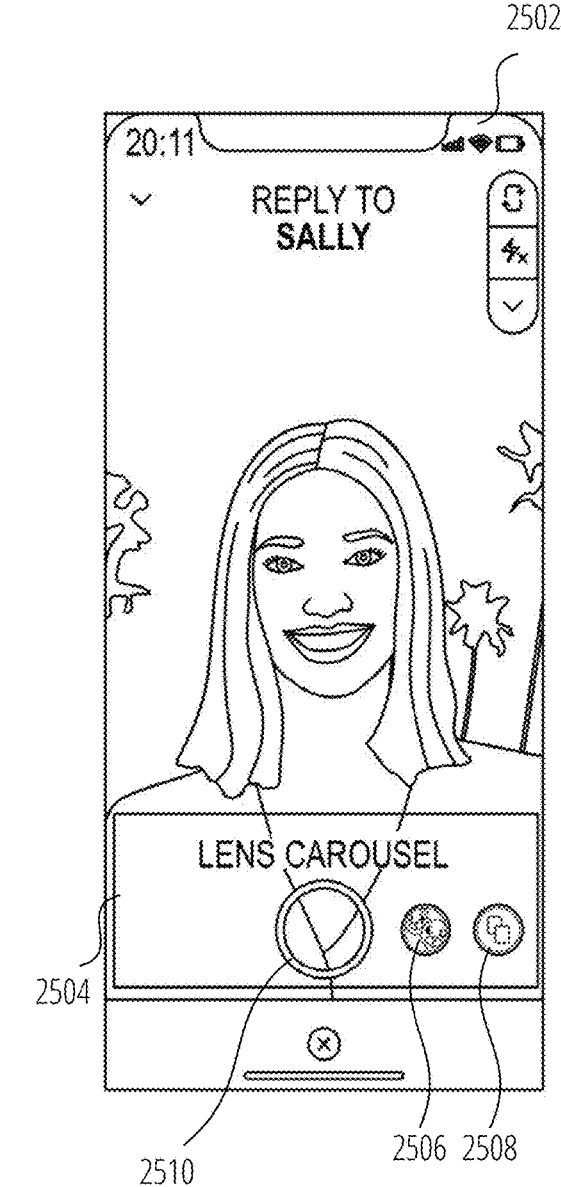
FIG. 24     FIG. 25

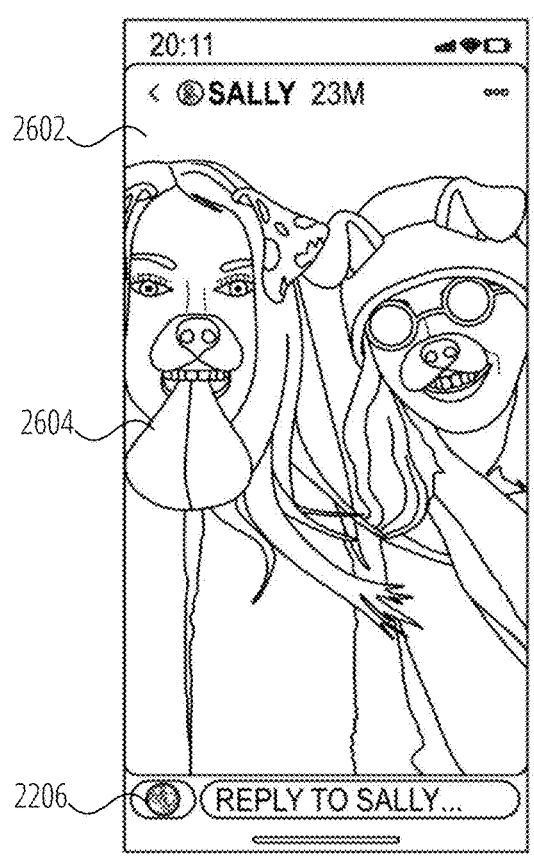
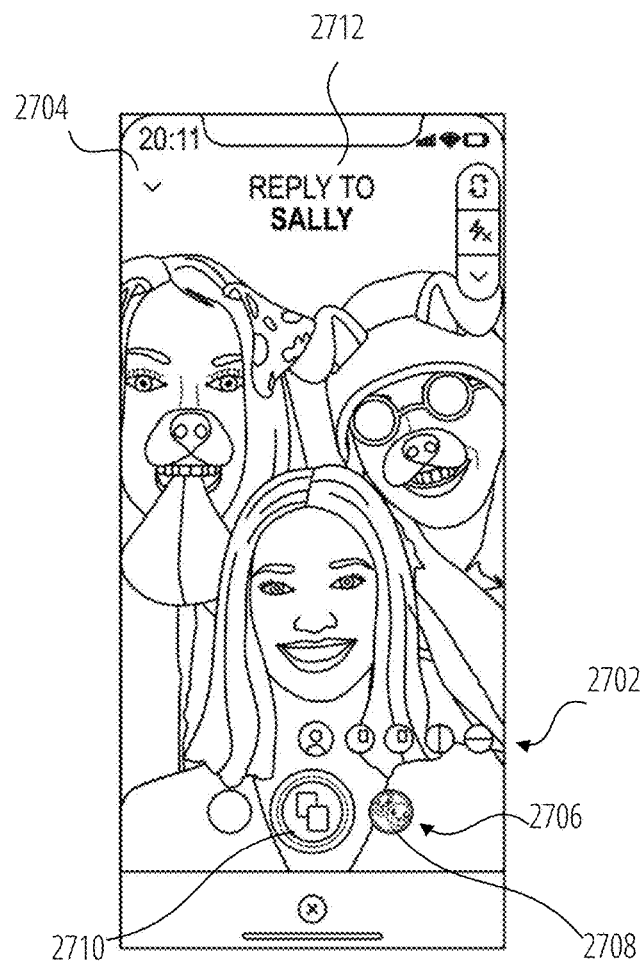
FIG. 26
FIG. 27

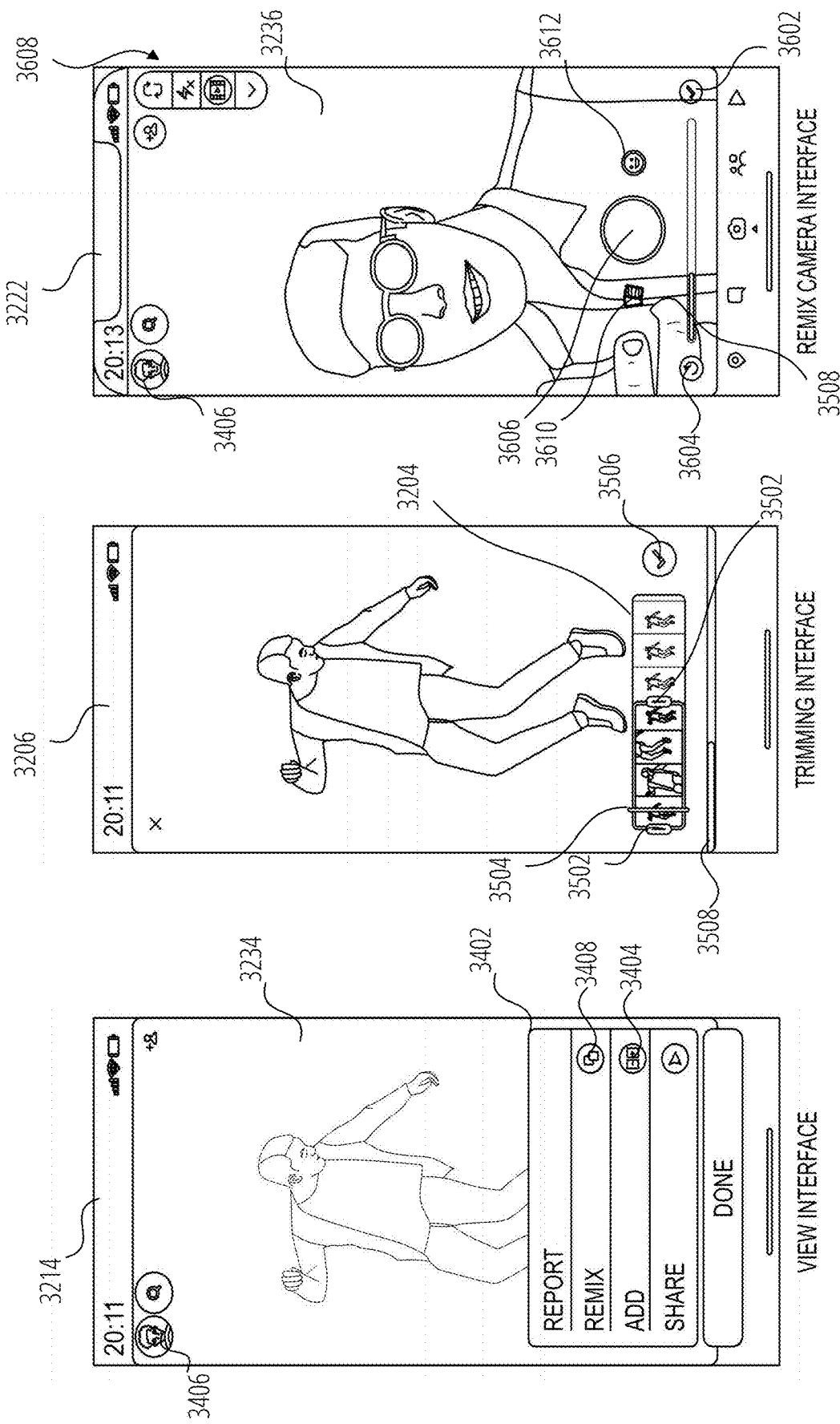

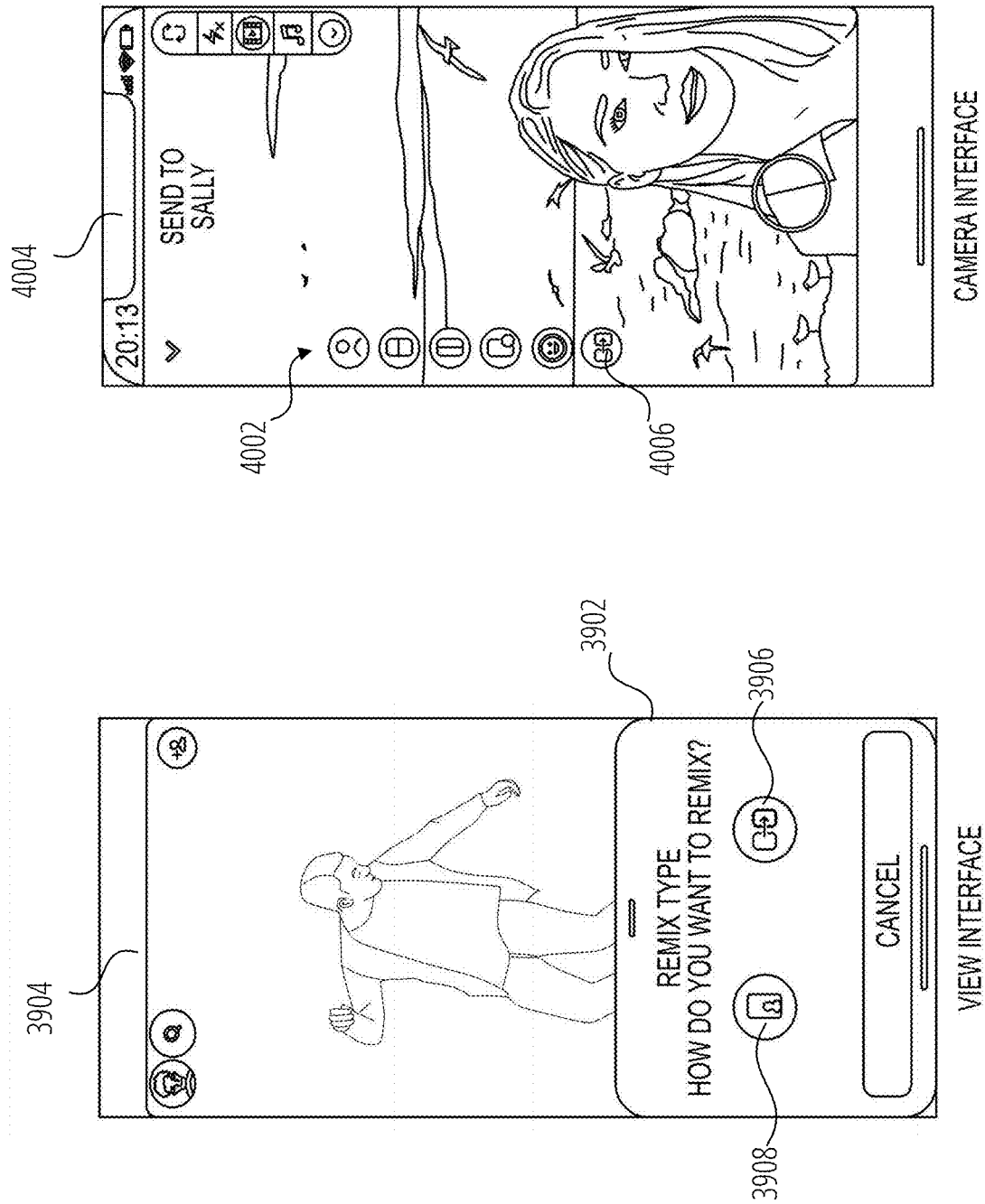

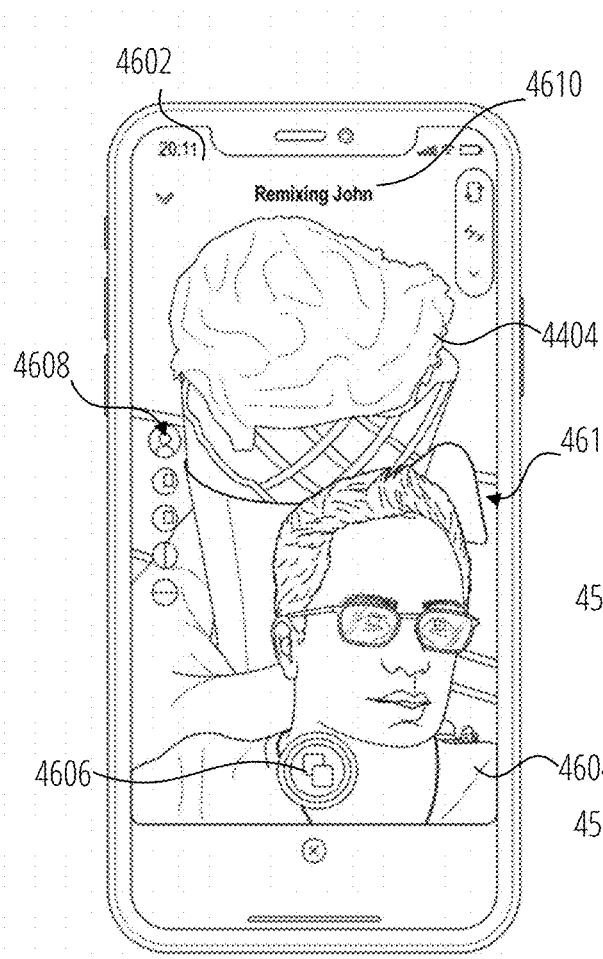
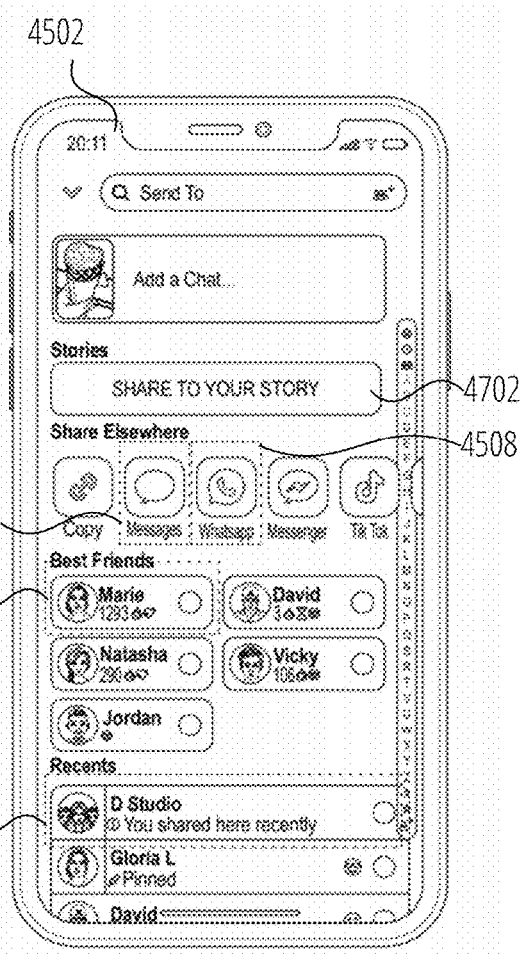
FIG. 46                    FIG. 47

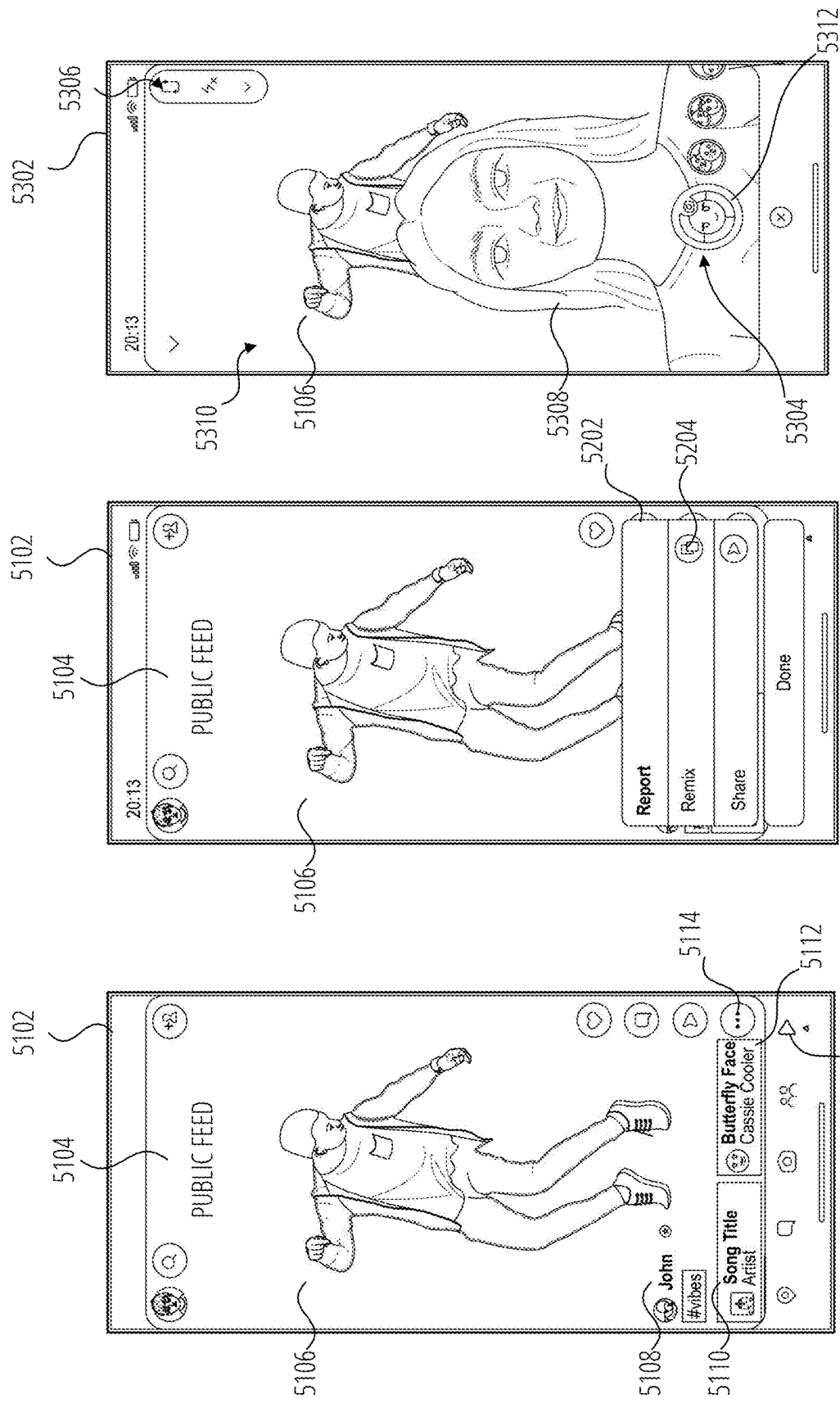

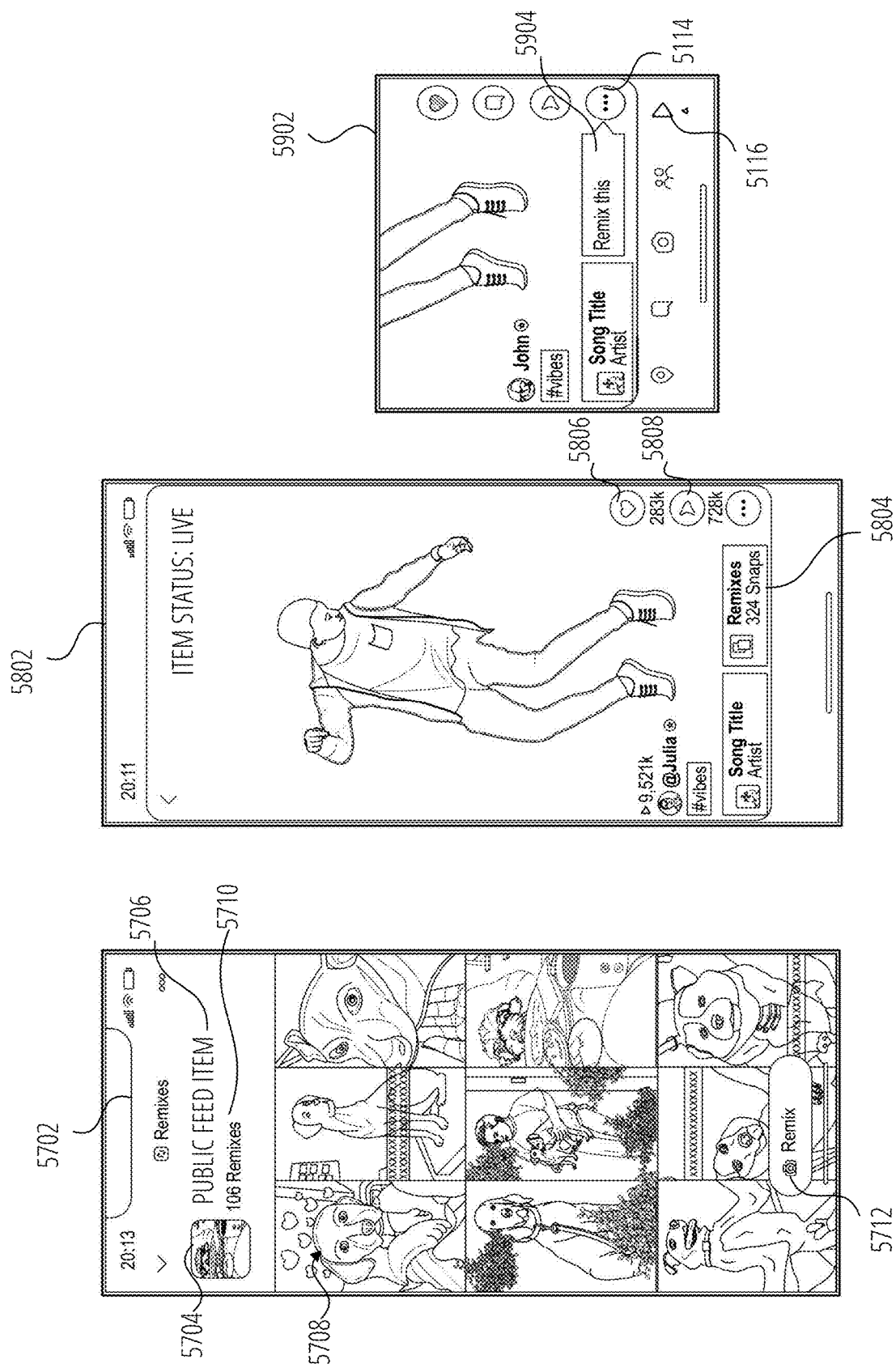

CONTENT COLLECTIONS LINKED TO A BASE ITEM

CLAIM OF PRIORITY

This application is a continuation of U.S. application Ser. No. 18/147,405, filed Dec. 28, 2022, which claims the benefit of priority to U.S. Provisional Application Ser. No. 63/365,167, filed on May 23, 2022, U.S. Provisional Application Ser. No. 63/365,648, filed on Jun. 1, 2022, U.S. Provisional Application Ser. No. 63/353,818, filed Jun. 20, 2022, and U.S. Provisional Application Ser. No. 63/369,363, filed Jul. 25, 2022, each of which is incorporated herein by reference in its entirety.

BACKGROUND

The popularity of computer-implemented programs that permit users to access and interact with content and other users online continues to grow. Various computer-implemented applications exist that permit users to share content with other users through messaging clients. Some of such computer-implemented applications can be designed to run on a mobile device such as a phone, a tablet, or a wearable device, while having a backend service provided on a server computer system to perform certain operations, e.g., those that may require resources greater than is reasonable to perform at a user device.

A media application such as a messaging client executing at a user device may provide a user interface that allows a user to capture a photo or a video and to share captured or viewed content to other devices. The media application may also provide a user interface that allows the user to modify or augment content before sharing the content to other devices.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 8 is a user interface diagram illustrating aspects relating to combined user input content items in accordance with some examples.

FIG. 9 is a user interface diagram illustrating aspects relating to combined user input content items in accordance with some examples.

FIG. 10 is a user interface diagram illustrating aspects relating to combined user input content items in accordance with some examples.

FIG. 11 is a user interface diagram illustrating aspects relating to combined user input content items in accordance with some examples.

FIG. 12 is a user interface diagram illustrating aspects relating to combined user input content items in accordance with some examples.

FIG. 13 is a user interface diagram illustrating aspects relating to combined user input content items in accordance with some examples.

FIG. 14 is a user interface diagram illustrating aspects relating to combined user input content items in accordance with some examples.

FIG. 15 is a user interface diagram illustrating aspects relating to combined user input content items in accordance with some examples.

FIG. 16 is a user interface diagram illustrating aspects relating to combined user input content items in accordance with some examples.

FIG. 24 is a user interface diagram illustrating aspects relating to augmentation of user input content items in accordance with some examples.

FIG. 25 is a user interface diagram illustrating aspects relating to augmentation of user input content items in accordance with some examples.

FIG. 26 is a user interface diagram illustrating aspects relating to augmentation of user input content items in accordance with some examples.

FIG. 27 is a user interface diagram illustrating aspects relating to augmentation of user input content items in accordance with some examples.

FIG. 34 is a user interface diagram illustrating aspects relating to combined user input content items in accordance with some examples.

FIG. 35 is a user interface diagram illustrating aspects relating to combined user input content items in accordance with some examples.

FIG. 36 is a user interface diagram illustrating aspects relating to combined user input content items in accordance with some examples.

FIG. 39 is a user interface diagram illustrating aspects relating to combined user input content items in accordance with some examples.

FIG. 40 is a user interface diagram illustrating aspects relating to combined user input content items in accordance with some examples.

FIG. 46 is a user interface diagram illustrating aspects relating to combined user input content items and unlocking of content sharing destinations in accordance with some examples.

FIG. 47 is a user interface diagram illustrating aspects relating to combined user input content items and unlocking of content sharing destinations in accordance with some examples.

FIG. 51 is a user interface diagram illustrating aspects relating to sharing of combined user input content items to content collections.

FIG. 52 is a user interface diagram illustrating aspects relating to sharing of combined user input content items to content collections.

FIG. 53 is a user interface diagram illustrating aspects relating to sharing of combined user input content items to content collections.

FIG. 57 is a user interface diagram illustrating aspects relating to sharing of combined user input content items to content collections.

FIG. 58 is a user interface diagram illustrating aspects relating to sharing of combined user input content items to content collections.

FIG. 59 is a user interface diagram, showing part of a user interface, illustrating aspects relating to sharing of combined user input content items to content collections.

Examples of the present disclosure improve the functionality of electronic software and systems by enabling users to modify, augment and combine content items to create combined content items in a media application. In examples of the present disclosure, users are enabled to combine multiple user input content items (e.g., multiple user-generated content items, referred to as UGCs) into combined user input content items, thereby providing enhanced software and system functionality and providing users with a powerful storytelling mechanism.

Networked Computing Environment

Figure 1:
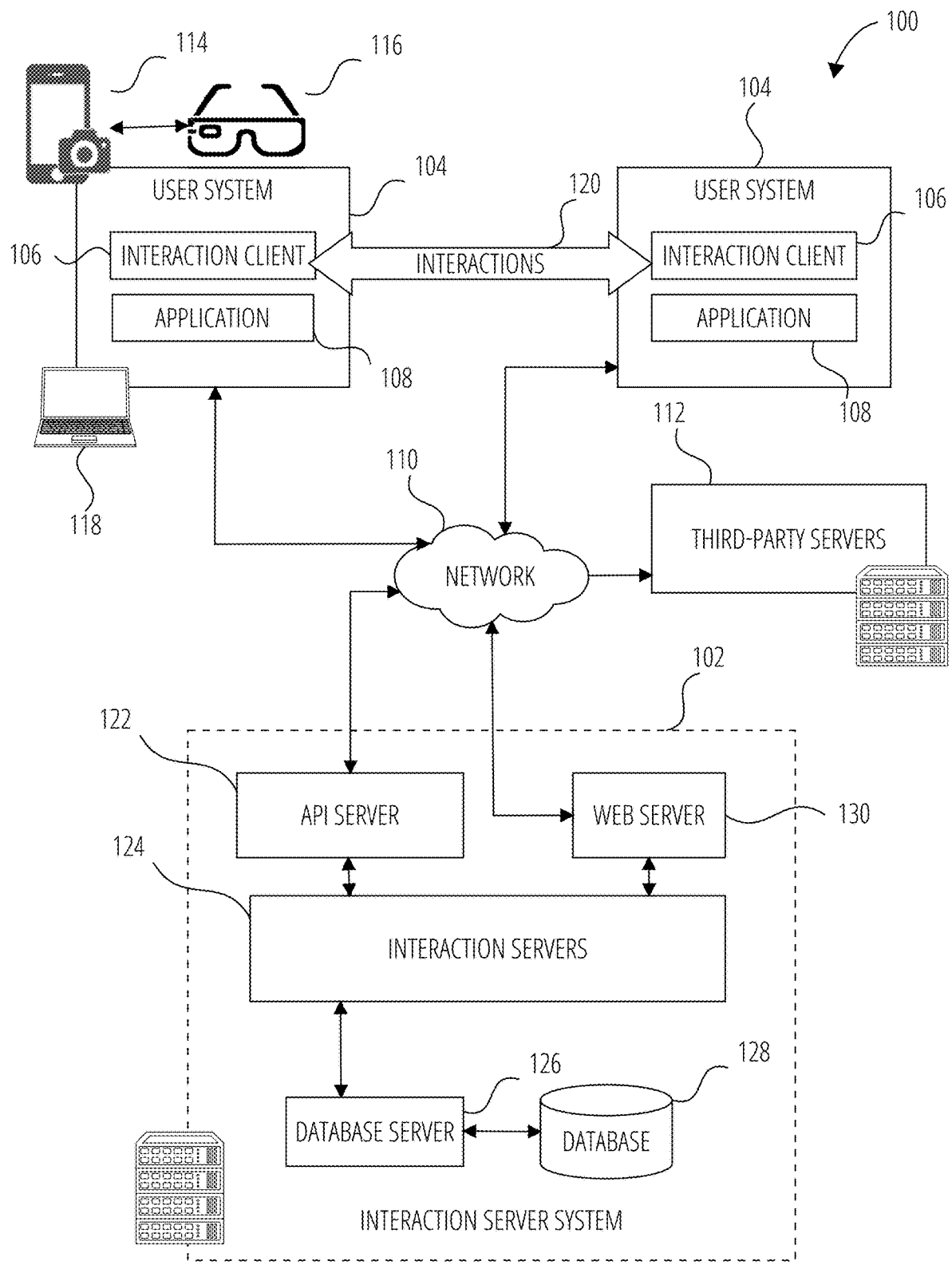
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple user systems 104, each of which hosts multiple applications, including an interaction client 106 and other applications 108. Each interaction client 106 is communicatively coupled, via one or more communication networks, including a network 110 (e.g., the Internet), to other instances of the interaction client 106 (e.g., hosted on respective other user systems 104, an interaction server system 102 and third-party servers 112). An interaction client 106 can also communicate with locally hosted applications 108 using Applications Program Interfaces (APIs).

Each user system 104 may include multiple user devices, such as a mobile device 114, head-wearable apparatus 116, and a computer device 118.

An interaction client 106 interacts with other interaction clients 106 and with the interaction server system 102 via the network 110. The data exchanged between the interaction clients 106 (e.g., interactions 120) and between the interaction clients 106 and the interaction server system 102 includes functions (e.g., commands to invoke functions) and payload data (e.g., text, audio, video, or other multimedia data).

The interaction server system 102 provides server-side functionality via the network 110 to the interaction clients 106. While certain functions of the interaction system 100 are described herein as being performed by either an interaction client 106 or by the interaction server system 102, the location of certain functionality either within the interaction client 106 or the interaction server system 102 may be a design choice. For example, it may be technically preferable to initially deploy particular technology and functionality within the interaction server system 102 but to later migrate this technology and functionality to the interaction client 106 where a user system 104 has sufficient processing capacity.

The interaction system 100 supports various services and operations provided to the interaction clients 106. Such operations include transmitting data to, receiving data from, and processing data generated by the interaction clients 106. This data may include message content, client device information, geolocation information, media augmentation and overlays, message content persistence conditions, social network information, and live event information. Data exchanges within the interaction server system 102 are invoked and controlled through functions available via user interfaces (UIs) of the interaction clients 106.

Turning now specifically to the interaction server system 102, an Application Program Interface (API) server 122 is coupled to and provides programmatic interfaces to interaction servers 124, making the functions of the interaction servers 124 accessible to interaction clients 106, other applications 108 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 104 (and for example, interaction clients 106 and other application 108) and the third-party server 112. Specifically, the API server 122 provides a set of interfaces (e.g., routines and protocols) that can be called or queried by the interaction client 106 and other applications 108 to invoke functionality of the interaction servers 124. The API server 122 exposes various functions supported by the interaction servers 124, including account registration; login functionality; the sending of interaction data, via the interaction servers 124, from a particular interaction client 106 to another interaction client 106; the communication of media files (e.g., images or video) from an interaction client 106 to the interaction servers 124; the settings of a collection of media data (e.g., a story); the retrieval of a list of friends of a user of a user system 104; the retrieval of messages and content; the addition and deletion of entities (e.g., friends) to an entity graph (e.g., a social graph); the location of friends within a social graph; and opening an application event (e.g., relating to the interaction client 106).

The interaction servers 124 host multiple systems and subsystems, described below with reference to FIG. 2.

Linked Applications

Returning to the interaction client 106, features and functions of an external resource (e.g., a linked application 108 or applet) are made available to a user via an interface of the interaction client 106. In this context, "external" refers to the fact that the application 108 or applet is external to the interaction client 106. The external resource is often provided by a third party but may also be provided by the creator or provider of the interaction client 106. The interaction client 106 receives a user selection of an option to launch or access features of such an external resource. The external resource may be the application 108 installed on the user system 104 (e.g., a "native app"), or a small-scale version of the application (e.g., an "applet") that is hosted on the user system 104 or remote of the user system 104 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 106. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 106 determines whether the selected external resource is a web-based external resource or a locally-installed application 108. In some cases, applications 108 that are locally installed on the user system 104 can be launched independently of and separately from the interaction client 106, such as by selecting an icon corresponding to the application 108 on a home screen of the user system 104. Small-scale versions of such applications can be launched or accessed via the interaction client 106 and, in some examples, no or limited portions of the small-scale application can be accessed outside of the interaction client 106. The small-scale application can be launched by the interaction client 106 receiving, from a third-party server 112, for example, a markup-language document associated with the small-scale application and processing such a document.

In response to determining that the external resource is a locally-installed application 108, the interaction client 106 instructs the user system 104 to launch the external resource by executing locally-stored code corresponding to the external resource. In response to determining that the external resource is a web-based resource, the interaction client 106 communicates with the third-party servers 112 (for example) to obtain a markup-language document corresponding to the selected external resource. The interaction client 106 then processes the obtained markup-language document to present the web-based external resource within a user interface of the interaction client 106.

The interaction client 106 can notify a user of the user system 104, or other users related to such a user (e.g., "friends"), of activity taking place in one or more external resources. For example, the interaction client 106 can provide participants in a conversation (e.g., a chat session) in the interaction client 106 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 106, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 106. The external resource can selectively include different media items in the responses, based on a current context of the external resource.

The interaction client 106 can present a list of the available external resources (e.g., applications 108 or applets) to a user to launch or access a given external resource. This list can be presented in a context-sensitive menu. For example, the icons representing different ones of the application 108 (or applets) can vary based on how the menu is launched by the user (e.g., from a conversation interface or from a non-conversation interface).

System Architecture

Figure 2:
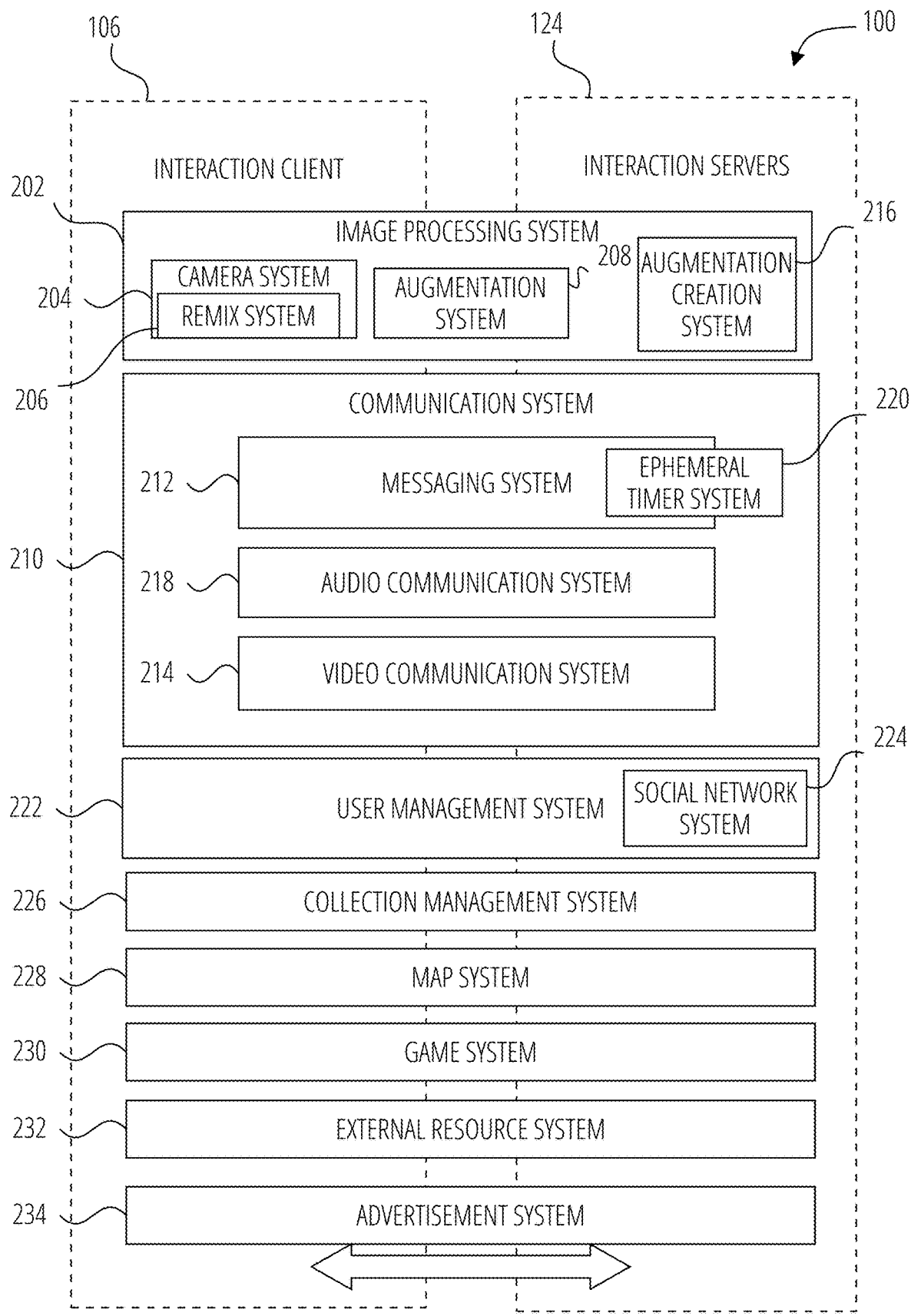
FIG. 2 is a diagrammatic representation of an interaction system, according to some examples, that has both client-side and server-side functionality.

FIG. 2 is a block diagram illustrating further details regarding the interaction system 100, according to some examples. Specifically, the interaction system 100 is shown to comprise the interaction client 106 and the interaction servers 124. The interaction system 100 embodies multiple subsystems, which are supported on the client-side by the interaction client 106 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 104 to modify and augment real-time images captured and displayed via the interaction client 106. The camera system 204 includes a number of subsystems, including a remix system 206 that enables users of the interaction system 100 to "remix" multiple content items to create a combined content item. For example, using the remix system 206, a user, when viewing a collection of user input content items of one or more users of the interaction system 100, can combine a user input content item with a selected further user input content item (e.g., image or video captured by the user, or an image or video selected by the user from a media library or file storage) to create a combined user input content item. The remix system 206 provides various tools to enable a user to creatively combine content items, such tools including a layout tool using which a relative layout of a first user input content item (or multiple user input content items) and a user input content item can be defined and specified.

The augmentation system 208 provides functions related to the generation and publishing of augmentations (e.g., media overlays) for images captured in real-time by cameras of the user system 104 or retrieved from memory of the user system 104. For example, the augmentation system 208 operatively selects, presents, and displays media overlays (e.g., an image filter or an image lens) to the interaction client 106 for the augmentation of real-time images received via the camera system 204 or stored images retrieved from memory 6202 of a user system 104. These augmentations are selected by the augmentation system 208 and presented to a user of an interaction client 106, based on a number of inputs and data, such as for example:

Geolocation of the user system 104; and
Social network information of the user of the user system 104.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 104 for communication in a message, or applied to video content, such as a video content stream or feed transmitted from an interaction client 106. As such, the image processing system 202 may interact with, and support, the various subsystems of the communication system 210, such as the messaging system 212 and the video communication system 214.

A media overlay may include text or image data that can be overlaid on top of a photograph taken by the user system 104 or a video stream produced by the user system 104. In some examples, the media overlay may be a location overlay (e.g., Venice beach), a name of a live event, or a name of a merchant overlay (e.g., Beach Coffee House). In further examples, the image processing system 202 uses the geolocation of the user system 104 to identify a media overlay that includes the name of a merchant at the geolocation of the user system 104. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 216 supports augmented reality developer platforms and includes an application for content creators (e.g., artists and developers) to create and publish augmentations (e.g., augmented reality experiences) of the interaction client 106. The augmentation creation system 216 provides a library of built-in features and tools to content creators including, for example custom shaders, tracking technology, and templates.

In some examples, the augmentation creation system 216 provides a merchant-based publication platform that enables merchants to select a particular augmentation associated with a geolocation via a bidding process. For example, the augmentation creation system 216 associates a media overlay of the highest bidding merchant with a corresponding geolocation for a predefined amount of time.

A communication system 210 is responsible for enabling and processing multiple forms of communication and interaction within the interaction system 100 and includes a messaging system 212, an audio communication system 218, and a video communication system 214. The messaging system 212 is responsible for enforcing the temporary or time-limited access to content by the interaction clients 106. The messaging system 212 incorporates multiple timers (e.g., within an ephemeral timer system 220) that, based on duration and display parameters associated with a message or collection of messages (e.g., a story), selectively enable access (e.g., for presentation and display) to messages and associated content via the interaction client 106. Further details regarding the operation of the ephemeral timer system 220 are provided below. The audio communication system 218 enables and supports audio communications (e.g., real-time audio chat) between multiple interaction clients 106. Similarly, the video communication system 214 enables and supports video communications (e.g., real-time video chat) between multiple interaction clients 106.

A user management system 222 is operationally responsible for the management of user data and profiles, and includes a social network system 224 that maintains information regarding relationships between users of the interaction system 100.

A collection management system 226 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 226 may also be responsible for publishing an icon that provides notification of a particular collection to the user interface of the interaction client 106. The collection management system 226 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 226 employs machine vision (or image recognition technology) and content rules to curate a content collection automatically. In certain examples, compensation may be paid to a user to include user-generated content into a collection. In such cases, the collection management system 226 operates to automatically make payments to such users to use their content.

A map system 228 provides various geographic location functions and supports the presentation of map-based media content and messages by the interaction client 106. For example, the map system 228 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 106. A user can furthermore share his or her location and status information (e.g., using an appropriate status avatar) with other users of the interaction system 100 via the interaction client 106, with this location and status information being similarly displayed within the context of a map interface of the interaction client 106 to selected users.

A game system 230 provides various gaming functions within the context of the interaction client 106. The interaction client 106 provides a game interface providing a list of available games that can be launched by a user within the context of the interaction client 106 and played with other users of the interaction system 100. The interaction system 100 further enables a particular user to invite other users to participate in the play of a specific game by issuing invitations to such other users from the interaction client 106. The interaction client 106 also supports audio, video, and text messaging (e.g., chats) within the context of gameplay, provides a leaderboard for the games, and also supports the provision of in-game rewards (e.g., coins and items).

An external resource system 232 provides an interface for the interaction client 106 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 106 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 106. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 106 into the web-based resource.

The SDK stored on the interaction system 100 effectively provides the bridge between an external resource (e.g., applications 108 or applets) and the interaction client 106. This gives the user a seamless experience of communicating with other users on the interaction client 106 while also preserving the look and feel of the interaction client 106. To bridge communications between an external resource and an interaction client 106, the SDK facilitates communication between third-party servers 112 and the interaction client 106. A WebViewJavaScriptBridge running on a user system 104 establishes two one-way communication channels between an external resource and the interaction client 106. Messages are sent between the external resource and the interaction client 106 via these communication channels asynchronously. Each SDK function invocation is sent as a message and callback. Each SDK function is implemented by constructing a unique callback identifier and sending a message with that callback identifier.

By using the SDK, not all information from the interaction client 106 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 106. Once the user selects the visual representation or instructs the interaction client 106 through a GUI of the interaction client 106 to access features of the web-based external resource, the interaction client 106 obtains the HTML5 file and instantiates the resources to access the features of the web-based external resource.

The interaction client 106 presents a graphical user interface (e.g., a landing page or title screen) for an external resource. During, before, or after presenting the landing page or title screen, the interaction client 106 determines whether the launched external resource has been previously authorized to access user data of the interaction client 106. In response to determining that the launched external resource has been previously authorized to access user data of the interaction client 106, the interaction client 106 presents another graphical user interface of the external resource that includes functions and features of the external resource. In response to determining that the launched external resource has not been previously authorized to access user data of the interaction client 106, after a threshold period of time (e.g., 3 seconds) of displaying the landing page or title screen of the external resource, the interaction client 106 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 106 adds the external resource to a list of authorized external resources and allows the external resource to access user data from the interaction client 106. The external resource is authorized by the interaction client 106 to access the user data under an OAuth 2 framework.

The interaction client 106 controls the type of user data that is shared with external resources based on the type of external resource being authorized. For example, external resources that include full-scale applications (e.g., an application 108) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 234 operationally enables the purchasing of advertisements by third parties for presentation to end-users via the interaction clients 106 and also handles the delivery and presentation of these advertisements.

Data Architecture

Figure 3:
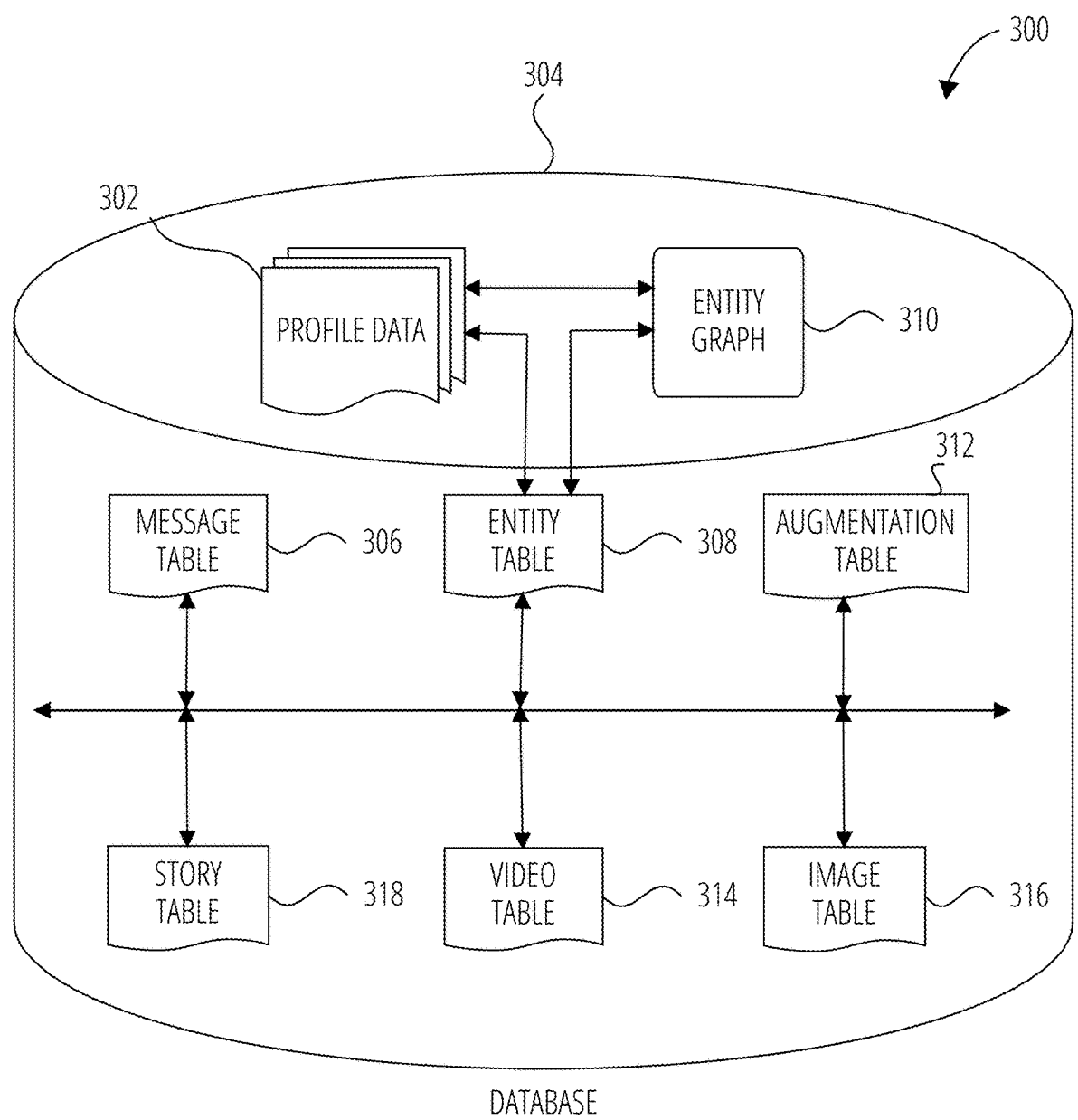
FIG. 3 is a diagrammatic representation of a data structure as maintained in a database, according to some examples.

FIG. 3 is a schematic diagram illustrating data structures 300, which may be stored in the database 304 of the interaction system 100, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction system 100 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 106 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to user input content, such as videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 106 when the sending user is composing a message. Other types of filters include geolocation filters (also known as geo-filters), which may be presented to a sending user based on geographic location. For example, geolocation filters specific to a neighborhood or special location may be presented within a user interface by the interaction client 106, based on geolocation information determined by a Global Positioning System (GPS) unit of the user system 104.

Another type of filter is a data filter, which may be selectively presented to a sending user by the interaction client 106 based on other inputs or information gathered by the user system 104 during the message creation process. Examples of data filters include current temperature at a specific location, a current speed at which a sending user is traveling, battery life for a user system 104, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality (AR), virtual reality (VR) and mixed reality (MR) content items, overlays, image transformations, images, and modifications that may be applied to image data (e.g., videos or images). This includes real-time modifications, which modify an image as it is captured using device sensors (e.g., one or multiple cameras) of the user system 104 and then displayed on a screen of the user system 104 with the modifications. This also includes modifications to stored content, such as video clips in a collection or group that may be modified. For example, in a user system 104 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 104 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to determine facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the user system 104) and perform complex image manipulations locally on the user system 104 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 104.

In some examples, a computer animation model to transform image data can be used by a system where a user may capture an image or video stream of the user (e.g., a selfie) using the user system 104 having a neural network operating as part of an interaction client 106 operating on the user system 104. The transformation system operating within the interaction client 106 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the user system 104 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 106 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 106, to contribute content to a particular live story. The live story may be identified to the user by the interaction client 106, based on his or her location. The end result is a "live story" told from a community perspective.

A further type of content collection is known as a "location story," which enables a user whose user system 104 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

In some examples, if a user is viewing a user input content item, the user may wish to combine the user input content item with another content item. However, this may involve a number of manual steps or selections, and it may be desirable to reduce and/or automate these steps or selections, at least to some extent. One example technical problem of reducing and/or automating the above may be addressed by providing a reply user interface that automatically provides access to a combination function (also referred to as a "remix" function). In some examples, if a user is viewing a first user input content item, such as a third-party image, that allows users to combine the first user input content item with a second user input content item, such as a user-selected image, and reply to the first user input content item (e.g., "remix and reply"), a camera button is user-selectable to trigger an experience that includes the ability to access an augmentation function or tool, in the example form of a remix lens. The remix lens, also referred to as a combination lens or combination application element, allows the user to combine different user input content items to create a combined user input content item, which the user can then share and "reply" to the sharing of the first user input content item (e.g., the third-party image).

Figure 4:
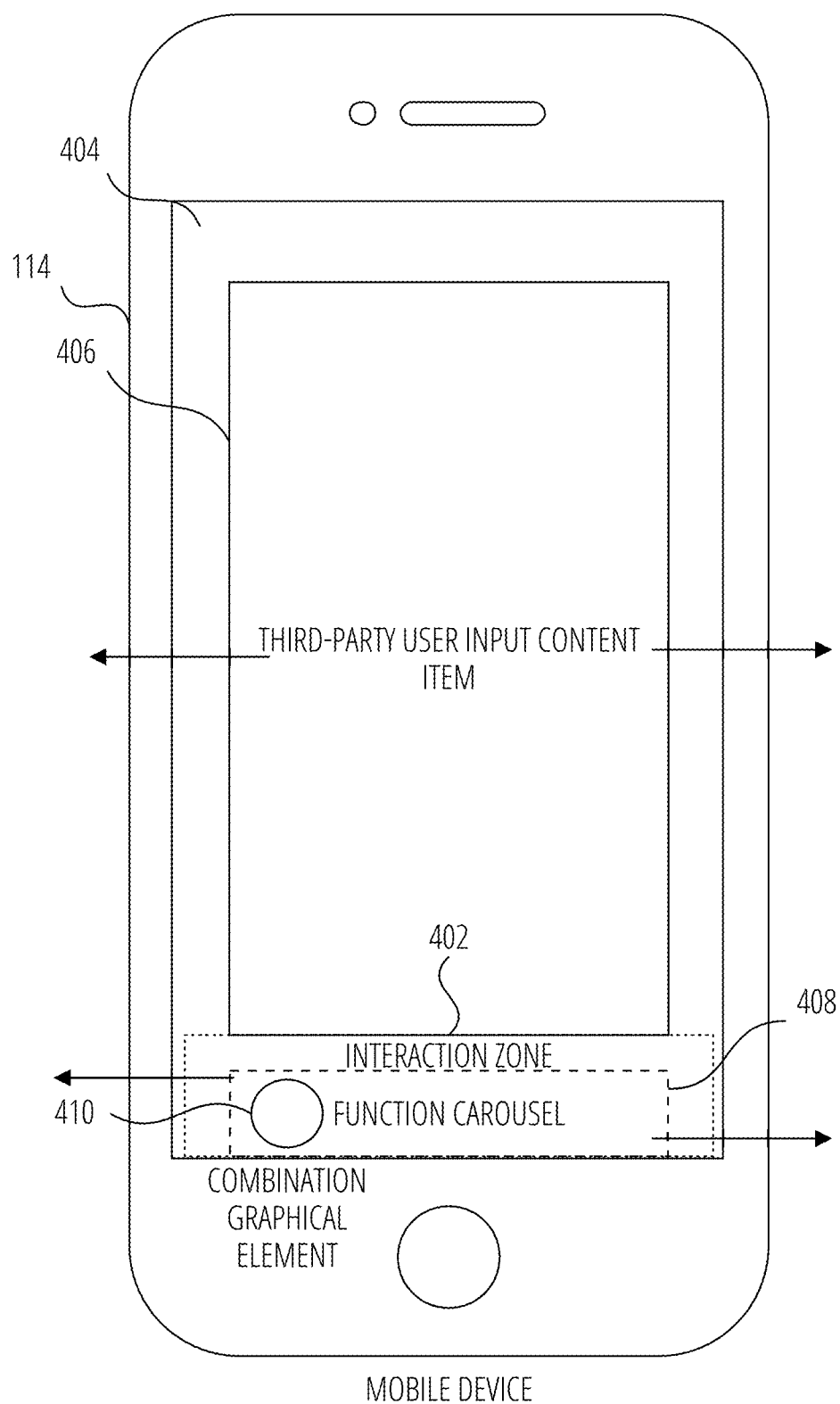
FIG. 4 is a user interface diagram illustrating aspects relating to combined user input content items in accordance with some examples.

FIG. 4 is a user-interface diagram depicting a user interface 404, according to some examples, that may be presented by an interaction client 106, in the example form of a media application, executing on a mobile device 114. While the user interface 404 is described as being presented on the screen of a mobile device 114, the user interface 404 may also be presented on the optical display of a head-wearable apparatus 116 or other wearable apparatus presenting a user interface, e.g., "smart contact lenses" or similar technology.

The interaction system 100 allows users of the interaction system 100 to share and publish digital content, including various user input content items. User input content items may comprise user-selected content items (which may be user-selected content data), user-generated content items (which may be user-generated content data), computer-generated content items (which may be computer-generated content data, e.g., data generated by an artificial intelligence driven system), or combinations thereof.

The user interface 404 displays a user input content item in the example form of a third-party user input content item 406, which, in some examples, may be part of a collection of third-party user input content items generated and published by a third-party user of the interaction system 100. The third-party user input content item 406 may, for example, comprise image data, video data, audio data, or a combination of these data types, together with augmentation or modification data (e.g., stickers, filters or lenses).

The third-party user input content item 406 may be part of a set of third-party user input content items created by a third-party user of the media application, and the presentation of the third-party user input content item may be part of a sequential presentation of the set of third-party user input content items.

The user interface 404 also includes an interaction zone 402 with a function or tools section, in the example form of a function carousel 408. The function carousel 408 presents various tools and functions that may be invoked by a user of the mobile device 114 to interact with other users of the interaction system 100 and also to interact with content made accessible via the interaction system 100. The interaction zone 402 includes a combination graphical element 410 (e.g., a user-selectable icon) that is user-selectable to invoke a combination function that enables a user to combine the third-party user input content item 406 with another content item (e.g., an image or video). The user may combine the third-party user input content item 406 with another (second) user input content item chosen by the user, e.g., captured using a camera of the mobile device 114, selected from local storage of the mobile device 114, a cloud storage location, or another storage component, or partially or fully generated by a computer system or artificial intelligence. Various examples of the user interface 404 are discussed below. While certain examples of the present disclosure relate to the combination of a third-party user input content item with another content item, it should be appreciated that similar techniques may be applied to combine any user input content item (not necessarily being a third-party user input content item) with another content item.

Figure 5:
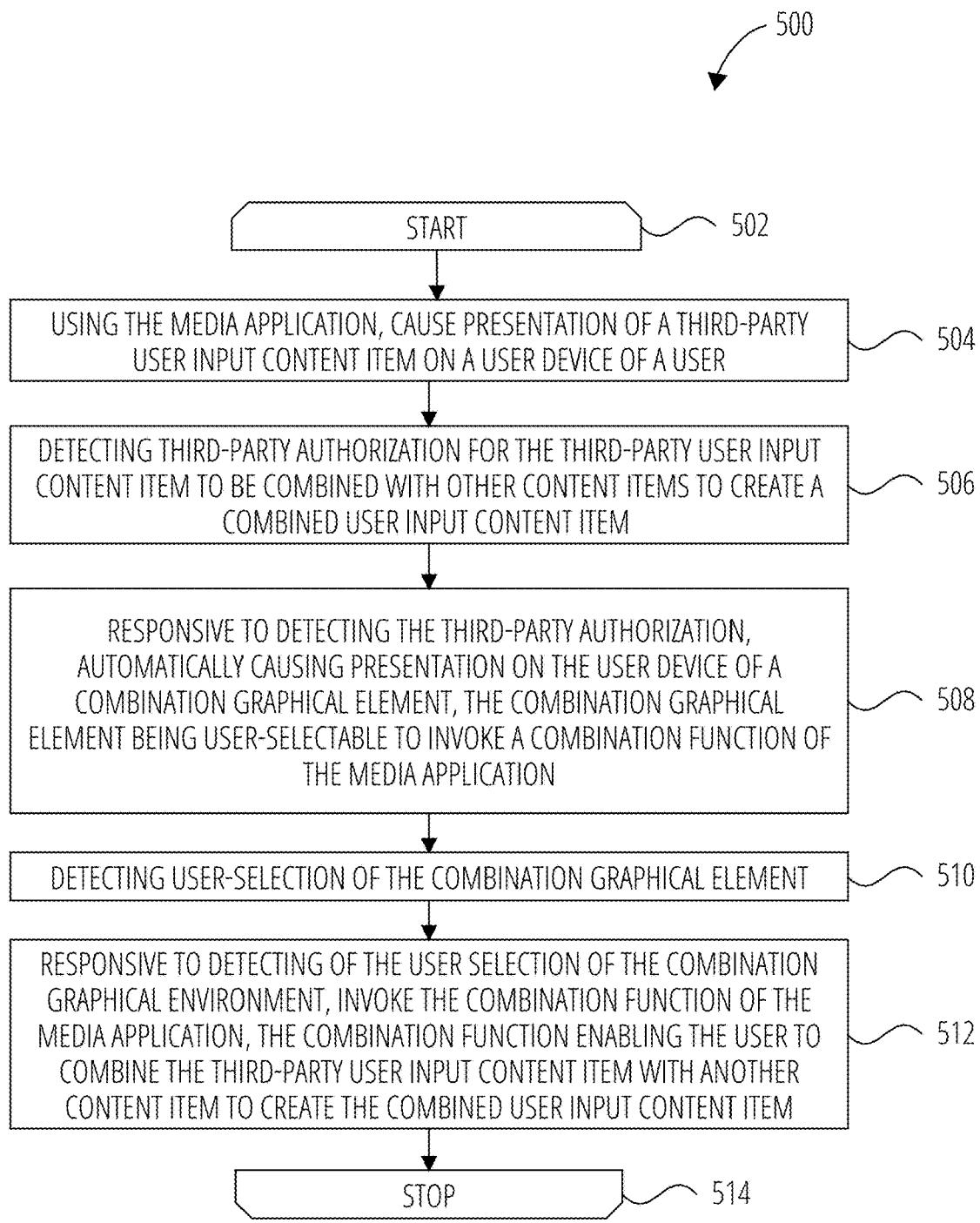
FIG. 5 is a flow diagram illustrating a method including aspects relating to a combination function, in accordance with some examples.

FIG. 5 is a flowchart illustrating a method 500, according to some examples, to enable an active user to combine a third-party user input content item with another user input content item in a media application (e.g., the interaction client 106). Accordingly, the method 500 may be performed by components of the interaction system 100.

The method 500 commences at opening loop block 502, and progresses to block 504, where the interaction client 106 causes the presentation of a third-party user input content item 406 within the user interface 404 of the mobile device 114. The third-party user input content item 406 may be part of a set or collection of third-party user input content items published by a third-party user of the interaction system 100. One or more third-party user may have created or generated one or more of these items and may have selected one or more of these items, e.g., from a local or cloud storage. In such examples, an active user of the interaction client 106 is enabled, within the context of the user interface 404, to scroll in both backward and forward directions (or upward and downward directions) through the collection of third-party user input content items, or to automatically or manually advance display of the back of third-party user input content items.

At block 506, the remix system 206 of the interaction system 100 detects a third-party authorization for the third-party user input content item 406 to be combined with other content items in order to create a combined user input content item. For example, an authorization setting related to the third-party user input content item 406, indicating this authorization, may be detected at block 506. The determining third-party authorization for the third-party user input content item to be combined may thus comprise determining a user setting related to the third-party user input content item indicating the third-party authorization.

A third-party content creator, when creating or publishing the third-party user input content item, is presented with the option of either allowing or disallowing the use of the third-party user input content item 406 in combination with other content items, created or originated with other users of the interaction system 100. This allowance/disallowance is then recorded and stored in the database 128 as the authorization setting related to the relevant third-party user input content item, and is accessed at block 506 to perform the detection of the third-party authorization.

At block 508, and responsive to determining the third-party authorization, the interaction client 106 automatically causes display or presentation, on the mobile device 114 of the user, of a combination graphical element. The automatic causing of the presentation of the combination graphical element includes causing presentation of the combination graphical element without user action, for example relative to the user interface 404, as may be presented by the interaction client 106. The combination graphical element is user-selectable to invoke a combination function provided by the remix system 206 of the interaction system 100. The combination graphical element, in some examples, is a camera indicium (e.g., a camera button) that indicates that it is user-selectable to invoke the combination function. The combination graphical element is further caused to be displayed in conjunction and contemporaneously with the third-party user input content item 406 on a user interface 404 of the interaction client 106.

The combination function may provide a number of sub-functions or tools to facilitate the combining of the third-party user input content item 406 and the other user input content item. These tools may include a layout function to enable the user to specify a layout relationship of the third-party user input content item 406, relative to the other user input content item, or within the context of a broader combined display, during the presentation of the combined user input content item. The combination function also makes a number of the augmentations of the augmentation system 208 discussed herein available for application and use in the creation of the combined content element.

In some examples, the combination function, in addition to enabling the combining of multiple content items, also enables the triggering of a reply messaging function (e.g., provided by the messaging system 212) to enable automatic messaging or sending of the combined user input content item to the third-party user of the interaction system 100. The sending of the combined user input content item may be as a message (e.g., message 6000) to the third-party user or by selective publication to a content feed of the third-party user. The reply messaging function may thus allow two users to collaborate on a content item together to create a combined content item. In some examples, this collaboration may occur in a private conversation. Accordingly, the user's reply to the transmission of the third-party user input content item may comprise transmitting the combined user input content item in a private conversation between the user and the third-party user facilitated by the interaction system 100.

At block 510, user selection of the combination graphical element is detected and, at block 512, the combination function provided by the remix system 206 is invoked responsive to determining the user selection. The combination function enables the active user to combine the third-party user input content item 406 with another user input content item, in order to create a new, combined user input content item. The method 500 then terminates at block 514.

While examples herein refer to combining digital content in the form of images and videos, it should be appreciated that audio items may also be combined with other content items (that may include image, video and/or audio content). For example, a viewing user may select a third-party user input content item comprising an audio item (e.g., a specific song linked to an image or video clip), and use the combination function to combine the audio item with another content item to create the combined user input content item (e.g., combine the specific song with another image that was captured or selected by the user).

Figure 6:
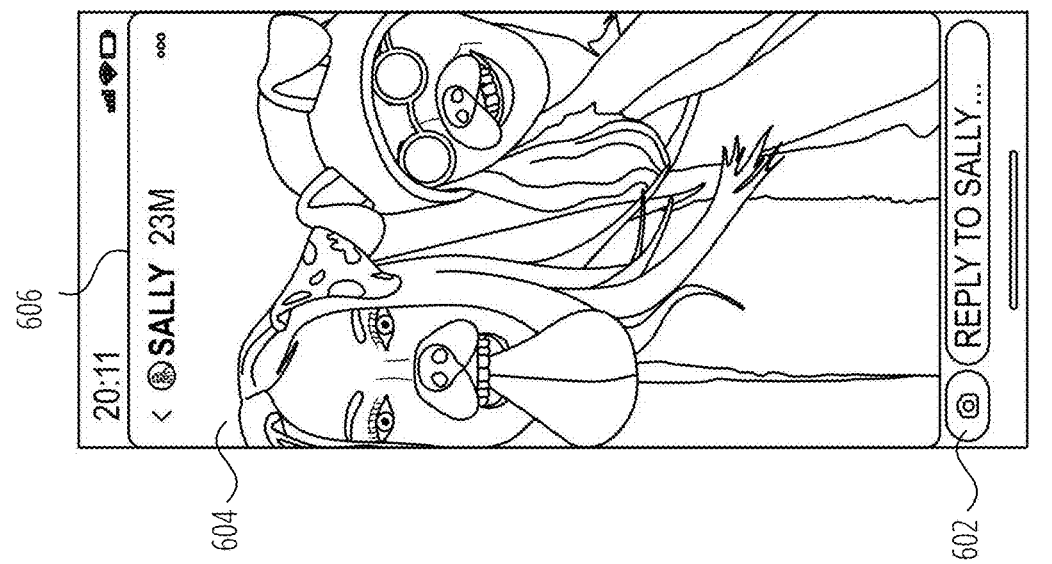
FIG. 6 is a user interface diagram illustrating aspects relating to combined user input content items in accordance with some examples.

FIG. 6 is a user interface diagram showing a user interface 606, according to some examples. Referring to the user interface 606, where an active user is viewing a third-party user input content item in the example form of the third-party image 604 (another example may be a third-party video clip, or an image/video with added audio content) and responsive to determining a combination authorization with respect to the third-party image 604, a combination graphical element in the form of a camera button 602 is displayed. The camera button 602 is user-selectable to trigger the combination function (e.g., an experience) that includes the ability to access a combination augmentation or lens (e.g., a "remix" lens), in order to create a combined content element (e.g., a combined user input content item) that includes the third-party image 604.

Figure 7:
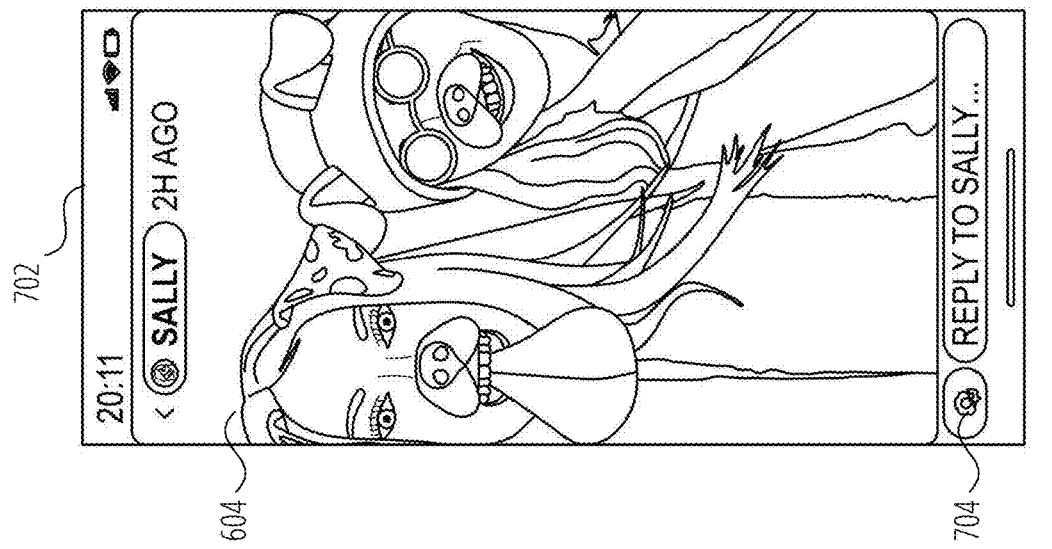
FIG. 7 is a user interface diagram illustrating aspects relating to combined user input content items in accordance with some examples.

FIG. 7 is a user interface diagram showing a user interface 702, according to some examples. Referring to the user interface 702, in some examples, where an active user is viewing the third-party image 604 described with reference to FIG. 6, and responsive to determining a combination authorization with respect to the third-party image 604, a combination graphical element in the form of a remix button 704 is displayed.

The remix button 704 is user-selectable to trigger the combination function. The remix button 704 differs from the camera button 602 in that it specifically includes a graphical component (e.g., the arrow shown in conjunction with the camera image in FIG. 7) that identifies the combination function, including its reply message capabilities. The graphical component may provide a contextual signal to the user, indicative of the option to trigger the combination function and its reply message capabilities. The arrow shown in FIG. 7 is merely an example, and it should be appreciated that examples of the present disclosure may include various identifiers of the combination function, e.g., various different augmentations or supplements to a camera button, to alert the active user of the option to activate the combination function.

FIG. 8 is a user interface diagram showing a user interface 802, according to some examples. When an active viewer is viewing the third-party image 604 within the user interface 802 for which a combination authorization is recorded and accessed, user selection of a camera button 602 opens a modular reply camera interface 904 (e.g., provided by the reply system of the camera system 204), as shown in FIG. 9. Accordingly, invoking the combination function (by selecting the camera button 602) may include activating and opening the modular reply camera interface.

Referring to the user interface diagram in FIG. 9, the reply camera interface 904 presents an augmentation carousel 906. Within the augmentation carousel 906, a combination graphical element in the form of a remix lens 908, also referred to as a combination lens or combination application element, is located at a first position relative to other lenses within the augmentation carousel 906, and is preselected (e.g., as indicated by a visual highlighting and/or size differentiation and/or its central position in the reply camera interface 904). The augmentation carousel 906 is automatically applied to merge or combine the third-party image 604 with a second user input content item, in this case an image captured by the active user, to create a combined image 902 within the reply camera interface 904. Accordingly, in some examples, invoking the combination function causes the modular reply camera interface to be displayed, and includes preselecting, by the media application, the combination lens (combination application element), allowing the user convenient access to the remix function.

FIG. 10 is a user interface diagram showing a viewing user interface 1002, according to some examples. When an active user is viewing the third-party image 604, for which a combination authorization is stored and accessed, within the viewing user interface 1002, user selection of a camera button 602 activates and opens a modular reply camera interface 1104 (e.g., provided by the camera system 204) as shown in FIG. 11.

FIG. 11 is a user interface diagram showing the reply camera interface 1104, according to some examples. The reply camera interface 1104 presents a user input content image 1102, e.g., a "selfie" image captured by the active user (self-portrait photograph captured using a front camera, for example), which image may have been captured responsive to user selection of the camera button 602. The reply camera interface 1104, automatically and by default, presents an augmentation carousel 1106 within which a remix camera 1108 (or remix lens, also referred to as a combination lens) is a first lens in the augmentation carousel 1106 but, in contrast with the example discussed with reference to FIG. 8 and FIG. 9, is not preselected. The remix camera 1108 is referred to as the first lens in the augmentation carousel 1106, because it is closest to the central capture button 1112. The remix camera 1108 is not preselected and the central capture button 1112, which can be used to capture a standard image (without re-mixing or augmentation) is preselected and displayed larger than the icons in the augmentation carousel 1106.

The active user may then scroll the augmentation carousel 1106 to the left to move the remix camera 1108 into the central position (see FIG. 12), or select the remix camera 1108 by pressing it directly, in order to activate it. Using the combination function of the remix camera 1108, the active user can conveniently and easily combine the third-party image 604, from a third-party user of the interaction system 100 (e.g., in this example, "Sally") and the user input content image 1102 (e.g., a selfie captured in by the active user using the remix camera 1108 or selected from a camera roll of a mobile device), to create a combined user input content item. In this example, the combined user input content item is in the form of a combined image 1202 (see FIG. 12, which is described below).

FIG. 12 is a further user interface diagram showing the reply camera interface 1104 with the combined image 1202.

As shown in FIG. 12, the reply camera interface 1104 may also include a set of layout graphic elements 1204, each of which is user-selectable to apply a different layout to the combination of the third-party image 604 and the user input content image 1102. Each of the layout options associated with a respective layout graphic element 1204 may allocate a certain section of an interface canvas to each of the images or may define a layout of the images relative to each other. The same layout options may be applied to, or available in respect of, still images and video content. (In some examples, a combined user input content item may include a still image combined with video content and various layout options may likewise be available.)

The combined image 1202 in FIG. 12 utilizes a layout option in terms of which the active user's image is overlaid onto the third-party image 604 (the latter essentially becoming a background image). Another example may be a "divided screen remix," in which the active user's image is shown in a first section or block, and the third-party image 604 is shown in a second section or block, separate from the first section or block within the interface.

The reply camera interface 1104 also includes a reply graphic element 1110 that provides contextual information regarding the combination function (e.g., in this example, indicating that the active user is creating the combined image 1202 intended for a reply to the third-party user "Sally"). The reply graphic element 1110 may also be user-selectable to invoke the messaging system 212 of the interaction system 100 and conveniently enable the active user to transmit (e.g., by way of a message or publication to a feed) the combined image 1202 to the third party user (e.g., "Sally") by way of a "reply" to the third party's publication of the third-party image 604.

The combination function provided by the media application may thus include a reply function to enable the user to transmit a combined user input content item to a third-party user of the media application by way of reply to a transmission of the third-party user input content item.

FIG. 13 to FIG. 16 show user interface diagrams representing a series of user interfaces 1302 in sequence, according to some examples. Here, when a user selects a camera button 602 (FIG. 13), the augmentation carousel 1502 is not automatically generated and caused to be presented within the user interface 1302.

Rather, a carousel icon 1402 is displayed adjacent to a central (and preselected) image capture graphical element 1404, which is user-selectable to capture an image using a camera of the mobile device 114. This carousel icon 1402 is shown in FIG. 14.

The carousel icon 1402 is user-selectable to generate display of an augmentation carousel 1502, as shown in FIG. 15, in which the remix camera 1504, or combination graphical element, is a first content augmentation option (e.g., "lens") presented within the sequence of augmentation options of the augmentation carousel 1502.

As shown in FIG. 14 to FIG. 16, a reply graphic element 1406, as described elsewhere, is provided in an upper region of the user interface 1302.

The user is also provided with various options in terms of laying out the two content items relative to each other, accessible via the layout graphic elements 1602, as described elsewhere, and displayed according to some examples in FIG. 16.

Figure 17:
FIG. 17 is a user interface diagram illustrating aspects relating to combined user input content items in accordance with some examples.

FIG. 17 is a user interface diagram showing a viewing user interface 1702, according to some examples, that is presented when an active, viewing user of the interaction client 106 views a third-party image 604. In this example, a tooltip 1704 is generated and caused to be displayed in conjunction with the remix button 1706 (in FIG. 17, this is a supplemented camera button). The tooltip 1704 may be displayed and presented when a user taps on the remix button 1706 or when the user initially views the third-party image 604. The tooltip 1704 may also be presented for a set time (e.g., between 2 and 10 seconds, and then disappear from the viewing user interface 1702) and may be presented to a user a set number of times (e.g., up to a maximum of three times) within any interaction session with the interaction client.

In some examples, if a user is viewing a user input content item such as a third-party image that has an augmentation applied to it (e.g., a lens, filter, or other augmentation applied to the third-party image), the user may wish to apply the same augmentation, but this may require a number of manual steps/selections. One example technical problem of automatically providing access to a camera function together with a content combination function and/or content augmentation function, e.g., an augmentation function allowing the viewing user to access and automatically apply the same augmentation as applied to a third-party image, may be addressed by a method and system according to examples of the present disclosure, which provides an improved reply camera function. A camera button is user-selectable to trigger a function (e.g., experience) that provides the ability for the viewing user conveniently to access and apply the same augmentation as applied to the third-party image to user input content items. According to some examples, a viewing user interface includes an interaction zone that provides a top-level camera button displayed concurrently with digital content, e.g., a user input content item, also displayed within the context of the viewing user interface. The camera button is supplemented or modified to indicate user selection of the camera button triggers a specific function (e.g., an "experience" such as a remix experience or a lens experience). The camera button may be supplemented or modified in various ways, including highlighting the camera button with an appropriate thumbnail image (e.g., a lens thumbnail image or a remix thumbnail image) associated with a function or user experience that is invoked responsive to selection of the modified camera button. Selection of the modified camera button invokes that associated function, in addition to opening of a modular reply camera. In other words, according to some examples, user selection of the modified camera button invokes both a camera function (e.g., a "reply" camera function which is a camera function within the broader context of a reply before applying to a user input content item posted by a third party) as well as a further function for use with the camera function (e.g., a content combination function or a content augmentation function).

Figure 18:
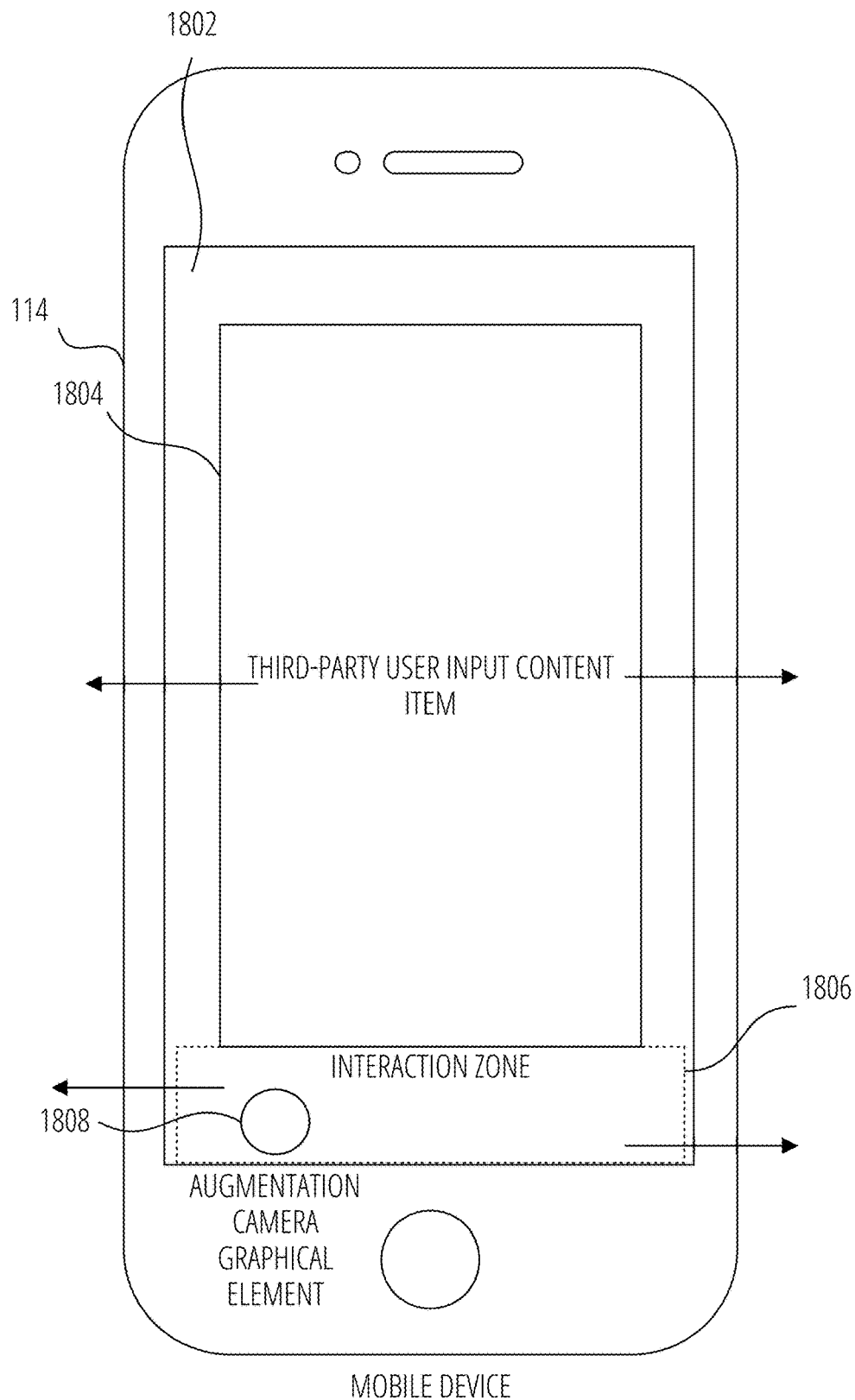
FIG. 18 is a user interface diagram illustrating aspects relating to augmentation of user input content items in accordance with some examples.

FIG. 18 is a user interface diagram depicting a viewing user interface 1802, according to some examples, that may be presented by an interaction client 106, in the example form of a media application, executing on the mobile device 114. While the viewing user interface 1802 is described as being presented on the screen of the mobile device 114, the viewing user interface 1802 may also be presented on the optical display of a head-wearable apparatus 116 or other wearable apparatus presenting a user interface, e.g., "smart contact lenses" or similar technology.

The viewing user interface 1802 displays a third-party user input content item 1804, which, in some examples, may be part of a collection of third-party user input content items generated and published by a third-party user of the interaction system 100. The third-party user input content item 1804 may comprise image data, video data, audio data, or one or more content data comprising a combination of these data types, together with augmentation or modification data (e.g., stickers, filters or lenses).

The viewing user interface 1802 includes an interaction zone 1806 that includes an augmentation camera graphical element 1808 (e.g., a user-selectable camera button 2102) that is user-selectable to invoke a reply camera function that enables a user to respond to the publication of the third-party user input content item 1804 by a third-party user. This response may include a user input content item (e.g., a digital image captured using the camera of the mobile device 114). Additionally, the invoked reply camera function may enable the user to augment the user input content item that the user wishes to add or include with an augmentation that is applied to the third-party user input content item 1804. To this end, user selection of the augmentation camera graphical element 1808 causes display of a camera user interface 1902, as shown in FIG. 19, as part of the reply camera function.

Figure 19:
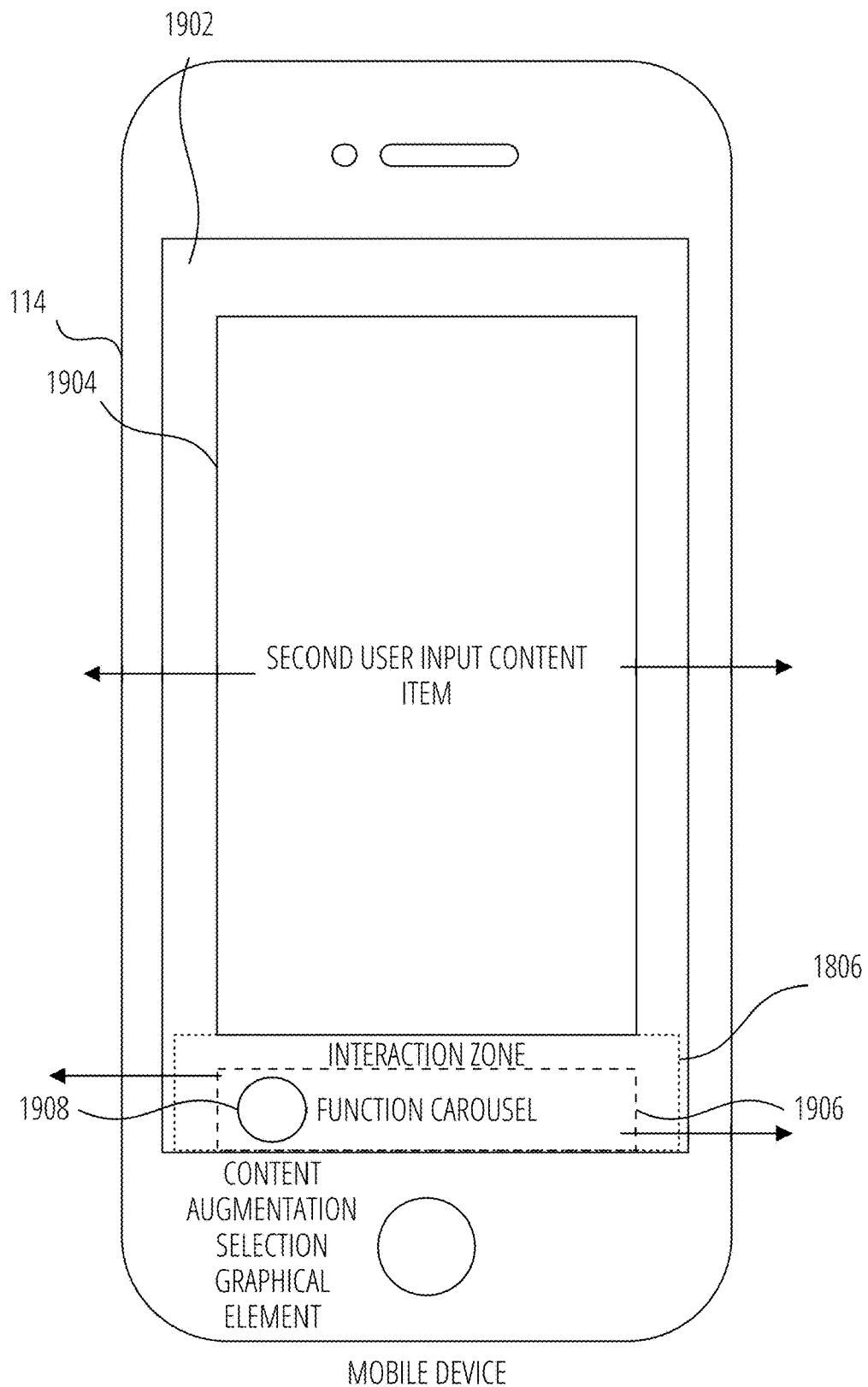
FIG. 19 is a user interface diagram illustrating aspects relating to augmentation of user input content items in accordance with some examples.

FIG. 19 is a user interface diagram depicting the camera user interface 1902, according to some examples, that may be presented by an interaction client 106, in the example form of a media application, executing on the mobile device 114. The camera user interface 1902 may present a real-time feed from the camera of the mobile device 114, which the user can then capture as a still digital image or a digital video by selecting an appropriate button within an interaction zone 1806 of the camera user interface 1902.

The camera user interface 1902 displays a second user input content item 1904, such as, for example, a digital image or digital video captured by the camera of the mobile device 114. The second user input content item 1904 may comprise image data, video data, audio data, or a combination of these data types, together with augmentation or modification data (e.g., stickers, filters or lenses).

The camera user interface 1902 also includes an interaction zone 1806 with a function or tools section, in the example form of a function carousel 1906. The function carousel 1906 presents various tools and functions that may be invoked by a user of the mobile device 114 to interact with other users of the interaction system 100, to interact with content made accessible via the interaction system 100, and also to modify a captured second user input content item 1904 displayed within the camera user interface 1902. The interaction zone 1806 includes a content augmentation selection graphical element 1908 (e.g., a user-selectable icon) that is user-selectable to invoke an augmentation function from a collection of augmentation functions. A selected augmentation function may then operate to augment or modify the second user input content item 1904.

Figure 20:
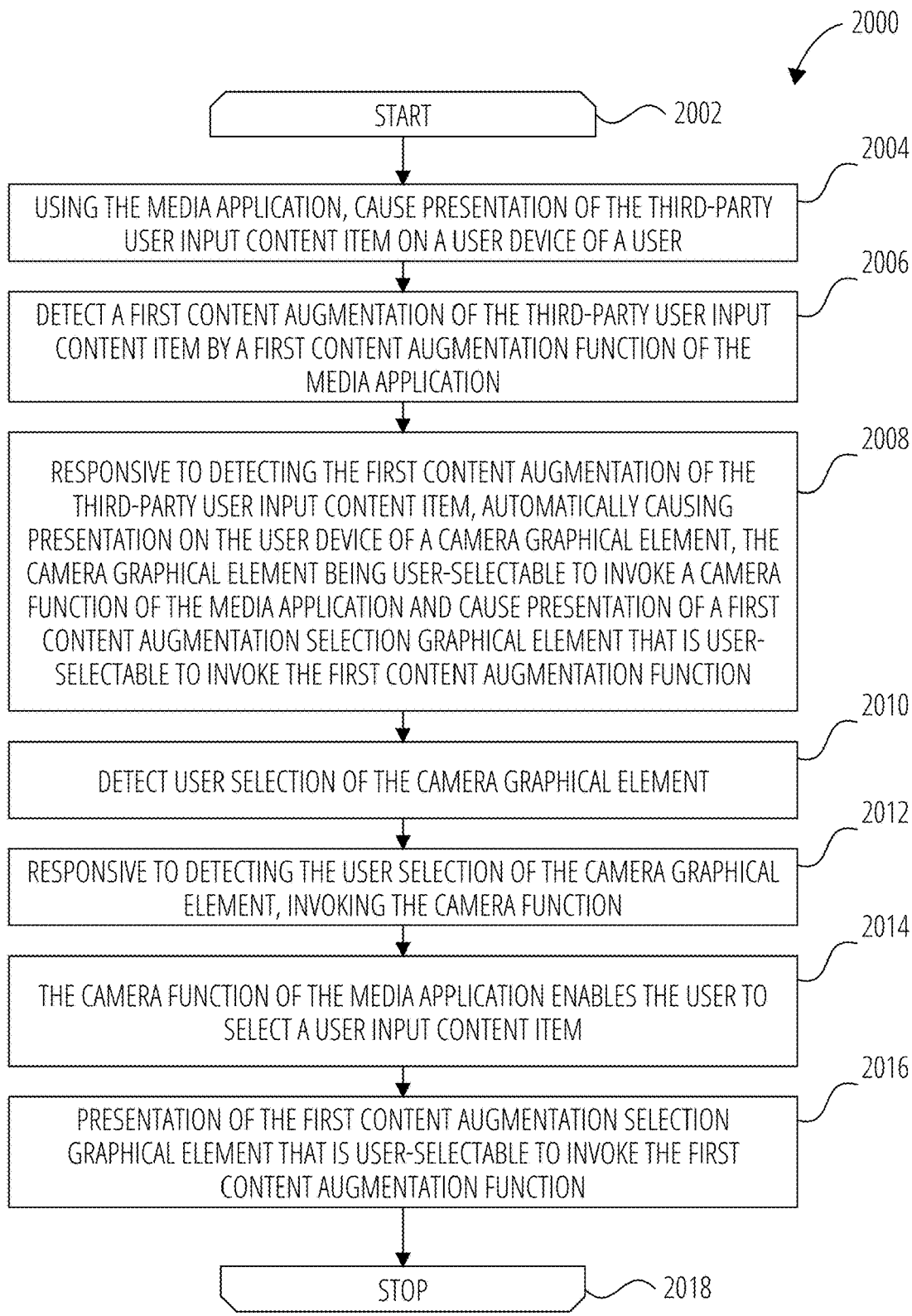
FIG. 20 is a flow diagram illustrating a method including aspects relating to augmentation of user input content items, in accordance with some examples.

FIG. 20 is a flowchart illustrating a method 2000, according to some examples, to enable an active, viewing user of the interaction system 100 to apply a content augmentation, previously applied to a third-party user input content item by a third-party user, to a content item of the active user.

The method 2000 commences at opening loop block 2002 and then progresses to block 2004 with a media application, in the example form of the interaction client 106 of the interaction system 100, causing presentation of a third-party user input content item 1804 within the viewing user interface 1802 of the mobile device 114. The third-party user input content item 1804 may be part of a set or collection of third-party user input content items that are published by a third-party user of the interaction system 100. In such examples, an active user of the interaction client 106 is enabled, within the context of the viewing user interface 1802, to scroll in both backward and forward directions through the collection of third-party user input content items, or to automatically or manually advance the display of the back of third-party user input content items.

At block 2006, the augmentation system 208 of the interaction system 100 detects or determines a first content augmentation of the third-party user input content item 1804, the first content augmentation being the output of a first content augmentation function of the interaction system 100. As described above, the augmentation system 208 may provide a number of augmentation or modification functions that a user can invoke to augment a digital content item. The particular first content augmentation (e.g., a particular filter or lens) that is applied to the third-party user input content item 1804 (e.g., a digital image published on the interaction system 100 by the third party) may be identifiable from metadata associated with the third-party user input content item, and that is accessed and read by the augmentation system 208 at block 2006. The content augmentation function detected may, for example, be an image lens function or an image filter function.

At block 2008, and responsive to determining or detecting the first content augmentation at block 2006, the interaction client 106 automatically (e.g., without specific user invocation, or without user action on the user interface of the media application) causes presentation or display, on the mobile device 114, of the augmentation camera graphical element 1808. The augmentation camera graphical element 1808 is user-selectable to invoke a reply camera function of the interaction client 106 and further to cause presentation of the content augmentation selection graphical element 1908 that is user-selectable to invoke an associated first content augmentation function (e.g., the specific augmentation that was detected as having been applied to the third content item at block 2006).

At block 2010, the interaction client 106 detects or determines user selection of the augmentation camera graphical element 1808, which then invokes, at block 2012, a camera function of the interaction client 106. At block 2014, the camera function enables the user to select or capture a user input content item (this may be referred to as the "second user input content item," with the third-party user input content item being the "first"), and at block 2016, causes the presentation of a content augmentation selection graphical element 1908. The camera function, as noted with respect to FIG. 19, presents the camera user interface 1902 that allows the active user to capture and select the second user input content item 1904 by the selection of a capture icon within the interaction zone 1806. Further, the content augmentation selection graphical element 1908 is presented within the function carousel 1906 of the interaction zone 1806 of the camera user interface 1902. The content augmentation selection graphical element 1908, in the example form of a lens icon, corresponds to the first content augmentation of the third-party user input content item, detected at block 2006. User selection of the content augmentation selection graphical element 1908, which is associated with a particular augmentation function (e.g., lens) of the interaction client 106 within the camera user interface 1902, invokes the associated augmentation function, and conveniently allows the active user to apply the relevant augmentation to the second user input content item 1904 within the context of the camera user interface 1902.

Where multiple augmentations are applied to the third-party user input content item 1804, each of these content augmentations may be detected by the augmentation system 208 of the interaction system 100, in which case multiple content augmentation selection graphical elements 1908, corresponding to the detected multiple augmentations, may be presented within the function carousel 1906 for user selection to conveniently and selectively apply each of these multiple augmentations to the second user input content item 1904. The method 2000 then concludes at closing loop block 2018.

Figure 21:
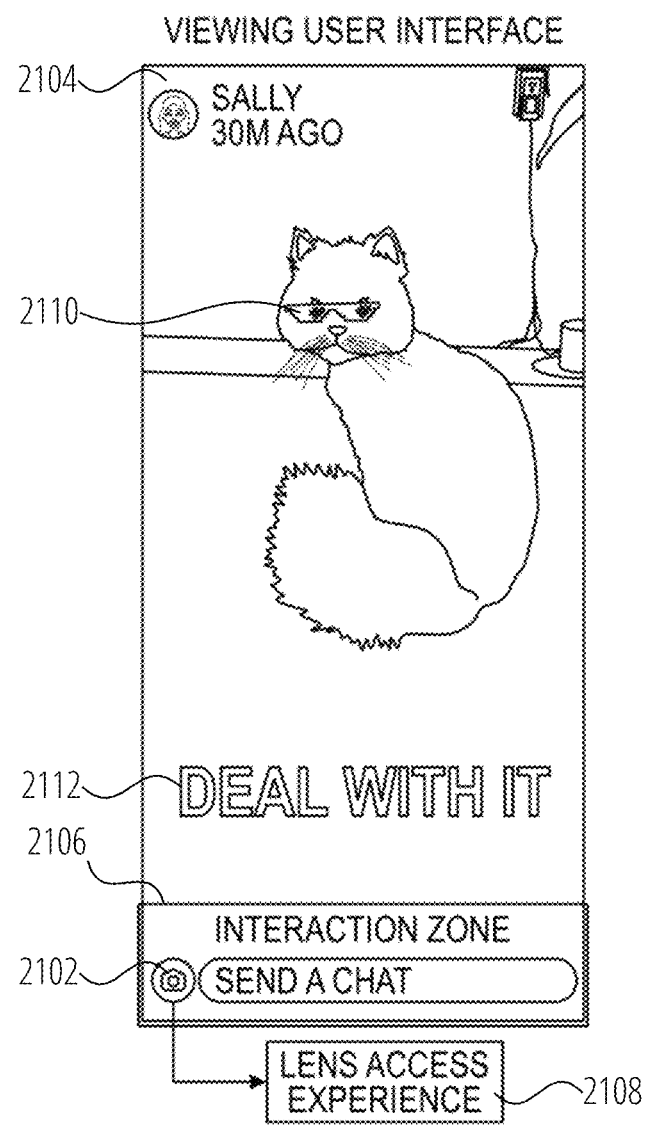
FIG. 21 is a user interface diagram illustrating aspects relating to augmentation of user input content items in accordance with some examples.

FIG. 21 is a user interface diagram, showing a viewing user interface 2104, according to some examples. The viewing user interface 2104 shows a photograph of a cat, with an augmentation in the form of a lens applied to it. The lens overlays a first augmentation 2110 in the form of sunglasses onto the eyes of the cat and adds a second augmentation 2112 in the form of the words "DEAL WITH IT" as an overlay onto the image.

The viewing user interface 2104 has an interaction zone 2106 including a camera graphical element in the example form of a camera button 2102. The camera button 2102 invokes a lens access experience 2108 (as is diagrammatically illustrated in FIG. 21), whereby an active user of the interaction client 106 can apply a lens (e.g., the sunglasses lens with the words "DEAL WITH IT", as shown in FIG. 21), as applied to the third-party user input content item (e.g., the cat photo), to another, second user input content item, such as a digital image captured by the active user using a camera function of the interaction client 106.

Accordingly, user selection of the camera button 2102 opens a modular reply camera of the interaction client 106 within which the sunglasses and associated text lens is preselected, or presented for convenient user selection, for application to another content item.

In FIG. 21, the two augmentations 2110, 2112 are applied as part of the same lens. However, it will be appreciated that, for example, the sunglasses augmentation and the "DEAL WITH IT" text augmentation may be two separate lenses, in which case they may be presented separately for convenient user selection (the user may wish to select only one of the lenses, for example).

Figure 22:
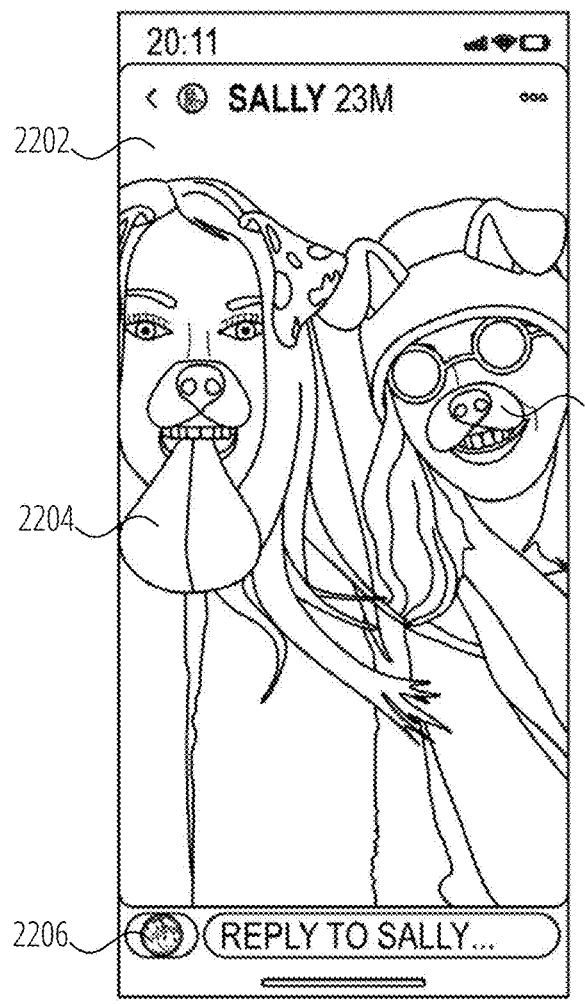
FIG. 22 is a user interface diagram illustrating aspects relating to augmentation of user input content items in accordance with some examples.

FIG. 22 is a user interface diagram illustrating a viewing user interface 2202, according to some examples. FIG. 22 illustrates an example in which an augmentation 2204, in the example form of a lens, is detected as having been applied to a third-party user input content item within the viewing user interface 2202 (in FIG. 22, the lens was applied to overlay "dog features" on the faces and heads of the individuals shown in the image). Based on this detection, a modified camera button, in the form of lens button 2206 that identifies the detected lens, is generated and caused to be displayed within the interaction zone of the viewing user interface 2202.

In this example, the lens button 2206 is a lens thumbnail that alerts the user to the fact that selection of the lens button 2206 will activate the functionality described below. The lens thumbnail is therefore indicative of the content augmentation function that has been used by the third party.

Figure 23:
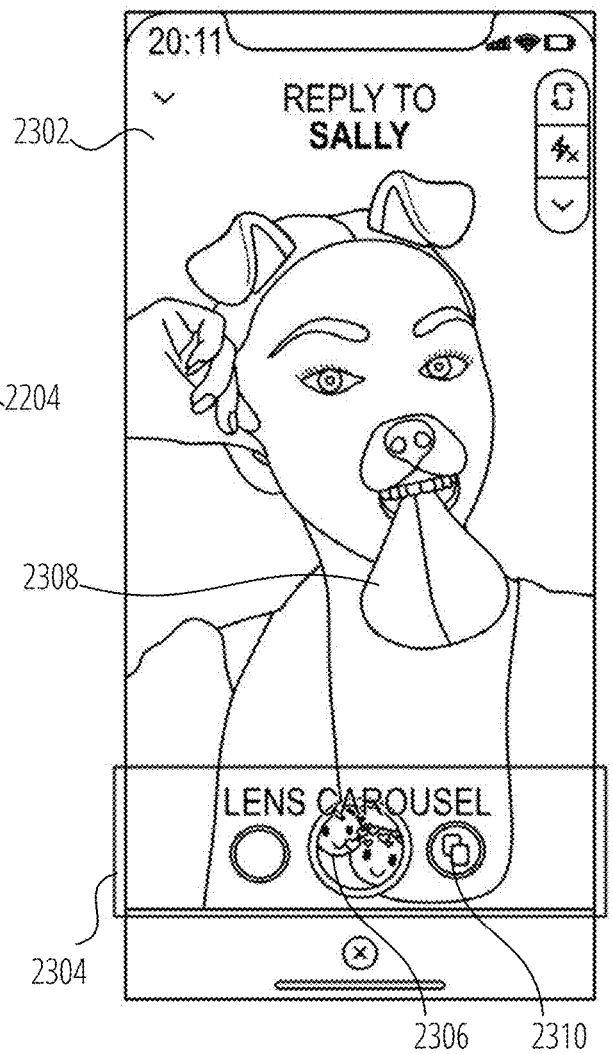
FIG. 23 is a user interface diagram illustrating aspects relating to augmentation of user input content items in accordance with some examples.

Turning now to FIG. 23, which shows a reply camera user interface 2302, user selection of the lens button 2206 within the viewing user interface 2202 invokes a lens access function, in terms of which a modular reply camera function is activated that causes the display of the reply camera user interface 2302. The reply camera user interface 2302 includes, within the interaction zone, a lens carousel 2304 (augmentation carousel) populated with a scrollable set of lens icons or buttons, including a lens button 2306 corresponding to the lens detected as having been applied to the third-party user input content item (the image shown in FIG. 22). In this example, the lens button 2306 is preselected and the associated augmentation (e.g., the augmentation 2308) is automatically applied to a user input content item displayed within the reply camera user interface 2302. Specifically, as shown in FIG. 22, the augmentation 2204 is a dog filter applied to the humans in the image, and in FIG. 23, the augmentation 2308 is also the dog filter, in that case applied to the single human shown in the camera user interface 2302. In some examples, the content augmentation function used by the third party may thus be preselected in the reply camera function, thereby allowing for automatic creation of an augmented version of the second user input content item with the content augmentation detected as having been applied by the third party. This allows the user to conveniently and automatically access the same augmentation used by a third-party user of the interaction system 100

A remix button 2310 is shown in a second, adjacent position within the lens carousel 2304 and is user-selectable to invoke the remix function, as described elsewhere.

FIG. 24 is a user interface diagram illustrating a viewing user interface 2402, according to some examples. FIG. 24 illustrates an example in which an augmentation 2404, in the example form of a lens, is detected as having been applied to a third-party user input content item within the viewing user interface 2402. In FIG. 24, the lens is a dog filter. Based on this detection, a modified camera button in the example form of the lens button 2206, which corresponds to the detected lens, is generated and caused to be displayed within the interaction zone of the viewing user interface 2402.

The lens button 2206 may be a generic lens thumbnail or may be a thumbnail for the specific lens or augmentation detected as having been applied by the third party. For example, if the third-party user input content item is detected as including the dog filter, the lens button 2206 may be generated or adapted to graphically illustrate the dog filter, e.g., through a suitable thumbnail or dog image. In this way, a user may be more easily alerted to the option of applying the same augmentation as the augmentation used by the third party.

User selection of the lens button 2206 invokes a lens access function, in terms of which a modular reply camera is activated and which causes display of a reply camera user interface 2502.

FIG. 25 shows the reply camera user interface 2502, according to some examples. The reply camera user interface 2502 includes, within the interaction zone, a lens carousel 2504 that is automatically presented and is populated with a scrollable set of lens icons or buttons including a lens button 2506 and a remix button 2508. A standard camera capture button 2510 is preselected. In this example, no lens or augmentation is preselected, and the lens button 2506 is displayed in a first position and the remix button 2508 is displayed in a second position within the lens carousel 2504.

As described above, the remix button 2508 will only be displayed if the third-party user input content item of the viewing user interface 2402 is appropriately permissioned for use in creating a combined user input content item (e.g., is authorized by the third-party content creator for use in a remix function).

In addition to allowing the user to conveniently use the lens or augmentation used by the third party, the modular reply camera interface may thus also include (e.g., in its augmentation or lens carousel) a combination graphical element. The combination graphical element (e.g., remix button 2508) is user-selectable to invoke the combination function, or "remix" function, as described elsewhere.

FIG. 26 is a user interface diagram illustrating a viewing user interface 2602, according to some examples. FIG. 26 illustrates an example in which an augmentation 2604, in the example form of a lens, is detected as having been applied to a third-party user input content item within the viewing user interface 2402. Based on this detection, a modified camera button in the example form of the lens button 2206, which corresponds to and identifies the detected lens, is generated and caused to be displayed within the interaction zone of the viewing user interface 2602.

While examples herein refer to augmentations such as lenses applied to digital images or videos, it should be appreciated that "augmentation" may also, in some examples, refer to an audio item added to content. For example, a viewing user may select a third-party user input content item comprising an audio item (e.g., a specific song linked to an image or video clip), and use the modified camera button to combine the audio item with, or add the audio item to, a user input content item selected or created by the user.

Turning to the user interface diagram shown in FIG. 27, user selection of the lens button 2206 in FIG. 26 invokes a lens access function, in terms of which a modular reply camera is activated and which causes display of the reply camera user interface 2704. The reply camera user interface 2704 includes, within the interaction zone, a lens carousel 2706 that is automatically presented and is populated with a scrollable set of lens icons or buttons including a lens button 2708 and a remix button 2710. In this example, in addition to determining the augmentation 2604 applied to the third-party user input content item, third-party authorization for use of the third-party user input content item in the generation of a combined user input content item is also detected. Here, the remix button 2710 is automatically preselected and a corresponding remix function (also referred to as a combination function) is applied to the third-party user input content item and a user-selected content item to display a combined user input content item within the reply camera user interface 2704. The user may then scroll the lens carousel 2706 and select the lens button 2708 to apply the corresponding lens to the combined user input content item displayed within the reply camera user interface 2704.

It will be noted that the reply camera user interface 2704 also includes a reply graphical element 2712 (indicated by the words "REPLY TO SALLY") that is user-selectable to invoke a reply messaging function whereby the combined user input content item, displayed within the camera user interface 2704 may be communicated to the third-party user that generated and published the third-party user input content item displayed within the viewing user interface 2602. Example messaging functionality is described with reference to the messaging system 212. A set of layout graphic elements 2702, as described above, is also displayed in FIG. 27.

A user of a media application may wish to create combined and/or augmented user input content items in a preview state, prior to sharing the items with other users. However, a media application may only permit a user to combine and/or augment certain items after sharing or publication has occurred. Alternatively, if available, such combination and/or augmentation may involve numerous manual steps or selections. One example technical problem of providing switchable, or iterative, preview and combination/augmentation states on a computer apparatus may be addressed by providing user interfaces that allow the user to combine, contrast or augment multiple user input content items, according to examples of the present disclosure.

According to some examples, there are provided methods and systems to enable the combining (e.g., re-mixing) of user input content items within a series of interfaces that allows a user to combine different user input content items, generated by a single user or by multiple users of an interaction system, into a combined user input content item. For example, users may be able to augment, contrast or contextualize a first user input content item with a second user input content item, or even multiple user input content items, by switching between a preview interface and a combination interface any number of times before publishing a combined user input content item.

Figure 28:
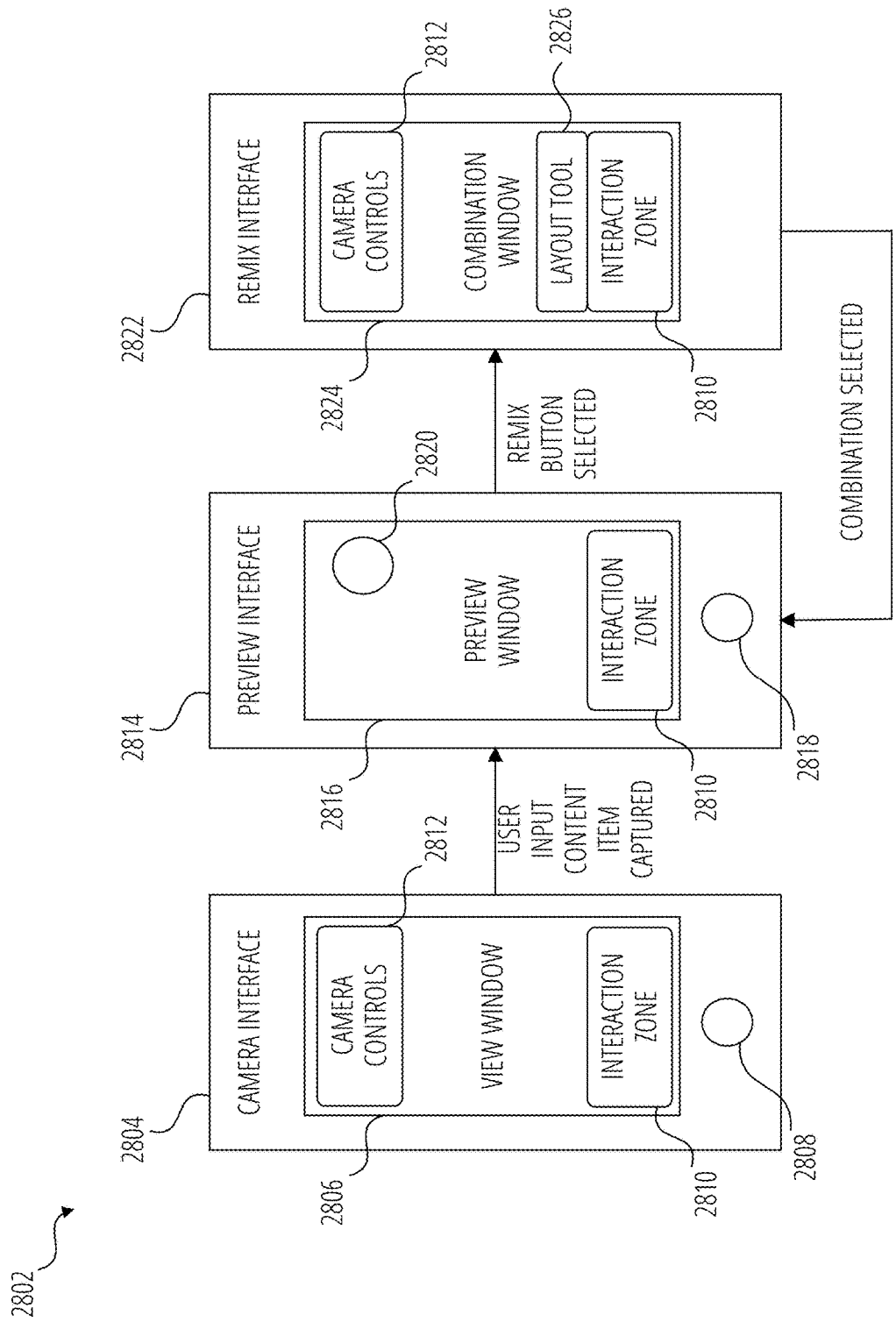
FIG. 28 is a user interface sequence diagram illustrating aspects relating to combined user input content items in accordance with some examples.

FIG. 28 is an interface sequence diagram showing a sequence 2802 of interfaces, according to some examples, that may be presented by an interaction client 106 hosted on and executed by a user system 104.

The sequence 2802 includes a camera interface 2804 that enables a user of the user system 104 to create a user input content item in the example forms of a digital image or a digital video. Specifically, the camera interface 2804 is presented by a camera system 204 of the interaction system 100, and presents a view and capture mechanism. The view and capture mechanism includes a view window 2806 that presents a user with a live image feed from any one of multiple cameras of the user system 104 and a capture button 2808 that is user-selectable to allow the user to capture one or more images from the image feed as a digital image or a digital video. An interaction zone 2810 presents a number of augmentations or modifications, supported by the augmentation system 208, that can be applied in real-time to digital images presented within the view window 2806. The camera interface 2804 also presents a number of camera controls 2812 related to the capture of a user input content item, such as a camera selection mechanism, a flash activation mechanism, etc.

The preview interface 2814 is likewise presented, by the camera system 204 of the interaction system 100, post-capture of a user input content item. In some examples, the user input content item may be selected from a media library or file storage and may be presented via the preview interface 2814 without the user having captured the user input content using a camera (or the user having captured or created the user input content item at an earlier point in time and stored the item for later use). The preview interface 2814 presents a preview of a captured or selected user input content item in a preview window 2816. A preview interface may present a content item to the user for viewing, modification and/or augmentation prior to finalization and sharing of the content item, e.g., to a content collection of the user accessible to third parties, to a third-party user via a direct message, to a shared content collection, or to a public content collection.

The interaction zone 2810 presents multiple tools (e.g., of the augmentation system 208) to enable a user to augment or otherwise modify the user input content item to generate an augmented user input content item. The preview interface 2814 also presents a transmit button 2818 to invoke the communication system 210 of the interaction system 100 and transmit the user input content item presented within the preview window 2816 using the communication system 210 of the interaction system 100. The preview interface 2814 also includes a remix button 2820 that is user-selectable to invoke a content combination function supported by a remix system 206, which is a subsystem of the camera system 204.

The remix interface 2822 (also referred to as a combination interface) is also presented by the camera system 204, and specifically the remix system 206, to enable a user to capture a supplemental user input content item and combine the supplemental user input content item with a previously captured user input content item to generate a combined user input content item within a combination window 2824. The remix interface 2822 presents various layout tools 2826 for laying out multiple user input content items relative to each other and within certain layouts, as well as a number of the camera controls 2812. An interaction zone 2810 of the combination window 2824 presents various augmentation and modification tools that may be applied to combined content within the context of the remix interface 2822.

In some examples, once a combined user input content item has been created, the user may be presented with the preview interface 2814 again, showing the combined user input content item, and enabling the user to combine the combined user input content item with a further user input content item to create a further combined user input content item. For example, instead of selecting the transmit button 2818 in the preview state, the user can select the remix button 2820 to switch back to the remix interface 2822 and further "remix" the content.

Figure 30:
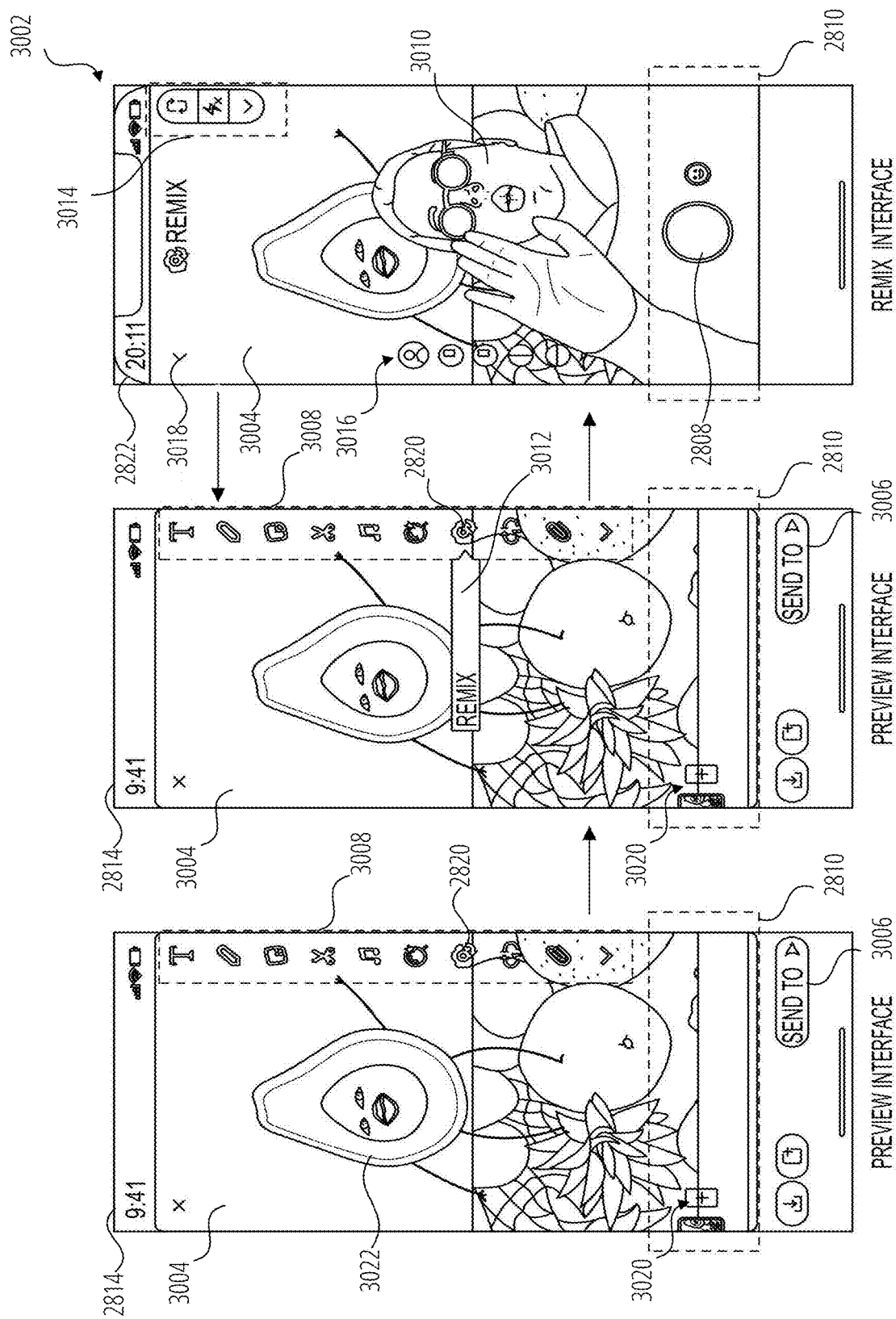
FIG. 30 is a user interface sequence diagram illustrating aspects relating to combined user input content items in accordance with some examples.

Further details regarding some examples of interfaces of FIG. 28 are discussed with respect to FIG. 30.

Figure 29:
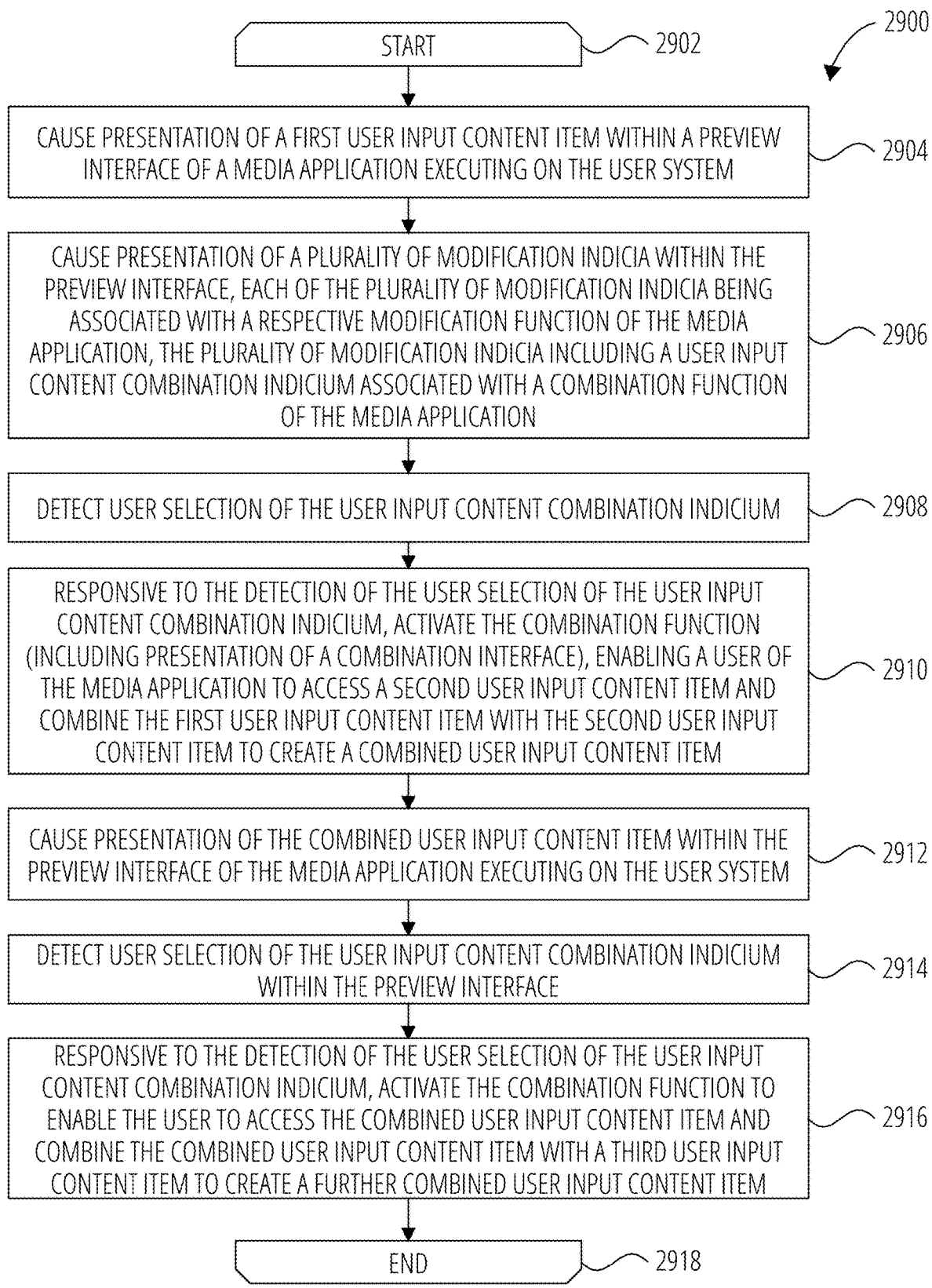
FIG. 29 is a flow diagram illustrating a method including aspects relating to a combination function of a media application, in accordance with some examples.

FIG. 29 is a flowchart illustrating a method 2900, according to some examples, to facilitate the generation of a combined user input content item. While some examples are described with reference to user input content items, disclosures are broadly applicable to other types of digital content. The method 2900, in some examples, is performed by various components of the interaction system 100 described with reference to FIG. 1.

The method 2900 commences at opening loop block 2902, and progresses to block 2904, where the user system 104, and specifically the interaction client 106 (as an example of a media application), causes the presentation of the preview interface 2814, including a first user input content item (e.g., the first digital image 3004). As noted with respect to FIG. 28, the first digital image 3004 may have been captured using camera interface 2804 of the interaction client 106, and then presented within the preview interface 2814 following an image or video capture operation performed by a user via the camera interface 2804.

The interaction client 106 provides a camera function supported by the camera system 204, which causes the presentation of the camera interface 2804. Within the camera interface 2804, a digital image feed, from one or more cameras of the user system 104 (e.g., of a mobile device 114, head-wearable apparatus 116 and/or computer device 118) is displayed within the view window 2806. A captured input is received responsive to user selection of the capture button 2808 within the camera interface 2804, responsive to which the first digital image 3004 may be captured as an example of the first user input content item. The first digital image 3004 is then stored either locally or remotely so as to be accessible by the interaction client 106.

The preview interface is a user interface presented to the user of the media application prior to any transmission of the content item (shown in the preview interface) to third-party users of the media application, and prior to any sharing of that content item with third-party users. In some examples, when the user is viewing the relevant content in a preview mode, or preview state, the content has not been finalized or submitted/approved for publication and can only be viewed by the user.

From block 2904, the method 2900 progresses to block 2906, where the interaction client 106 causes the presentation of a number of modification indicia (e.g., the creative tools 3008 shown in FIG. 30) within the preview interface 2814. As noted with respect to FIG. 30, each of the creative tools 3008 is associated with a respective modification function of the interaction client 106. Further, the creative tools 3008 include a user input content combination indicium (also referred to as a combination graphical element) in the form of the remix button 2820 that is associated with a user input content combination function (e.g., a "remix" function) of the interaction system 100.

At block 2908, the interaction system 100 detects user selection of the remix button 2820 and, at block 2910, responsive to the detection of the user selection of the remix button 2820, activates the combination function (e.g., the remix function). The combination function, as noted herein, enables a user of the interaction client 106 to access a second user input content item (e.g., newly created digital content data, such as the second digital image 3010 shown in FIG. 30, or a stored digital content item selected from either local or remote storage accessible by the user system 104 and then displayed in the preview state). The combination function further enables the first user input content item (e.g., first content data in the form of the first digital image 3004) to be combined with the second user input content item (e.g., second content data in the form of the second digital image 3010) to create a combined user input content item (combined content data).

To this end, the user input content combination function may invoke a camera function provided by the camera system 204 of the interaction system 100, and enable the user to capture the second digital image 3010 from a digital image feed presented within the context of the remix interface 2822 (combination interface). The first digital image 3004 and the supplemental digital image feed may be concurrently or simultaneously presented within the remix interface 2822. User selection of the capture button within the remix interface 2822 then causes one or more digital images 3010 from the supplemental digital image feed to be captured as the second digital image 3010. At block 2912, the second digital image 3010 is displayed concurrently or simultaneously with the first digital image 3004 within the preview interface, subsequent to the capture, as the combined user input content item.

As noted above with respect to FIG. 28, a layout function may also be invoked by the combination function to enable a user to lay out the first digital image relative to the second digital image within the preview interface 2814. The layout function may enable a user to manually define or specify the relative positions and sizes, as well as other characteristics (e.g., augmentations), of the first digital image and the second digital image. The layout function may also present a number of predefined layouts, which specify relative positions and sizes of the first digital image and the second digital image within the combined user input content item. In addition to specifying relative positions and sizes, a particular layout may also automatically apply a number of other visual or audio features to the combined user input content item. For example, where a particular layout has a theme, visual characteristics (e.g., augmentations and supplemental images), and audio characteristics (e.g., sounds or songs) may be automatically applied to the combined user input content item.

Following presentation of the combined user input content item within the remix interface 2822 at block 2912, a user may then elect to return to the preview interface 2814, e.g., by the selection of the return arrow 3018 shown in FIG. 30. In some examples, the user may automatically be presented with the preview interface 2814 again without having to select a return element or perform a return user action. At block 2912, the user may, within the preview interface 2814, decide on the addition of a further user input content item (e.g., the creation and addition of a further video clip) to the combined user input content item. Accordingly, the user may select the remix button 2820 and cause the detection of user selection of that remix button 2820 at block 2914.

At block 2916, responsive to detection of user selection of the remix button 2820, the combination function may again be activated to present the remix interface 2822. In other words, the combination function may be reactivated for creating a further combined item. Within the context of the remix interface 2822, the user may access both the combined user input content item and a third user input content item (e.g., a newly captured digital image or digital video content item, captured within the context of the remix interface 2822 using the camera function), and combine the previously combined user input content item with the third user input content item to create a further combined user input content item (further combined content data). A user may thus continually loop between the preview and remix interfaces to create a number of digital user input content items that may be combined into a single item. According to some examples, a challenge of a user not being able to create and modify user content combinations containing multiple content items, e.g., before any publication or sharing thereof, can thus be addressed. The method 2900 then terminates at closing loop block 2918.

FIG. 30 is an interface sequence diagram showing a sequence 3002 of interfaces, according to some examples, that may be presented by an interaction client 106 hosted on and executed by a user system 104. The sequence 3002 of interfaces are some examples of the more general interfaces described with reference to FIG. 28. For the sake of simplicity, the functions of the preview interface 2814 and the remix interface 2822 are described with respect to digital images, which may comprise single or multiple still digital images or a sequence of digital images that constitute a digital video clip.

The sequence 3002 presents two views of the preview interface 2814, and a single view of a remix interface 2822. The first view of the preview interface 2814 shows a first digital content item, in the form of digital image 3004, that is displayed within the preview window 2816. The digital image 3004 may be a user input content item captured and created using the interaction client 106. In FIG. 30, the digital image comprises an original digital image of fruit captured using the camera interface 2804, to which a "fruit" augmentation was applied, within the context of the camera interface 2804 or the preview interface 2814, to create an augmented digital image in the form of the digital image 3004. The fruit augmentation 3022 has the effect of overlaying a character that resembles an avocado over the original image (photograph) of the fruit.

The preview interface 2814 has an interaction zone 2810 that presents a collection of augmentations that can be applied to the digital image 3004. The interaction zone 2810 also allows a user to select additional digital content to be included in a transmission to a receiving user of the interaction system 100 (e.g., by selection of the "plus" button in the media list 3020 before selection of transmission indicia in the form of the send button 3006).

A menu of user-selectable indicia for creative tools 3008 is displayed on the right-hand side of the preview interface 2814. These creative tools 3008 enable a user to perform various modifications to the digital image 3004 (e.g., adding text, drawing on, cropping, adding music to, and inverting). The menu also includes a user-selectable indicium in the form of a remix button 2820 that is user-selectable to invoke the remix system 206 and the remix interface 2822 (e.g., a modular remix camera) to provide the user with a combination function that allows the user to combine the digital image 3004 with a second content item, in the form of a second digital image 3010. As shown in the second preview interface 2814 in FIG. 30, a remix tooltip 3012 is displayed in conjunction with the remix button 2820 in order to inform a user regarding the functionality invoked by the remix button 2820 and to invite a user to "remix" digital content items (e.g., user input content items) to create a combined digital content item.

The remix interface 2822, also referred to as a combination interface, enables a user to capture the second digital image 3010 and presents both the first digital image 3004 and the second digital image 3010 in a layout configuration relative to each other. The second digital image 3010 may be captured within the context of the remix interface 2822 by user selection of a capture button 2808 presented within the interaction zone 2810. The interaction zone 2810 also presents a number of augmentations that can selectively be applied by a user to the second digital image 3010. The remix interface 2822 also includes a number of camera controls 3014 (e.g., flip camera, flash, etc.) that can be invoked for the capture of the second digital image 3010 within the context of the remix interface 2822.

The layout of the first digital image 3004 and the second digital image 3010 may be manually determined by a user (e.g., by dragging the digital images to relative positions within the remix interface 2822) or may be selected by a user from a number of preconfigured layouts 3016 presented by the layout tool 2826. The preconfigured layouts 3016 may include different split-screen layouts, picture-in-picture layouts, foreground/background layouts, and others, as described elsewhere.

The remix interface 2822 also includes a user-selectable return element in the example form of a return arrow 3018 that is user-selectable to return a user back to the preview interface 2814, with combined content created within the remix interface 2822. For example, having combined the first digital image 3004 with the second digital image 3010 within the remix interface 2822, a user may select the return arrow 3018. Responsive to the selection, the interaction client 106 returns displayed to the preview interface 2814, which then presents the combined digital image. A user may then again select the remix button and be returned to the remix interface 2822, where the user can generate or select third digital content to be combined with the previously combined content. In this way, a user can create a combination of multiple instances of user input content into a single instance or item of user input content. The provision of various augmentations that can be applied to discrete digital content components of a combined digital content item, as well as the provision of various layout options and functions, enables a user to find extensive creative expression using both user input content that is self-generated (or self-selected) and user input content obtained from other users of the interaction system 100 (or even from other sources).

Figure 31:
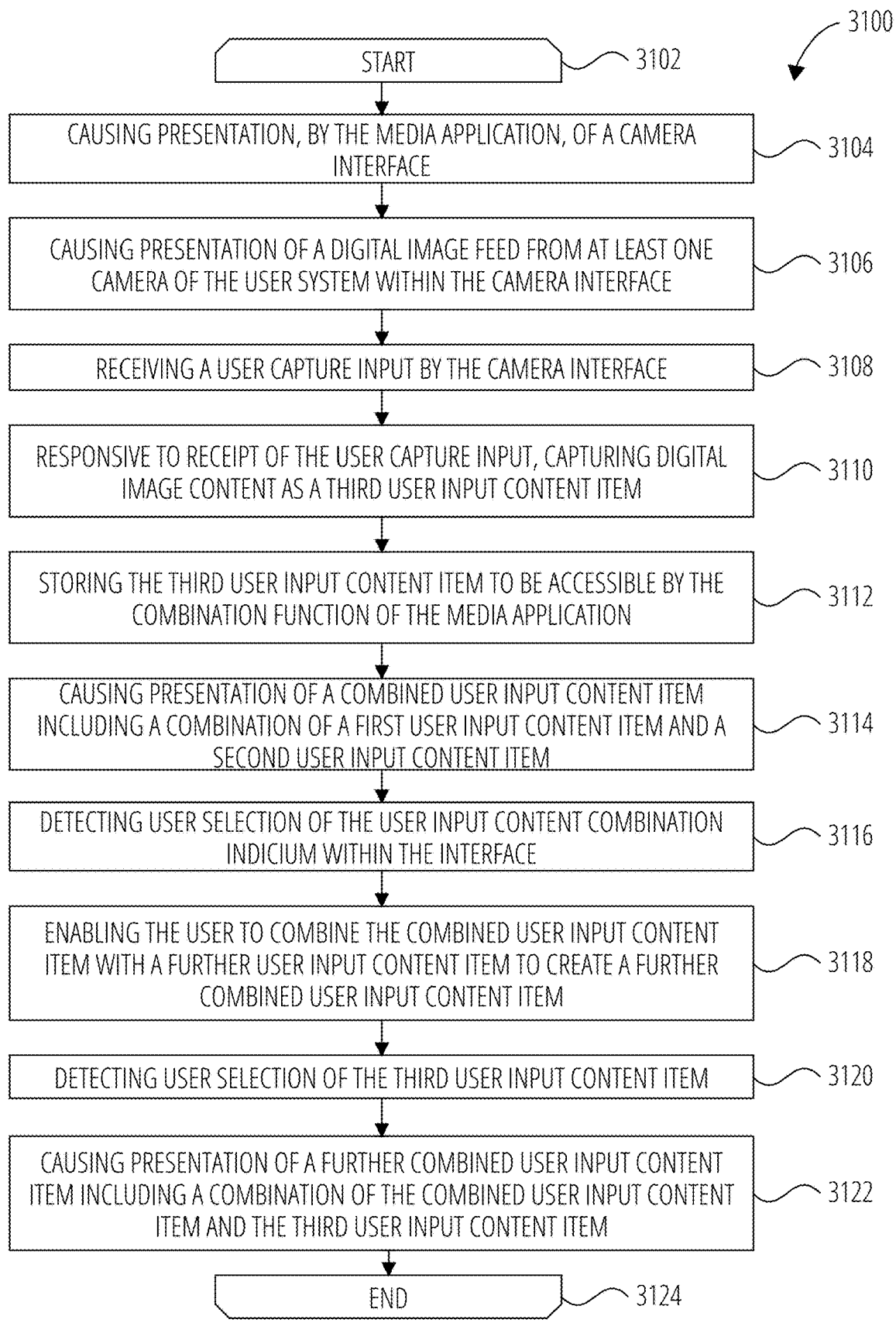
FIG. 31 is a flow diagram illustrating a method including aspects relating to a combination function of a media application, in accordance with some examples.

FIG. 31 is a flowchart illustrating a method 3100, according to some examples, to facilitate the generation of a further combined user input content item. The method 3100 commences at opening loop block 3102 and proceeds to block 3104, where the user system 104, and specifically the interaction client 106 (as an example of a media application), causes presentation of a camera interface.

At block 3106, a digital image feed is presented within the camera interface. The user then selects a camera button and the media application receives the corresponding user capture input at block 3108.

Responsive to receipt of the user capture input, according to some examples, the digital image content is captured as a third user input content item at block 3110. The method 3100 then proceeds to block 3112, where the third user input content item is stored by the user system 104, to be accessible by the combination function of the media application.

The user then uses the combination function of the media application to create a combined user input content item. This may be done according to examples described herein. The combined user input content item is a combination of a first user input content item and a second user input content item. For example, the combined user input content item may include a first user input content item as a background image with a second user input content item being overlaid over a portion of the first user input content item. The combined user input content item is presented to the user via a preview interface at block 3114. The preview interface includes a user input content combination indicium in the example form of a remix button, enabling the user to create a further combined user input content item.

At block 3116, the media application detects user selection of the user input content combination indicium within the preview interface. From block 3116, the method 3100 proceeds to block 3118, wherein the user input content combination function is activated. This may allow the user to add (e.g., overlay) the third user input content item to the combined user input content item to create a further combined user input content item.

According to some examples, the user then selects the third user input content item (e.g., from a file storage or media library) and the media application receives the selection at block 3120. The further combined user input content item is presented within the remix interface at block 3122. As described herein, according to some examples, the user may select a layout for the further combined user input content item or manually adjust the layout of the third user input content item relative to the combined user input content item.

The user may share the further combined user input content item with other users or, as described herein, and according to some examples, the user may combine the further combined user input content item with even further content items, e.g., to create an even further combined user input content item consisting of, for example, 4, 5, 6 or 7 different user input content items. The method concludes at closing loop block 3124.

Figure 32:
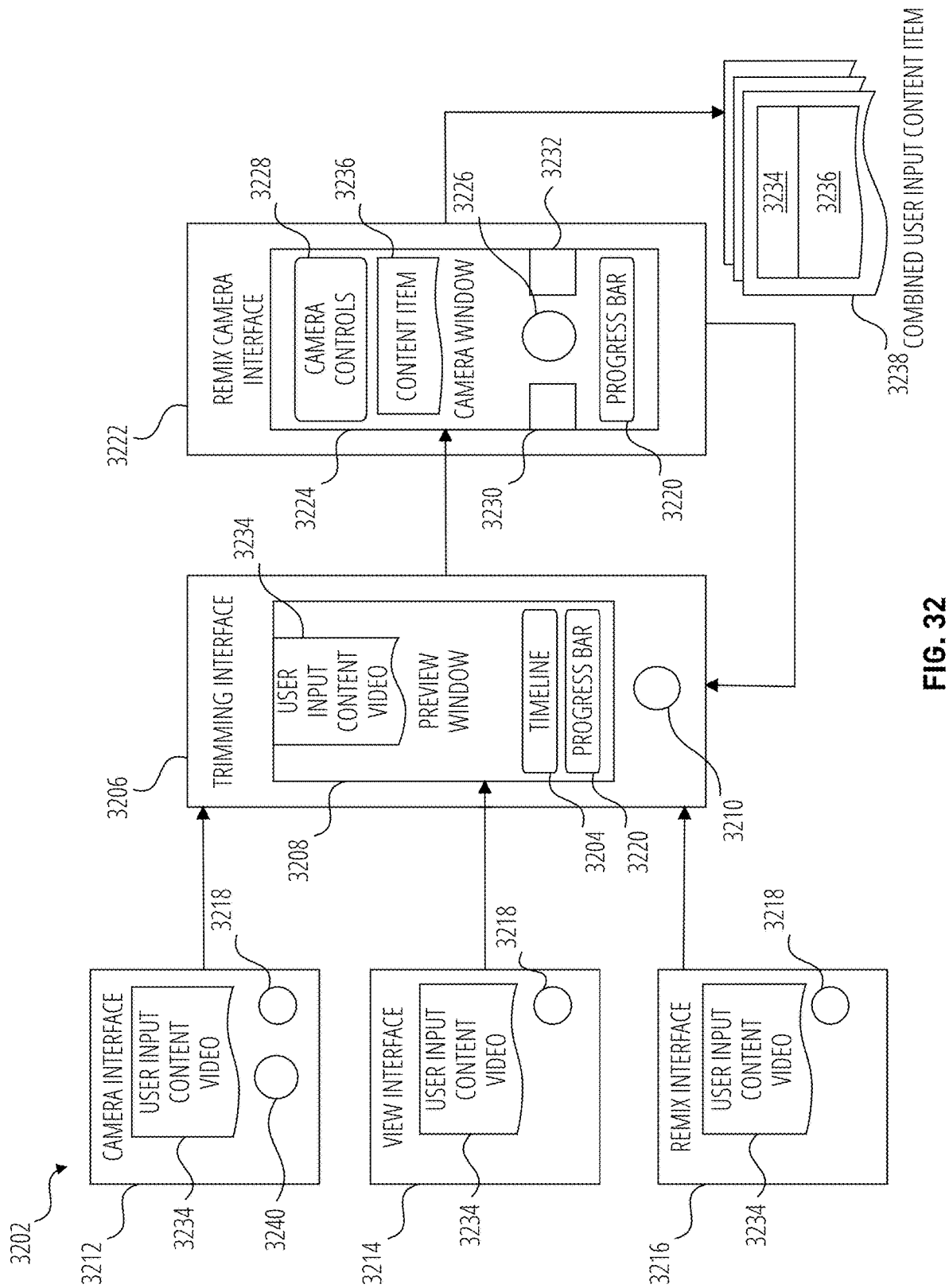
FIG. 32 is a user interface sequence diagram illustrating aspects relating to combined user input content items in accordance with some examples.

A user may wish to create a combined video item in a media application to share with other users. However, media application systems may be limited in terms of the ability to combine content items and/or the manner in which items can be combined. For example, a media application may be unable to provide a user with flexible temporal relationship selections in generating a combined video item from constituent portions. One example technical problem of providing a system that allows the user to augment, contrast or contextualize a first user input content item with a second user input content item or even multiple user input content items in a time-based manner, a spatially relative manner or a combination thereof, is addressed by a method and system according to examples of the present disclosure. According to some examples, there are provided methods and systems to enable the combining (e.g., re-mixing) of user input content items within a series of interfaces that allows a user to combine different user input content items generated by a single user or by multiple users of an interaction system, into a combined user input content item in a time-based manner, a spatially relative manner or a combination thereof. In some examples, the user can generate a combined user input content video based on one or more combination options, e.g., a specified temporal relationship between the content items forming the combined user input content video FIG. 32 is an interface sequence diagram showing a sequence 3202 of interfaces, according to some examples, that may be presented by an interaction client 106 (e.g., a media application) hosted on and executed by a user system 104.

The sequence 3202 shows a number of interfaces that allow the user, for example, to capture or access a user input content video 3234 and combine the user input content video 3234, or a portion thereof, with another content item. The interfaces include a camera interface 3212, a view interface 3214, and a remix interface 3216. Each of these interfaces provides specific functionality within the interaction client 106 and enables a user to capture, view, or modify a content item (e.g., user input content video 3234). Each of these multiple interfaces further includes a user input content combination indicium 3218, which is user selectable to invoke a combination function that presents the trimming interface 3206 and the remix camera interface 3222 also shown in FIG. 32. The user input content combination indicium 3218 may be in the form of a "remix" button, "add to" button, "combine" button, or the like.

The camera interface 3212 enables a user of the user system 104 to create a user input content item in the example forms of a digital image or a digital video. The user may also use the media application to add audio to the item, e.g., an audio track selected to play contemporaneously with a digital video.

The camera interface 3212 is presented by a camera system 204 of the interaction system 100, and presents a view and capture mechanism. Specifically, the view and capture mechanism includes a view window that presents a user with a live image feed from any one of multiple cameras of the user system 104 and a capture button 3240 that is user-selectable to allow the user to capture one or more images from the image feed as a digital image or a digital video. A timeline within the camera interface 3212 presents a number of augmentations or modifications, supported by the augmentation system 208, that can be applied in real-time to digital images presented within the view window of the camera interface 3212. The camera interface 3212 also presents a number of camera controls 3228 related to the capture of a user input content item, such as a camera selection mechanism, a flash activation mechanism, etc.

The view interface 3214 enables a user to view a content item (e.g., the user input content video 3234) retrieved from memory of the user system 104, where the content item is stored as a result of having been received in a message or publications stream from a further user of an interaction system 100, or as a result of having been previously captured by the user system 104 and stored in the memory.

The remix interface 3216 enables a user to combine multiple content items (e.g., user input content images, user input content videos, audio, augmented reality augmentations, etc.), some of which may have been received from a different user of the interaction system 100, to create a combined user input content item (e.g., a combined user input content video clip).

The remix interface 3216 is also presented by the camera system 204, and specifically the remix system 206, to enable a user to capture or select a supplemental user input content item and combine the supplemental user input content item with a previously captured or selected user input content item to generate a combined user input content item within a combination window. The remix interface 3216 presents various layout tools for spatially arranging (e.g., laying out or overlaying) multiple user input content items relative to each other and within certain predefined or freeform layouts, as well as a number of the camera controls. A remix interface 3216 also presents various augmentation and modification tools that may be applied to combined content within the context of the remix interface 3216. Further details regarding some examples of the interfaces of FIG. 32 are discussed with respect to subsequent figures.

The trimming interface 3206 is likewise presented, by the camera system 204 of the interaction system 100, post receipt, post selection, or post capture of a user input content item. The trimming interface 3206 presents a "preview" of a user input content item in a preview window 3208. A timeline 3204 presents multiple tools (e.g., of the augmentation system 208) to enable a user to augment or otherwise modify the user input content item to generate an augmented user input content item. The trimming interface 3206 also presents a check indicium 3210 to invoke the communication system 210 of the interaction system 100 and cause the user input content item to be presented within the remix camera interface 3222. The trimming interface 3206 also includes a remix button that is user-selectable to invoke a content combination function supported by a remix system 206, which is a subsystem of the camera system 204.

The remix camera interface 3222 enables a user to capture further digital content (e.g., content item 3236) and to add, append or otherwise "mix" the content item 3236 with the user input content video 3234 in order to create the combined user input content item 3238. The remix camera interface 3222 also includes a progress bar 3220 indicating the relative duration of each of the content items within the combined user input content item 3238 relative to each other and relative to an overall duration of the combined user input content item 3238. To enable the capture of further digital content, the remix camera interface 3222 includes a capture button 3226 presented in a camera window 3224. A media library selector 3230 enables a user to select and retrieve stored digital content, while an augmentation selector 3232 enables a user to select and apply any one of multiple augmentations to content portions of the combined user input content item 3238, either individually or in aggregate.

In some examples, and as described below with reference to FIG. 37 and FIG. 38, the sequence 3202 may also include a reordering interface 3802, enabling the user to adjust the order of two or more content items to appear in the combined user input content item.

Referring again to FIG. 32, the combined user input content item 3238 is then made available after creation within the remix camera interface 3222 for sharing (e.g., with other users of the interaction system 100).

Figure 33:
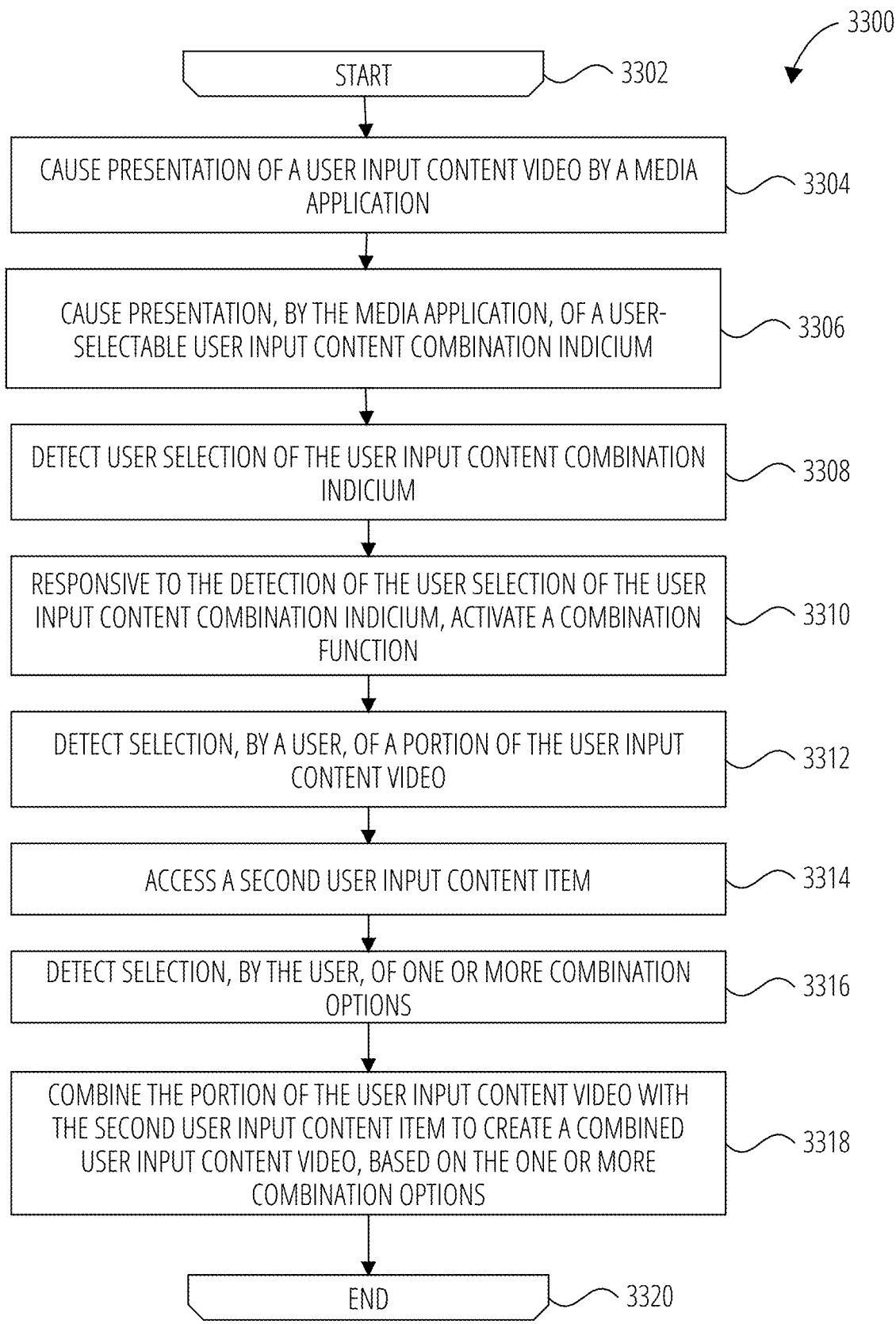
FIG. 33 is a flow diagram illustrating a method including aspects relating to a combination function, in accordance with some examples.

FIG. 33 is a flowchart that describes a method 3300, according to some examples. The method 3300 commences at block 3302 and progresses to block 3304, where, using at least one processor of the user system 104, the media application causes presentation of a user input content video 3234.

At block 3306, a user-selectable user input content combination indicium 3218 is presented by the media application and, at block 3308, the media application detects user selection of the user input content combination indicium.

Selection of the user input content combination indicium 3218 activates a user input content combination function (block 3310). The user input content combination function causes presentation of a timeline (see, for example, the timeline 3204 shown in FIG. 35) for the user input content video 3234 within the trimming interface 3206. The timeline 3204 permits the user to select a portion of the user input content video 3234.

At block 3312, the method 3300 comprises detecting selection of a portion of the user input content video 3234. This detection may include detecting a user action with respect to the timeline 3204 for the user input content video 3234. The causing of the presentation of the timeline 3204 may comprise causing presentation of a trim function with respect to the user input content video 3234 to enable the user to trim the user input content video to generate the portion of the user input content video 3234.

In some examples, the trim function defaults to the selection of a predetermined portion (e.g., the first five seconds) of the user input content video 3234. (It will be appreciated that, in examples where the user input content video 3234 is of a certain duration, e.g., shorter than 5 seconds, no trim function may be presented and the user may not be enabled to select only a portion of the user input content video 3234, with the entire user input content video 3234 being selected for combination as described below.)

In some examples, the user input content combination function causes presentation of a progress indicator in the example form of a progress bar 3220 indicating a duration of the portion of the user input content video 3234 relative to a duration of a combined user input content item 3238.

At block 3314, the user input content combination function accesses a second content item 3236. The second content item 3236 may be a second video clip.

The method 3300 may include, at block 3316, detecting selection, by the user, of one or more combination options. The combination options may include an order selection made by the user, indicating for example whether the user input content video 3234 is to appear at the beginning or end of the combined user input content item 3238, or whether a particular item should appear before or after the other one. The order selection may thus be indicative of a selected temporal relationship between the user input content items constituting the combined user input content item.

The combination options may include a splitting selection made by the user, indicating for example, whether the user input content video 3234 is to be split into two or more separate parts (e.g., the user input content video 3234 may be split into two parts, with one part appearing at the beginning of the combined user input content item 3238 and another part appearing at the end of the combined user input content item 3238, with a second user input content item appearing between the two parts.) Likewise, the splitting selection may indicate that the second item 3236 is to be split into two or more separate parts. The separate parts may be arranged in any order within the combined user input content video At block 3318, the user input content combination function combines the portion of the user input content video 3234 with the second content item 3236 to create a combined user input content item 3238 (e.g., a combined user input content video). The combination may be carried out based on the one or more combination options selected by the user, e.g., to ensure that the video portions or clips are arranged in a particular order, and the method concludes at closing loop block 3320.

It will be appreciated that while examples focusing on the creation of a combined video item are described, similar techniques may be applied to create other combinations, e.g., a combined slideshow where each slide has a defined timing.

Further details regarding some examples will now be described with reference to interface diagrams illustrated in FIG. 34 to FIG. 38.

FIG. 34 to FIG. 36 are interface diagrams showing a sequence of user interfaces that may be generated and displayed by the interaction client 106, according to some examples.

As shown in FIG. 34, a view interface 3214 presents a user input content item, in the form of a user input content video 3234 depicting a dancing person. The view interface 3214 may be presented as a result of a user selecting the user input content video within a feed (e.g., a content item feed published by another user of the interaction system 100) or having received the user input content video within a message from another user of the interaction system 100.

Within the view interface 3214, a user may select a context menu item, or perform some other action, such as a press and hold, with respect to the user input content video 3234, responsive to which the interaction client 106 causes the presentation of a context menu 3402 including a number of options with associated text and user-selectable indicia. The user-selectable indicia are shown to include two examples of user input content combination indicia, namely a remix button 3408 and an add button 3404. The remix button 3408, as described elsewhere, may enable a user to combine multiple content items into a collage or otherwise spatially arranged collection of content items that are concurrently displayed (e.g., in a split screen configuration or/and overlay configuration). The add button 3404, according to some examples, may enable a user to combine multiple content items for sequential display (e.g., as a continuous video comprised of multiple content items, or parts thereof), with the user being enabled to specify or adjust the temporal relationship between the items.

User selection of the add button 3404 from the content menu 3402 invokes the trimming interface 3206, which is shown in FIG. 35 and which displays a full-screen preview of the user input content video 3234, together with trimming controls. The trimming controls, in some examples, comprise a timeline 3204 having a pair of handles 3502, and a playhead marker 3504. User manipulation of the handles 3502 allows the user to trim the original user input content video 3234 to a desired length and, in this way, select a portion of the original user input content video 3234 for inclusion within a combined user input content item 3238. The trimming controls may default to selecting a predetermined portion of the original user input content video 3234 (e.g., the first five seconds) or to selecting the full clip, where the original user input content video 3234 is less than a predetermined length (e.g., five seconds).

A check indicium 3506, in the example form of a checkmark, is displayed adjacent the timeline 3204, and is user-selectable to indicate the completion of a trimming operation by the user within the trimming interface 3206, in which case the interaction client 106 advances to the trimming interface 3206. Should a user drag the handles 3502 to select the full duration of the original user input content video 3234, the check indicium 3506 is disabled because the user does not have any time within a fixed duration of the combined user input content video to any additional content items (e.g., an additional video clip recorded by the user within the context of the remix camera interface 3222.)

Having completed a selection of a length (e.g., portion) of the user input content video 3234 for inclusion within the combined user input content video, or where a length is defaulted to or automatically selected by the messaging application, a user may then selectively activate the check indicium 3506 to advance display to the remix camera interface 3222, as shown according to some examples in FIG. 36. The remix camera interface 3222 presents a modular camera screen to the user. The remix camera interface 3222 presents a continuous image feed from one or more cameras of the user system 104. The remix camera interface 3222 presents a capture button 3606 that is user selectable to record digital content (e.g., a still image or a video clip) as a second content item 3236 from the continuous image feed. The captured content item 3236 is then appended or added to, or otherwise "mixed with," the selected portion of the user input content video 3234 in order to constitute the combined user input content item 3238. The capture button 3606 may be used to capture any number of additional digital content items that may then be combined with the selected portion of the user input content video 3234 within the combined user input content item 3238.

In addition to enabling a "live" capture using the modular camera of the remix camera interface 3222, the remix camera interface 3222 also includes a media library selector 3610 that enables a user to select additional digital content from a media library (e.g., a local library of the user system 104 or a remote server-based library of the interaction system 100) for inclusion within the combined user input content item 3238.

The trimming interface 3206 and remix camera interface 3222 further include a progress bar 3508 that initially presents a visual display of the duration of the selected portion of the user input content video 3234, relative to an overall duration of a possible combined user input content item. Specifically, the highlighted portion of the progress bar visually depicts the duration of the selected portion of the user input content video 3234. As additional content items (e.g., the content item 3236) are added to the combined user input content item 3238 within the context of the remix camera interface 3222, the progress bar 3508 updates to indicate an overall occupied duration of a potential maximum duration of the combined user input content item 3238. The progress bar 3508 may display the duration of each of the content items that constitute the combined user input content item 3238 in a different color or using visual differentiation for each content item duration.

The remix camera interface 3222 further includes an augmentation selector 3612 which is user selectable to present a scrolling list of augmentations (e.g., filters or stickers) that a user can optionally apply to a captured content item 3236. A check indicium 3602 is displayed within the remix camera interface 3222 and remains disabled until a user has identified at least one content item 3236, either through capture or retrieval, for inclusion within the combined user input content item 3238. The check indicium 3602, once active, is user selectable to indicate completion of the creation of the combined user input content item 3238, following which the combined user input content item 3238 is made available within a viewing interface for previewing, prior to communication to other users of the interaction system 100, either by direct messaging or sharing on a publication feed of the user supported by the interaction system 100.

An undo button 3604 within the remix camera interface 3222 is user selectable to return a user from the remix camera interface 3222 to the trimming interface 3206. Within the remix camera interface 3222, camera controls 3608 enable a user to apply various controls when capturing a content item 3236.

It will also be noted that each of the view interface 3214 and the remix camera interface 3222 include attribution data 3406 that indicates and identifies a source (e.g., a user of the interaction system 100) and context of a displayed user input content item (e.g., a user input content video 3234). The attribution data 3406 may be displayed on playback of a combined user input content item 3238 for each of the constituent digital content items so as to provide the source and context information for a particular section or portion of the overall combined user input content item 3238. Within any of the interfaces, the attribution data 3406 is user-selectable to present a profile page (e.g., a user profile page) for a particular source, if such a profile page exists and is published according to appropriate permissions received from the relevant source.

In some examples, when the combination function is activated or invoked, it may cause simultaneous presentation of the first user input content video and a digital image feed from the user's camera, e.g., within the combination (remix) interface. The camera function, as invoked by the combination function, may receive user capture input and, responsive to receipt of the user capture input, capture digital content as the second user input content item. The combination function may cause simultaneous presentation of the first user input content video (or part thereof) and the second user input content item, e.g., in the combination interface.

Figures 37, 38:
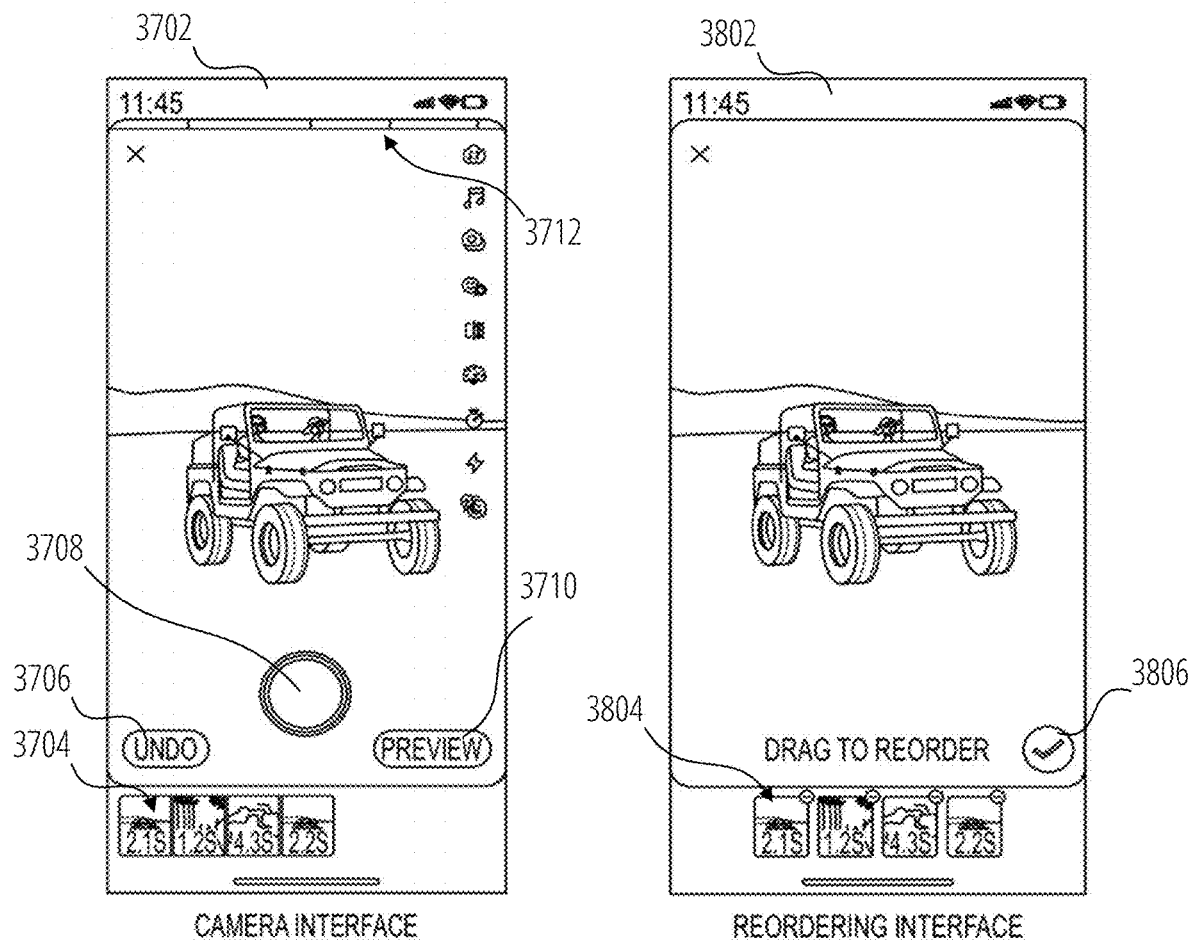
FIG. 37 is a user interface diagram illustrating aspects relating to combined user input content items in accordance with some examples.
FIG. 38 is a user interface diagram illustrating aspects relating to combined user input content items in accordance with some examples.

FIG. 37 and FIG. 38 are interface diagrams showing user interfaces that may be generated and displayed by the interaction client 106, according to some examples.

As mentioned above, one of the combination options related to the creation of a combined user input content item, e.g., a combined video, may be an order selection. The order selection, in some examples, is an instruction relating to the temporal arrangement of the parts or portions of the combined user input content video. According to some examples, a user may be permitted to reorder user input content items in the example form of video clips.

FIG. 37 shows a camera interface 3702 according to some examples. The camera interface 3702 may be presented to allow the user to capture digital content using a camera button 3708. The camera interface 3702 also includes an undo button 3706 and a preview button 3710.

Referring to the thumbnails 3704 shown in FIG. 37, the camera interface 3702 displays the thumbnails 3704 to identify and indicate a sequence of video clips already captured or selected by the user. These clips may, for example, have been captured and/or selected in the process of creating a combined user input content video item. In FIG. 37, the thumbnails 3704 indicate that the user has captured or selected a sequence of four clips: a first clip of 2.1 seconds, a second clip of 1.2 seconds, a third clip of 4.3 seconds, and a fourth clip of 2.2 seconds. The clips are shown in a particular order, as they would appear in the finalized, combined user input content video, should the user choose to publish it in its current form.

FIG. 37 also illustrates a progress bar 3712 according to some examples, shown in the camera interface 3702. The user is able to play the clips in their current sequence in the camera interface 3702, and the progress bar 3712 provides a visual indication of the playback position, as well as the duration of the portions of each clip relative to the combined video.

In response to detecting a reordering selection made by the user, a reordering interface 3802 may be generated and presented. The reordering interface presents the content items making up the combined user input content video, e.g., the constituent clips, in their current order, and enables the user to modify the temporal relationship between the items in the sequence. The reordering selection may, for example, be made by pressing and holding on one of the clips forming part of the thumbnails 3704, performing a dragging gesture in respect of one of the clips, or selecting a dedicated clip order button or option (not shown). Responsive to the reordering selection being made, the media application may thus activate a reorder mode or reorder state, presenting the reordering interface 3802.

FIG. 38 shows the reordering interface 3802, according to some examples. In the reorder state, the user is permitted to reorder video clips, delete video clips, watch a playback of the clips, and edit or augment one or more of the video clips.

In some examples, the media application may initiate haptic feedback to notify the user that the reorder mode or state has been activated. The media application may cause the clips 3804 to move relative to the rest of the elements in the reordering interface 3802 (e.g., through a "wiggling" motion) to notify the user that the reorder mode or state has been activated.

The adjustable sequence of clips 3804 can be reordered by dragging a clip into the desired position in the sequence of clips 3804. The user can delete a clip by tapping the "(-)" icon displayed in the top right corner of each thumbnail. When a user is done, the check mark button, or tick button 3806, is selected.

It will be appreciated that this reordering technique may be employed, in some examples, as part of the combination function of the media application to allow the user to reorder content items forming part of, or intended to form part of, a combined user input content item.

Various entry points may be provided by the interaction client 106 in order to invoke the combination function. For example, the view interface 3214 shown in FIG. 34 provides two entry points: the remix button 3408 and the add button 3404. FIG. 39 and FIG. 40 show further examples of entry points. The view interface 3904 shown in FIG. 39 displays an example in which a remix tray 3902 is presented responsive to the user selecting an appropriate menu icon or performing a user activity (e.g., a press and hold operation) with respect to a displayed user input content video.

The remix tray 3902 includes two user-selectable combination indicia: both an add before or after button 3906 and an add together button 3908. The add before or after button 3906 may, for example, launch the combination process described with reference to FIG. 33. The add together button 3908 may, for example, launch the combination process described with reference to FIG. 29. These buttons provide a user with options of relative temporal or visual placement of multiple content items within a combined user input content item.

The camera interface 4004 shown in FIG. 40, of which the remix camera interface 3222 is an example, includes a menu presenting several layout tools 4002, which menu includes a user input content combination indicium 4006 that is user selectable to invoke the user input content combination function to allow the temporal arrangement or placement (e.g., time-based sequencing) of user input content items into a video or slideshow, as described herein. The layout tools 4002 also include a number of spatial layout options that enable the side-by-side or overlaid layout of multiple digital media content items. The user input content combination indicium 4006 is user selectable in order to invoke the combination function and display the trimming interface 3206 and the remix camera interface 3222.

The media application may provide access to a media platform (e.g. interaction system 100 or part thereof). The user may thus be a media platform user, with the media platform facilitating sharing of the combined user input content video with a further user of the media platform. Sharing permissions related to sharing of content via the media platform may be stored for the user and the further user by the media platform, and the sharing of the user input content video by the user with the further user may be performed in accordance with the sharing permissions.

A media application (e.g., a messaging application) may allow a user to view a content item and share that content item to other user devices. A content item may be shareable to a plurality of content sharing destinations. However, in some examples, the media application may be designed to restrict or prevent a user from sharing a third-party content item to one or more content sharing destinations, e.g., a user may be discouraged from publishing a third-party image directly to the user's own content collection by disabling or deactivating the relevant content sharing destination when the user is viewing that third-party image. While restrictions of this nature may encourage users to be creative and share original content, these restrictions may result in user dissatisfaction and even reduced usage of the media application. One example technical problem of unlocking previously locked or deactivated content sharing destinations based on user interaction with the media application may be addressed by providing a method and system with improved functionality, automatically linking the creation of combined user input content items to presentation of and interaction with content sharing destinations.

Figure 41:
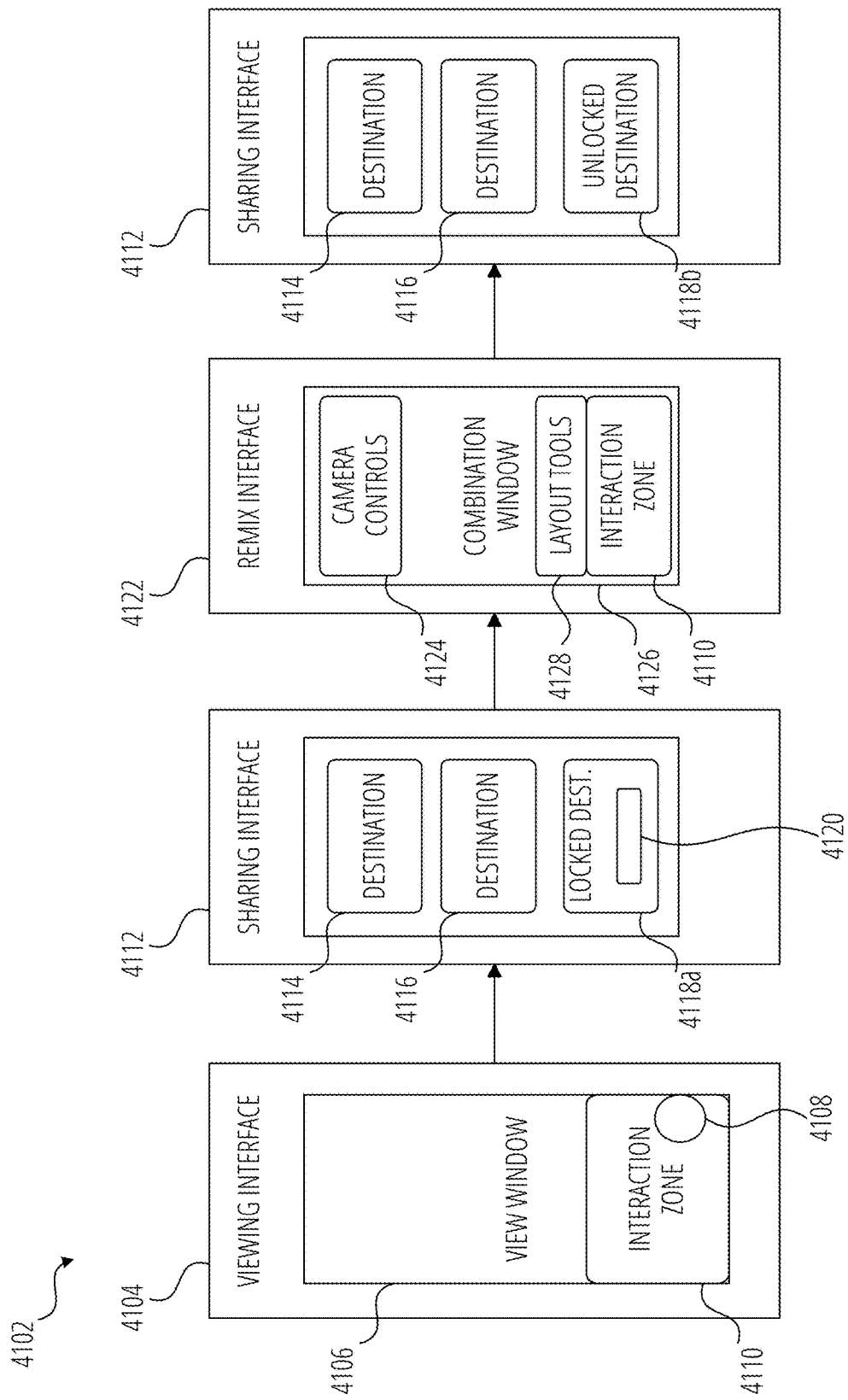
FIG. 41 is a user interface sequence diagram illustrating aspects relating to combined user input content items and unlocking of content sharing destinations in accordance with some examples.

FIG. 41 is an interface sequence diagram showing a sequence 4102 of interfaces, according to some examples, that may be presented by an interaction client 106 hosted on and executed by a user system 104.

The sequence 4102 includes a viewing interface 4104 that enables a user of the user system 104 to view user input content items published and/or shared by third parties. The third-party user input content items may, for example, be content forming part of content collections, e.g., a third-party user input content item may form part of a "personal story" of a third-party user that has been created and sent/broadcast by that user, or may form part of a public feed of curated third-party items presented to the user by a media application.

A view window 4106 presents a user with a view of these one or more user input content items, e.g., as a sequential set of content items presented by the media application on the user system 104. An interaction zone 4110 presents a number of options available to the user in the view window 4106. For example, the interaction zone 4110 may include a user-selectable button allowing the user to react to the content (e.g., "like" the content) and another user-selectable button allowing the user to comment on or initiate a message to the third-party user associated with the content. As shown in FIG. 41, according to some examples, the interaction zone 4110 includes a user-selectable content sharing graphical element 4108. The content sharing graphical element 4108 may, for example, be implemented as a "Share" button or a "Send to" button.

Selection of the content sharing graphical element 4108 causes presentation of a sharing interface 4112. Such an interface may, for example, be implemented as a "Send To" interface or "Send To" tray presenting the user with selectable options related to sharing of the content item viewed by the user.

The sharing interface 4112 may be presented by the communication system 210, to enable a user to share a content item presented in the viewing interface 4104 with other users. To this end, the sharing interface 4112 presents various sharing options, referred to herein as "destinations," identified by respective destination graphical elements 4114, 4116, 4118a in the sharing interface 4112. The destination graphical elements 4114 and 4116 are user-selectable to enable the user to share the relevant content item to the sharing destinations associated with those destination graphical elements 4114 and 4116. For example, the destination graphical element 4114 may identify a first sharing destination such as "share this image with a friend in a private message," while the destination graphical element 4116 may identify a second sharing destination such as "share this image via email." If the relevant destination graphical element 4114, 4116 is selected by the user, the sharing of the content item to the destination associated with the particular destination graphical element 4114, 4116 is initiated.

A content item being viewed by a user may, in some examples, not be shareable to one or more content sharing destinations. For example, the interaction system 100 may be configured such that a user is not permitted to share a third-party user input content item directly to the user's "story" or directly to a public feed/collection. Such a restriction may, for example, be implemented to prevent users from simply re-sharing or re-publishing content already shared or published by other users of the interaction system (or make it more difficult for them to do so). For example, the interaction system may be designed to facilitate the sharing or publication of "original" or "first-time" content items to stories and/or public collections/feeds, while preventing or reducing the sharing or publication of "non-original" or "existing" content items back for presentation to other users of the interaction system. To this end, the sharing interface 4112 may present a destination graphical element 4118a identifying a locked destination. For example, the 4118a may alert the user that a certain content sharing destination, such as "sharing to your story," is not available (locked or inactive) for the particular content item the user is viewing.

Various content sharing destinations may be available or presented to a user in examples of the present disclosure. These may include, for example, in the case of a user using the interaction client 106, sharing via direct message to another user of the interaction client 106, sharing to the user's story or other content collection, sharing to a public content collection available to users of interaction clients 106, sharing to third-party applications such as third-party messaging applications and/or third-party social networking platforms, sharing via email, sharing via text or multimedia message, and the like.

As shown in FIG. 41, the destination graphical element 4118a is displayed in conjunction with a remix button 4120. In some examples, the remix button 4120 allows the user to unlock or activate the locked destination by re-mixing the relevant content item, thereby creating a new, combined content item that is shareable to the previously locked or unavailable destination.

A remix interface 4122 (also referred to as a combination interface) is presented by the camera system 204 and specifically the remix system 206, responsive to user-selection of the remix button 4120, to enable a user to capture a further content item and combine the further content item with the third-party content item viewed in the viewing interface 4104, to generate a combined user input content item within a combination window 4126. The remix interface 4122 presents various layout tools 4128 for laying out multiple content items relative to each other and within certain layouts, as well as a number of camera controls 4124. An interaction zone 4110 of the combination window 4126 presents various augmentation and modification tools that may be applied to combined content within the context of the remix interface 4122.

In some examples, once a combined content item has been created, the user may be presented with the sharing interface 4112 again, presenting the various sharing destinations, but with the previously locked sharing destination being unlocked, represented by an updated destination graphical element 4118*b*. The updated destination graphical element 4118*b* is user-selectable, like the other destination graphical elements 4114, 4116, to enable the user to share the combined content item, created using the remix interface 4122, to the previously unavailable content sharing destination.

To enable the user to share the combined content item to the unlocked content sharing destination, the media application may thus cause presentation of an updated sharing interface 4112 with an updated destination graphical element 4118*b*, and determine that the user has selected the updated destination graphical element 4118*b*. Responsive to determining the user selection of the updated destination graphical element, the media application causes the combined content item to be published to the unlocked content sharing destination.

Further details regarding some examples of interfaces of FIG. 41 are discussed with respect to examples below.

Figure 42:
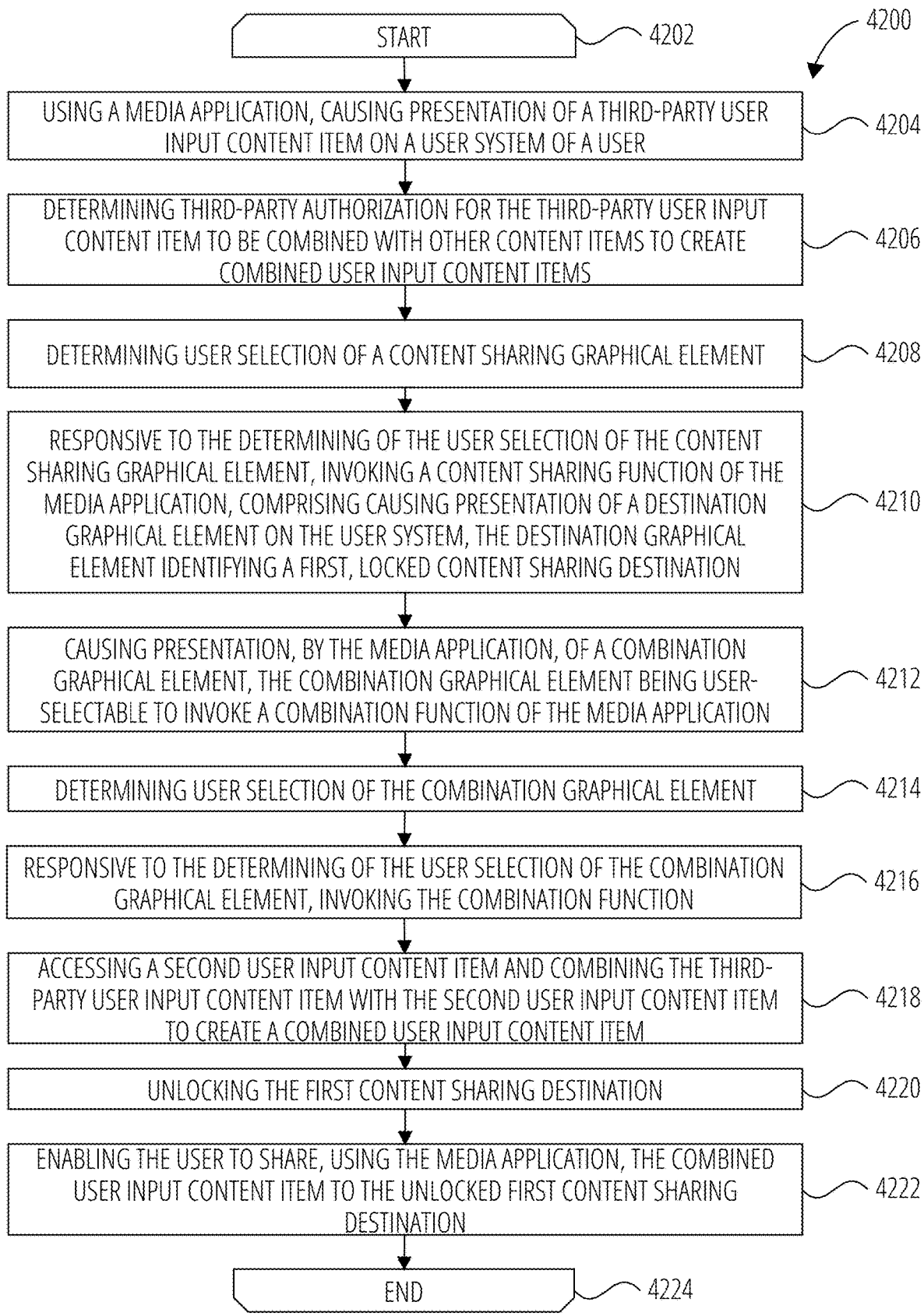
FIG. 42 is a flow diagram illustrating a method including aspects relating to a combination function and unlocking of content sharing destinations, in accordance with some examples.

FIG. 42 is a flowchart illustrating a method 4200, according to some examples, to facilitate the generation of a combined user input content item and unlocking a locked content sharing destination. While some examples are described with reference to user input content items, disclosures are broadly applicable to other types of digital content. The method 4200, in some examples, is performed by various components of the interaction system 100 described with reference to FIG. 1.

The method 4200 commences at opening loop block 4202, and progresses to block 4204, where the user system 104, and specifically the interaction client 106 (as an example of a media application), causes the presentation of a third-party user input content item. The third-party user input content item may, for example, be an image or a video clip being viewed by an active user on the user system 104. The third-party user input content item may include multiple types of content, such as audio content combined with image content, and may include one or more augmentations or modifications, as described elsewhere herein.

The third-party user input content item may be presented within a viewing interface 4104 in conjunction with a content sharing graphical element 4108. The content sharing graphical element 4108 is user-selectable to invoke a content sharing function of the interaction client 106.

According to some examples, the method 4200 includes determining third-party authorization for the third-party user input content item to be combined with other content items to create combined user input content items at block 4206. For example, an authorization setting related to the third-party user input content item, indicating this authorization, may be detected at block 4206. The determining third-party authorization for the third-party user input content item to be combined may thus comprise determining a user setting related to the third-party user input content item indicating the third-party authorization. A third-party content creator, when creating or publishing the third-party user input content item, is presented with the option of either allowing or disallowing the use of the third-party user input content item in combination with other content items, created or originated with other users of the interaction system 100. This allowance/disallowance is then recorded and stored in the database 128 as the authorization setting related to the relevant third-party user input content item, and is accessed at block 4206 to perform the detection of the third party authorization.

The method 4200 proceeds to block 4208, where user selection of the content sharing graphical element 4108 is determined. At block 4210, responsive to the determining of the user selection of the content sharing graphical element 4108, a content sharing function of the interaction client 106 is invoked. This causes presentation of destination graphical elements 4114, 4116, 4118*a* on the user system 104, for example, to display to the user various destinations to which the content the user is viewing can be sent.

As mentioned with reference to FIG. 41, each destination graphical element identifies a content sharing destination (or at least one content sharing destination). The destination graphical element 4118*a* may identify a first, locked content sharing destination while the two additional content sharing destinations (identified by 4114 and 4116) may be unlocked (available) content sharing destinations.

The method 4200 may include, at block 4208, determining or checking a content type associated with the third-party user input content item being viewed by the user. Based on the content type, the interaction client 106 may determine the content sharing destinations to present to the user and/or the availability of each content sharing destination, e.g., whether it is locked or unlocked. For example, the interaction client 106 may determine that the user has selected the content sharing graphical element 4108 in respect of a third-party user input content item and check a sharing setting associated with the third-party user input content item in the database 128. The sharing setting may indicate that the third-party user input content item may not be shared directly to the first content sharing destination. In some examples, the sharing setting may be specific to the user. Responsive thereto, the first content sharing destination may be presented as locked or unavailable in the sharing interface 4112.

According to some examples, the first content sharing destination is locked in respect of the third-party user input content item, or even in respect of all third-party user input content items, while additional content sharing destinations are unlocked for the third-party user input content item or all third-party user input content items. To this end, at block 4210, the destination graphical element 4114, 4116 identifying each respective available (unlocked) content sharing destination is presented and is user-selectable to enable the user to share the third-party user input content to the content sharing destination associated with each respective element 4114, 4116.

According to some examples, the method includes causing presentation, by the interaction client 106, of a combination graphical element in the form of a remix button 4120 at block 4212. The remix button 4120 is user-selectable to invoke a combination function (or "remix" function) of the interaction client 106, and user selection thereof is determined at block 4214. Referring to block 4206 in FIG. 42, it will be appreciated that, in the event that it is determined that the third party has not authorized combination of the third-party item with other items, according to some examples, no remix button 4120 is displayed.

Responsive to determining the user selection of the remix button 4120, the interaction client 106 activates the combination function at block 4216. The combination function allows the user to access (e.g., select, capture, or create) a second user input content item and combine the second user input content item with the third-party user input content item to create a combined user input content item (block 4218). The combination function may provide a number of sub-functions or tools to facilitate the combining of the third-party user input content item and the other user input content item. These tools may include a layout function to enable the user to specify a layout relationship of the third-party user input content item, relative to the other user input content item, or within the context of a broader combined display, during the presentation of the combined user input content item. The combination function also makes a number of the augmentations of the augmentation system 208 discussed herein available for application and use in the creation of the combined content element.

In some examples, the combination function, in addition to enabling the combining of multiple content items, also enables the unlocking of the previously locked content sharing destination, at block 4220. In some examples, once the user has created the combined user input content item (or once the user has opted to create it), the interaction client 106 causes the locked content sharing destination to become unlocked. In other words, while the user was not able to share the original third-party user input content item to that destination, the user is permitted by the interaction system 100 to share a combined user input content item, which includes the original third-party user input content item as a constituent part, to that destination.

According to some examples, at block 4222, the method 4200 includes enabling the user to share, using the interaction client 106, the combined user input content item to the unlocked first content sharing destination, by presenting an updated destination graphical element 4118*b* in the sharing interface 4112, and causing the updated destination graphical element 4118*b* to be user-selectable to initiate sharing to the (unlocked) content sharing destination associated with the element 4118*b*. Alternatively, in some examples, once the combined user input content item has been created/selected, it may be automatically shared to the newly unlocked content sharing destination based on the user's initial selection of the remix button 4120. The remix button 4120 may be positioned inside of, adjacent to, or otherwise in association with the destination graphical element of the content sharing destination to which the user wishes to share.

In other words, the remix button 4120 may be positioned closer to the locked destination's destination graphical element than to the destination graphical element of the other destinations, thus alerting the user to the fact that the locked destination can be unlocked through the re-mixing operation and/or that re-mixing will automatically cause transmission to that destination. In some examples, the sharing interface may include a tooltip or other message indicating to the user that a particular content sharing destination is not available for the content item being viewed, but can be made available by re-mixing the content item. The method then concludes at closing loop block 4224.

Figure 43:
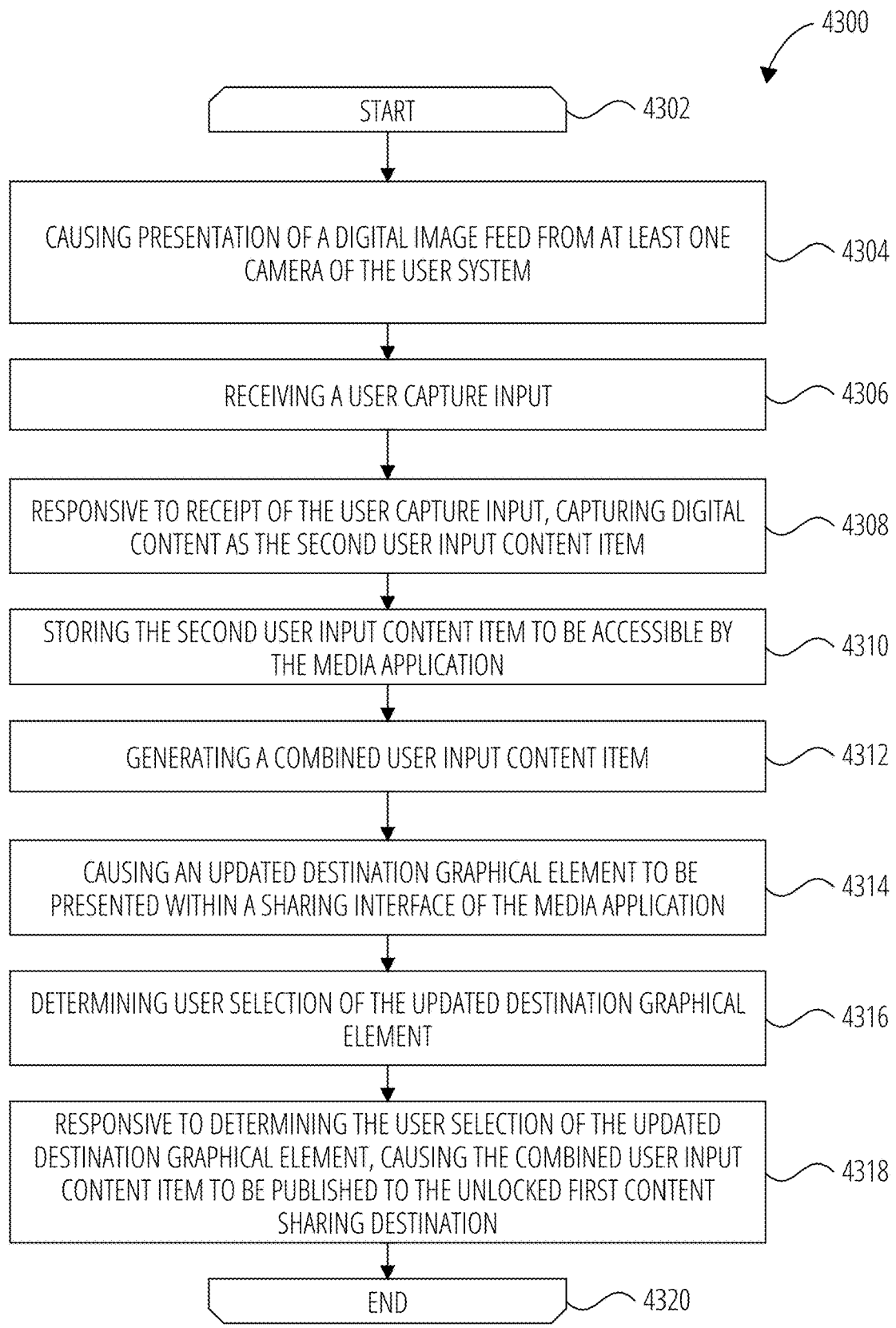
FIG. 43 is a flow diagram illustrating a method including aspects relating to a combination function and unlocking of content sharing destinations, in accordance with some examples.

FIG. 43 is a flowchart illustrating a method 4300, according to some examples, to facilitate the generation of a combined user input content item and the sharing of the combined user input content item to a content sharing destination. The method 4300, in some examples, is performed by various components of the interaction system 100 described with reference to FIG. 1, and specifically by the interaction client 106 (as an example of a media application).

The method 4300 commences at opening loop block 4302 and progresses to block 4304, where, responsive to the user selecting the remix button 4120 (as described with reference to FIG. 41 and FIG. 42), the remix interface 4122 is presented, and the interaction client 106 causes presentation of a digital image feed from at least one camera of the user system 104.

The third-party user input content item and a second (supplemental) digital image feed may be concurrently or simultaneously presented within the remix interface 4122. The interaction client 106 receives user capture input at block 4306 and, responsive thereto, causes one or more digital images from the digital image feed to be captured as the second user input content item at block 4308.

According to some examples, the method 4300 includes storing the second user input content item to be accessible by the interaction client 106 at block 4310.

The method 4300 proceeds to block 4312, where the third-party user input content item and the second user input content item are combined in order generate the combined user input content item. According to some examples, at block 4314, the interaction client 106 causes an updated destination graphical element to be presented within the sharing interface, as described with reference to FIG. 41 and FIG. 42.

The method 4300 may include, at block 4314, determining or checking a content type associated with the combined user input content item. Based on the content type, the interaction client 106 may determine the content sharing destinations to present to the user and/or the availability of each content sharing destination, e.g., whether it is locked or unlocked. For example, the interaction client 106 may determine that the user has created a combined user input content item, which may be classified as an "original" content item, and check the sharing setting related to items of this type in the database 128. The sharing setting related to items of this type may, for example, include that the "original" content item may be shared with another user via a direct message, but not shared or re-published to a public feed in its original form. The sharing setting may thus provide information as to sharing permissions and/or sharing restrictions.

At block 4316, user selection of the updated destination graphical element (e.g., the element 4118*b*) is detected. Responsive to detecting the user selection of the updated destination graphical element, the interaction system 100 causes the combined user input content item to be published to the unlocked first content sharing destination at block 4318. The method concludes at closing loop block 4320.

FIG. 44 to FIG. 47 are interface diagrams showing a sequence of user interfaces that may be generated and displayed by the interaction client 106, according to some examples.

Figure 44:
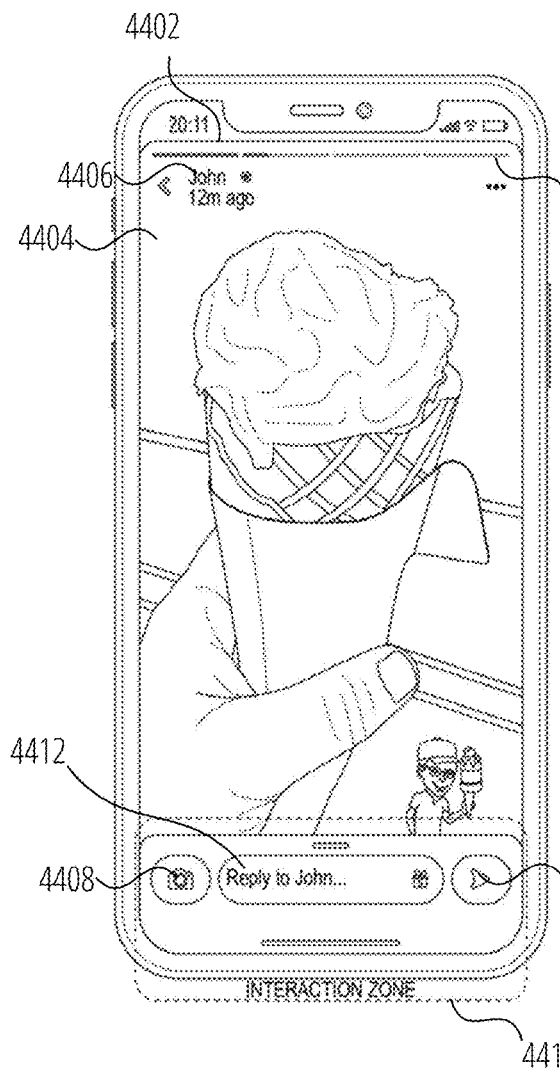
FIG. 44 is a user interface diagram illustrating aspects relating to combined user input content items and unlocking of content sharing destinations in accordance with some examples.

FIG. 44 is a user interface diagram showing a viewing interface 4402, according to some examples. In FIG. 44, active user is viewing a third-party user input content item 4404. The third-party user input content item 4404 is an augmented image. Specifically, the third-party user input content item 4404 consists of a photograph of a person's hand holding an ice cream cone with a character, also holding an ice cream cone, overlaid onto a bottom right region of the photograph. The third-party user input content item 4404 forms part of a third party's content collection, referred to as a "story." The story may, for example, be presented to the active user as part of a personal feed or public feed, or in response to the user visiting the third party's profile and selecting the story. The third party's name is included in the viewing interface 4402, as indicated by reference numeral 4406.

As indicated by the progress bar 4416, the presentation of the third-party user input content item 4404 is part of a sequential presentation of a set of third-party user input content items.

The viewing interface 4402 includes an interaction zone 4410, presenting the active user with options for interacting with the third-party user input content item 4404 or with the third party 4406. The user may select a camera button 4408 to launch a camera of the user system 104 of the user, e.g., to capture an image in response to the third-party user input content item 4404. The user may also opt to send a message to the third party by selecting a reply graphical element 4412.

The interaction zone 4410 further includes a content sharing graphical element in the example form of a send button 4414. In some examples, if the user selects the send button 4414, and responsive to determining a combination authorization with respect to the third-party user input content item 4404, a content sharing function is invoked. The content sharing function causes presentation of a sharing interface 4502 on the user system 104.

Figure 45:
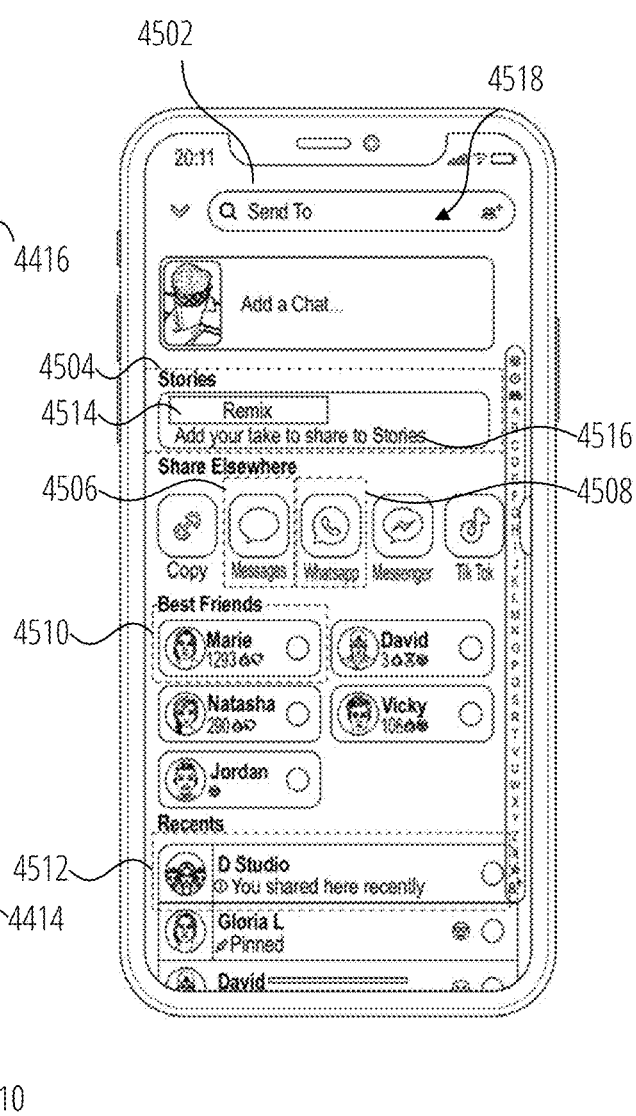
FIG. 45 is a user interface diagram illustrating aspects relating to combined user input content items and unlocking of content sharing destinations in accordance with some examples.

FIG. 45 is a user interface diagram showing the sharing interface 4502, according to some examples. The sharing interface 4502 includes a plurality of destination graphical elements. Each destination graphical element identifies a content sharing destination that may be available to the active user. Examples of these elements are identified by reference numerals 4504, 4506, 4508, 4510 and 4512 in FIG. 45.

The destination graphical element 4504 identifies a first content sharing destination. In FIG. 45, the first content sharing destination is "Stories," meaning that selection of this option would allow the user to share the third-party user input content item 4404 to the user's story. However, in some examples, and as shown in FIG. 45, the "Stories" destination is locked. In other words, the user is restricted from selecting the first content sharing destination (directly). Within the destination graphical element 4504, a remix button 4514 is provided in the form of a selectable cell. A tooltip 4516 below the remix button 4514 informs the user that the destination is unavailable/locked and how to make the destination available: "Add your take to share to Stories".

In other words, the user is advised, via the sharing interface 4502, that the remix operation may be carried out to create a combined user input content item (including the third-party user input content item 4404 as a constituent part) before the content can be shared or published to the first content sharing destination (e.g., to the user's story, which is typically a content collection created and published by the user via the interaction client 106 to be accessible by a plurality of other users of the interaction client 106). According to examples of the present invention, various different tooltips and/or messages indicating that the content sharing destination is unlockable via the combination function, or similar indications, may be employed.

A destination graphical element such as the destination graphical element 4504 may include a number of related destinations, e.g., the "Stories" destination may be a category containing a plurality of stories, e.g., the active user's personal story, a shared story and/or a public story. In FIG. 45, none of these "sub-destinations" are available as the entire "Stories" content sharing destination is locked.

The destination graphical elements 4506, 4508, 4510 and 4512 identify additional content sharing destinations, each of which is unlocked/available. The destination graphical element 4506 is user-selectable to enable the user to share the third-party user input content items 4404 via the MESSAGES™ application, and the destination graphical element 4508 is user-selectable to enable the user to share the third-party user input content item 4404 via the WHATSAPP™ application (both being external, or third-party, applications). The destination graphical element 4510 and the destination graphical element 4512 are user-selectable to enable the user to share the third-party user input content item 4404 by way of direct message to another user of the interaction system 100, via the interaction clients 106. When selecting the destination graphical elements 4506, 4508, 4510 and 4512, the third-party user input content item 4404 is shareable to the respective content sharing destinations in its original form, because these content sharing destinations are unlocked/available, in contrast to the destination graphical element 4504 which identifies a locked/unavailable destination (or multiple locked destinations) for the third-party user input content item 4404 in its original form.

The user may also search for other content sharing destination using a search bar 4518 located at a top region of the sharing interface 4502.

As mentioned above, the interaction system 100 may detect a sharing setting associated with the third-party user input content item 4404, e.g., indicating that the third-party user input content item 4404 is not directly shareable to the first content sharing destination ("Stories" in FIG. 45). The sharing setting may indicate that the third-party user input content item 4404 is, or can become, shareable to the first content sharing destination as part of combined user input content items. In response to detecting this setting, the interaction client 106 may generate the sharing interface 4502 as described above in relation to the destination graphical element 4504.

Referring to the user interface diagram in FIG. 46, a remix interface 4602, also referred to as a combination interface, is presented. The remix interface 4602 is automatically activated in response to the user selecting the remix button 4514.

A remix lens, or remix augmentation, is automatically applied to merge or combine the third-party user input content item 4404 with a second user input content item 4604, which in FIG. 46 is an image captured as a "selfie" by the active user, to create a combined user input content item 4612 within the remix interface 4602. Accordingly, in some examples, invoking the combination function allows the user convenient access to the remix feature to create the combined user input content item 4612, and may automatically cause presentation of a digital image feed from a camera of the user system 104, e.g., "selfie" camera, to facilitate capturing of a second user input content item.

The remix interface 4602 includes a set of layout graphic elements 4608, each of which is user-selectable to apply a different layout to the combination of third-party user input content item 4404 with the second user input content item 4604. Each of the layout options associated with a layout graphic element 4608 may allocate a certain section of an interface canvas to each of the images or may define a layout of the images relative to each other. The same layout options may be applied to video content. Once the user is satisfied with the second user input content item 4604 and layout, a remix capture button 4606 can be selected to finalize the combined user input content item 4612. In FIG. 46, the user takes a "selfie" which is overlaid onto a portion of the original third-party user input content item 4404. However, this is merely an example of a layout used to position the two content items relative to each other.

It will be noted that the remix interface 4602 also includes a contextual message 4610 that provides contextual information regarding the combination function (e.g., in this example, indicating that the active user is creating the combined user input content item 4612 based on an original content item by the user "John"). The contextual message 4610 may also be user-selectable to invoke the messaging system 212 of the interaction system and conveniently enable the active user to transmit (e.g., by way of a message or publication to a feed) the combined user input content item 4612 to the third party user (e.g., "John") by way of a "reply" to the third party's publication of the third-party user input content item 4404.

FIG. 47 is a user interface diagram showing the sharing interface 4502, according to some examples. Once the combined user input content item 4612 has been captured through selection of the remix capture button 4606, the user is taken back to the sharing interface 4502.

The destination graphical elements 4506, 4508, 4510, and 4512 remain the same as shown in and described with reference to FIG. 45 (in other words, they remain unlocked and available to share to), but the destination graphical element 4504 of FIG. 45 is replaced with an updated destination graphical element 4702. The updated destination graphical element 4702 is generated and presented by the interaction client 106, and identifies the previously locked content sharing destination ("Stories"), which was unlocked through use of the remix function. The updated destination graphical element 4702 bears the label "SHARE TO YOUR STORY". This alerts the user to the fact that the combined user input content item 4612 can be shared to the "Stories" destination, which was not available in respect of the sharing of the original third-party user input content item 4404. User selection of the updated destination graphical element 4702 then results in publication of the combined user input content item 4612, e.g., to the user's story to be accessible to a restricted set of other users of the interaction system or in some examples to a public feed.

As mentioned above, a media application (e.g., a messaging application) may allow a user to view a content item and share that content item to other user devices. A content item may be shareable to different content collections (e.g., "stories" or "public feeds"), managed by the collection management system 226 of the interaction system 100 according to some examples. A user may wish to interact with a content item forming part of a collection (e.g., create a "remix" thereof) and/or may wish to view interactions of other users relating to that content item. One example technical problem of configuring a media application both to enable users to create combined content items from a base content item and enabling such combined content items to be accessed automatically, and in a consolidated manner, may be addressed by providing a method and system with improved functionality, such as those described according to examples with reference to FIG. 48 to FIG. 59.

Figure 48:
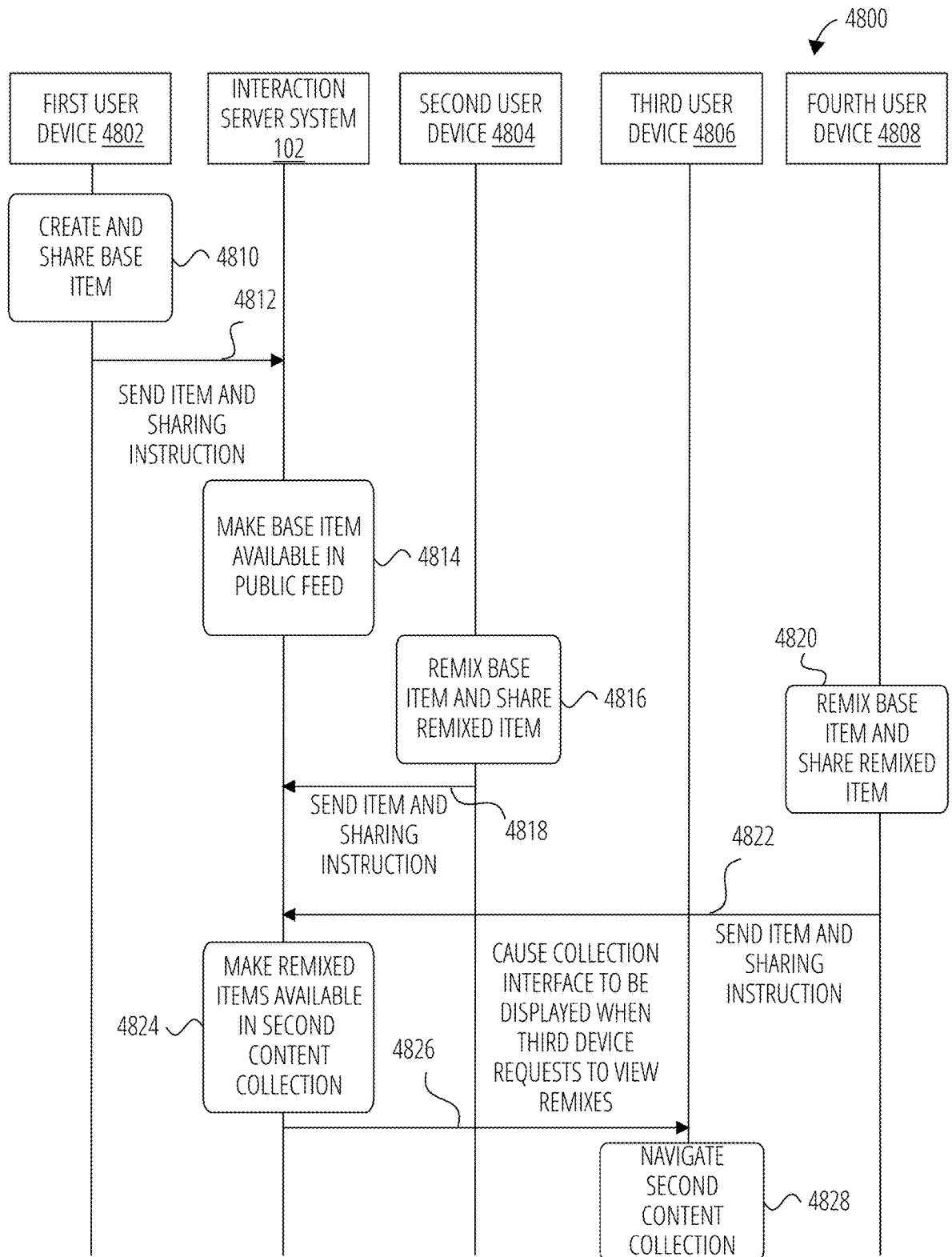
FIG. 48 is an interaction diagram illustrating a process in accordance with some examples, including aspects relating to sharing of combined user input content items to content collections.

FIG. 48 is an interaction diagram illustrating a process 4800 involving devices and components of the interaction system 100, according to some examples. While some examples are described with reference to user input content items, disclosures are broadly applicable to other types of digital content. FIG. 48 shows four user systems 104 in the example forms of a first user device 4802, a second user device 4804, a third user device 4806 and a fourth user device 4808. Each device 4802, 4804, 4806, 4808 has an instance of a media application in the example form of the interaction client 106 installed thereon. The user devices 4802, 4804, 4806, 4808 communicate with each other and with the interaction server system 102 of the interaction system 100 (and other components of the interaction system 100 as required), using the media application.

While four user devices are shown in FIG. 48, it will be appreciated that examples may involve significantly larger numbers of user devices sharing data and content with each other and to content collections via components of the interaction system 100, using various components of the interaction system 100, such as the collection management system 226.

Turning now more specifically to the process 4800, at block 4810, a first user of the media application uses the first user device 4802 to create and share a first user input content item. In examples as described with reference to FIG. 48 to FIG. 59, the first user input content item is also referred to as a "base item." The term "base item" refers to the use of the content item to create a combined content item. The base item may, for example, be a digital image or video clip, or content data including a combination thereof, and may include any number of modifications or augmentations, as described elsewhere. The base item may also include audio content, e.g., the base item may be a relatively short video clip (e.g., 15 or 20 seconds) with an audio track, as selected by the first user, playing at the same time as the video clip.

In examples according to the present disclosure, when sharing the base item, the first user specifically elects to share the base item to a first content collection, in the example form of a public or semi-public feed provided by the interaction system 100. The first content collection may thus be a public content collection. It will, however, be appreciated that techniques described herein may be applied to processes relating various content collections.

The media application may have a dedicated tab, or category, accessible by all users to view and navigate the public feed (it will, however, be appreciated that this may also apply to private or semi-public feeds). The public feed may include a large number of content items, all being designated as "public", e.g., accessible by all users of the interaction system 100. In some examples, the public feed may include mainly or exclusively content in video format having a limited duration (e.g., only clips shorter than 60 seconds or 30 seconds per clip may be posted to the public feed). The interaction system 100 (e.g., using the collection management system 226) may dynamically update the public feed, and each user of the interaction system 100 may be provided with a personalized or curated public feed, e.g., based on their activity on the media application, items they liked or interacted with, search history, relationships with other users, or combinations thereof.

The first user may, for example, select a "share to public feed" button after creating the base item. The first user device 4802 causes the base item to be transmitted to the interaction server system 102 along with an indication that the base item is to be posted to the public feed (see arrow 4812 in FIG. 48). The interaction server system 102 then makes the base item available to users of the interaction system 100 via the public feed at block 4814.

The base item then becomes available for other users of the interaction system 100 to view and interact with (e.g., "like", share or react). If the base item is designated as "public", in some examples, a user of the interaction system 100 may access it in various ways. For example, the user may find the base item in the user's curated public feed. Alternatively, the user may view a "live story" which includes the base item, or access the first user's profile directly to view the base item.

At block 4816, a second user of the interaction system 100, using the second user device 4804, accesses the base item and uses the base item to create a combined user input content item ("remixed item"). In other words, the second user creates a combined user input content item which includes the base item and one or more other content items. The second user elects to share the combined user input content item back into the public feed. The second user device 4804 transmits the combined user input content item together with a sharing instruction to the interaction server system 102 (block 4818). Similarly, at block 4820, a fourth user, using the fourth user device 4808, accesses the same base item and creates another combined user input content item which is shared back into the public feed. The fourth user device 4808 transmits the combined user input content item together with a sharing instruction to the interaction server system 102 (block 4822).

The interaction system 100, e.g., using the collection management system 226, then makes the remixed items created by both the second user and the fourth user available in the public feed. Further, according to examples of the present disclosure and as shown in FIG. 48, at block 4824, the interaction system 100 makes the two remixed items available in a second content collection. The second content collection is a collection of all remixed items created from the base item. In other words, the second content collection is a set of content items, all of which are combined items generated by combining the base item with another content item. The collection management system 226 may dynamically update the second content collection in response to user of the interaction system 100 creating public "remixes" of the base item. The second content collection, like the first content collection, may be a public content collection accessible by the entire user base of the interaction system 100. It will, however, be appreciated that techniques described herein may be applied to processes relating various content collections, e.g., semi-public content collections that have certain restrictions in terms of users allowed to access them.

A third user of the interaction system 100, using the third user device 4806, then requests to view all "remixes" made from the base item across the user base of the interaction system 100. For example, the third user may be viewing the base item in the public feed and be interested in seeing how other users have interacted with, reacted to, or built on, the content in the base item. The interaction system 100 may provide, on a viewing interface of the third user device 4806, an indication to the third user that the base item has been remixed by other users (in the case of FIG. 48, the second and fourth users) together with a user-selectable element. In response to the third user requesting to view all "remixes," e.g., by selecting the user-selectable element, at block 4826, a collection interface may be presented on the third user device 4806. The collection interface allows the third user to navigate the second content collection at block 4828.

The second public content collection may, for example, consist exclusively of combined user input content items created using a first user input content item as a base item and shared back to the first public content collection (e.g., public feed). Where the first user input content item and the supplemental content added to create the combined user input content item both include visual content (e.g., still images and/or video), the second public collection thus provides users with an automatic and convenient view of all visual responses to the base (original) item of the first user. Each combined user input content item in the second public content collection may include an attribution element which identifies the first user. In some examples, the collection interface may include an attribution visual element which identifies the first user or the base item, separately from a listing or display of the "remixed" items.

Figure 49:
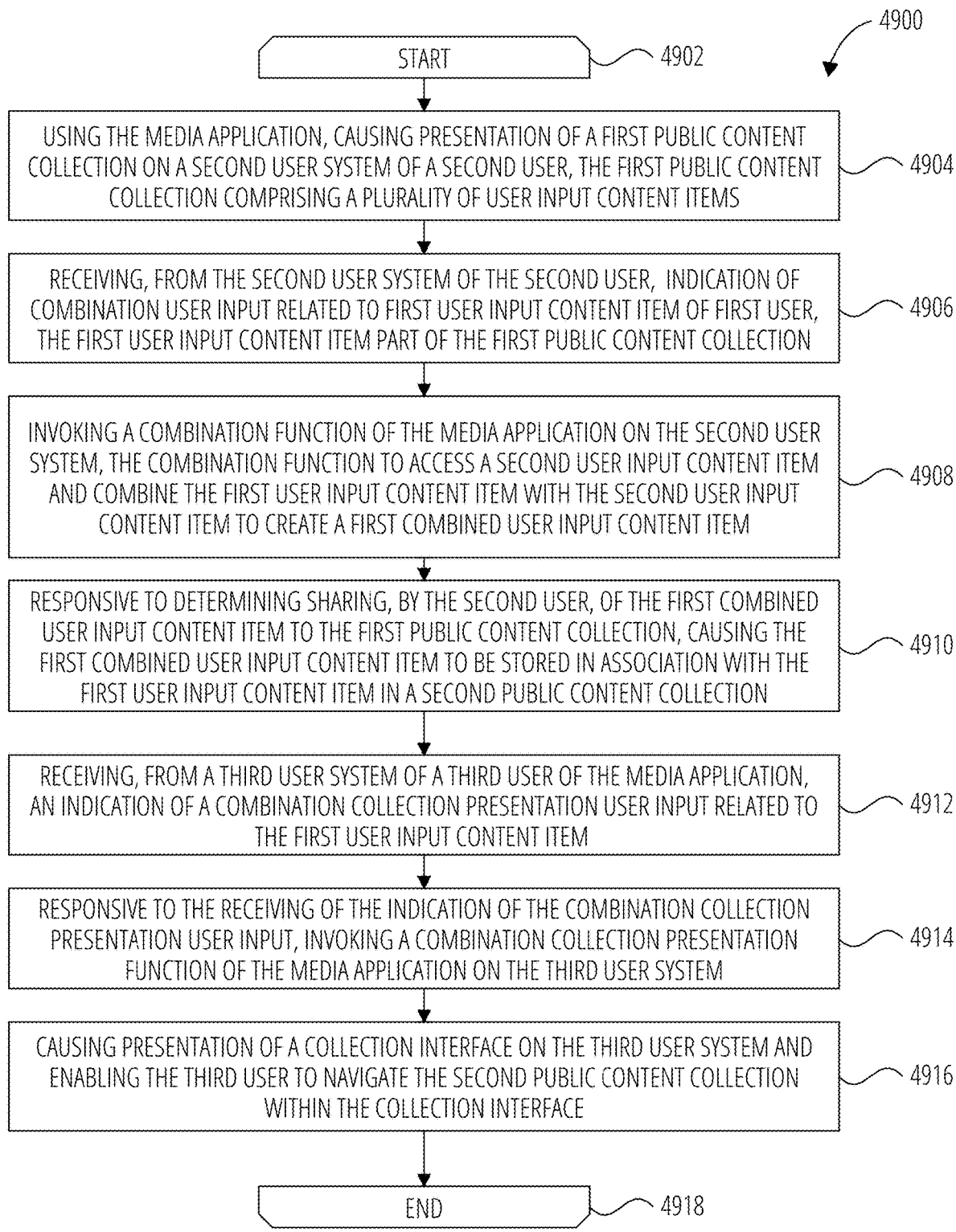
FIG. 49 is a flow diagram illustrating a method including aspects relating to sharing of combined user input content items to content collections.

FIG. 49 is a flowchart illustrating a method 4900, according to some examples, to enable an active user to access a collection interface in a media application, e.g., the interaction client 106. Accordingly, the method 4900 may be performed by components of the interaction system 100. For ease of reference and to facilitate understanding, the four users and their respective user devices 4802, 4804, 4806 and 4808, of FIG. 48, are again referred to in the description provided with reference to FIG. 49 and FIG. 50.

The method 4900 commences at opening loop block 4902 and proceeds to block 4904, where the media application causes presentation of a first public content collection, in the example form of a public feed, on the second user device 4804 of the second user. The public feed includes a number of user input content items that the second user can scroll through, react to, share, and the like. The second user wishes to react to one of these user input content items, being the base item, by creating a visual reaction thereto, and at block 4906, the media application receives, from the second user device 4804 of the second user, an indication of a combination user input related to the base item. The indication of a combination user input related to the base item may, for example, be a selection of a combination graphical element by the second user. The media application may present a combination graphical element in conjunction with the base item on a user interface, with the combination graphical element being user-selectable to invoke the combination function ("remix" function) of the media application.

The method 4900 then proceeds to block 4908 where, responsive to receiving the indication of the combination user input from the second user device 4804, the media application invokes the combination function of the media application on the second user device 4804. The combination function allows the second user to access a second user input content item and combine the first user input content item (base item) with the second user input content item to create a first combined user input content item.

The remix system 206 of the interaction system 100 may detect a third-party authorization for the base item to be combined with other content items in order to create a combined user input content item. For example, an authorization setting related to the base item, indicating this authorization, may be detected. A content creator, e.g., the creator of the base item, when creating or publishing the item, may be presented with the option of either allowing or disallowing the use of the item in combination with other content items, created or originated with other users of the interaction system 100. This allowance/disallowance is then recorded and stored in the database 128 as the authorization setting related to the item, and is accessed to perform the detection of the third-party authorization.

A remix interface may be presented by the camera system 204 and specifically the remix system 206, to enable a user to capture a further content item and combine the further content item with the base item viewed in the public feed, to generate a combined user input content item. The remix interface presents various layout tools for laying out multiple content items relative to each other and within certain layouts. Various augmentation and modification tools may be applied to combined content within the context of the remix interface.

Once a combined user input content item has been created, the second user may be presented with various sharing destinations by the media application. The second user opts to share the first combined user input content item to the public feed, and the interaction system 100 causes the first combined user input content item to become available in the public feed. Further, at block 4910, in response to the sharing of the first combined user input content item to the public feed, the collection management system 226 causes the first combined user input content item to be stored in association with the base item in a second public content collection, as described above with reference to FIG. 48. This allows users accessing the second public content collection to view the newly created "remix" of the base item.

At block 4912, the method 4900 includes receiving, from the third user device 4806 of the third user of the media application, an indication of a combination collection presentation user input related to the base item. This may include causing, by the media application on the third user device 4806, presentation of a combination collection presentation graphical element in conjunction with the base item. The combination collection presentation graphical element is then user-selectable to invoke a combination collection presentation function.

Responsive to receiving the indication of the combination collection presentation user input (e.g., user selection of the combination collection presentation graphical element), the combination collection presentation function of the media application is invoked on the third user device 4806 (block 4914). The combination collection presentation function causes presentation of the collection interface as described with reference to FIG. 48, and examples of which are further described below. The collection interface enables the third user to navigate the second public content collection at block 4916, and may also automatically present a combination element to allow the third user to create their own visual response to the base item. The method 4900 concludes at closing loop block 4918.

Figure 50:
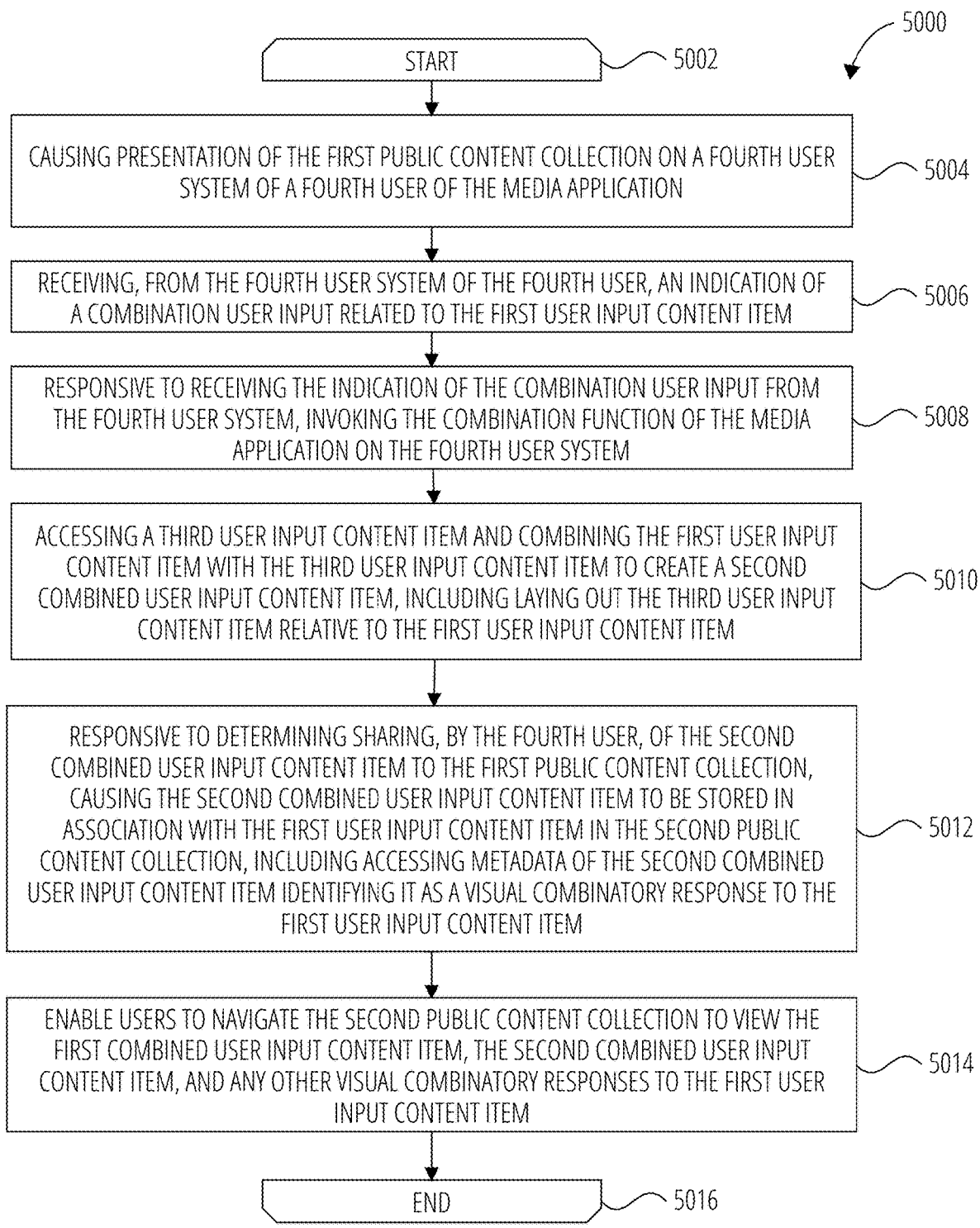
FIG. 50 is a flow diagram illustrating a method including aspects relating to sharing of combined user input content items to content collections.

FIG. 50 is a flowchart illustrating a method 5000, according to some examples, to enable active users to access a collection interface in a media application, e.g., the interaction client 106. The method 5000 may be performed by components of the interaction system 100.

The method 5000 starts at opening loop block 5002 and progresses to block 5004, where the media application causes presentation of the public feed on the fourth user device 4808 of the fourth user. At block 5006, the media application receives, from the fourth user device 4808 of the fourth user, an indication of a combination user input related to the base item. Similarly to the second user, the fourth user is then enabled to create a combined user input content item through the activation of the combination function at block 5008.

The method 5000 proceeds to block 5010, where a third user input content item is accessed and combined with the base item to create a second combined user input content item. It will be appreciated that this process may include laying out the third user input content item relative to the first user input content item, as described elsewhere.

At block 5012, responsive to determining sharing, by the fourth user, of the second combined user input content item to the public feed, the interaction system 100 causes the second combined user input content item to be stored in association with the base item in the second public content collection. The interaction system 100 may access metadata of the second combined user input content item identifying it as a visual combinatory response to the first user input content item. Based on this identification, the interaction system 100 automatically adds the second combined user input content item to the second public content collection. In some examples, a combined user input content item is only added to the second public content collection if it was shared back to the public feed, or designated as "public" (or a similar designation), to ensure that combined user input content items intended for private use, or only intended for sharing with a user's connections or "friends," are not added to the second public content collection for public navigation.

Users of the interaction system 100, such as the third user, can then access the second public content collection to view the first combined user input content item, the second combined user input content item, and any other visual combinatory responses to the base item (block 5014). The method 5000 then ends at closing loop block 5016.

FIG. 51 to FIG. 54 are interface diagrams showing a sequence of user interfaces that may be generated and displayed by the interaction client 106, according to some examples.

FIG. 51 is a user interface diagram showing a viewing interface 5102. An active (viewing) user, when scrolling through a public feed 5104, can view a base item 5106. The public feed 5104 is accessible via a dedicated public feed tab 5116 of the interaction client 106. The base item 5106 is a video clip of a person dancing, with an audio clip (of the same duration) playing at the same time. In FIG. 51, the base item 5106 was created and posted to the public feed 5104 by a first user, "John," using a user device running an instance of the interaction client 106. The first user, "John," may for example have captured a person dancing to the tune of a third-party song—the third-party song is selectable to add it to the video clip as a feature of the interaction system 100.

The viewing interface 5102 includes a profile data element 5108 identifying the first user, and the active user may select the profile data element 5108 in order to view a profile of the first user. The viewing interface 5102 further includes an audio attribution data element 5110 (as an example of an audio identifier) identifying the audio clip and an augmentation identifier 5112 identifying an augmentation applied to the base item by the first user. Where the audio clip is a third-party song, the audio identifier may thus give suitable recognition to the artist associated with the song.

Responsive to user selection of an action menu button 5114, an action menu 5202 is presented.

FIG. 52 is a user interface diagram showing the viewing interface 5102 with the action menu 5202 presented. One of the options presented to the active user by way of the action menu 5202 is a combination graphical element in the example form of a remix button 5204. The remix button 5204 is user-selectable to invoke the media application's combination function. Selection of the remix button 5204 causes presentation of a remix interface 5302.

In some examples, the active user may perform a different action, such as a press and hold gesture on the base item 5106, to invoke the combination function (with no action menu being presented).

The remix interface 5302 (also referred to as a combination interface) is shown in FIG. 53, according to some examples. The remix interface 5302 is presented by the camera system 204 and specifically the remix system 206, responsive to user-selection of the remix button 5204, to provide a modular camera enabling a user to capture a further content item and combine the further content item with the third-party content item (base item) viewed in the viewing interface 5102, to generate a combined user input content item. The remix interface 5302 presents various augmentation and modification tools in an augmentation carousel 5304, that may be applied to combined content within the context of the remix interface 5302, and also presents various camera controls 5306.

While an augmentation carousel 5304 is shown in FIG. 53, with a lens 5312 selected, in other examples, the remix interface 5302 may include only a remix capture button similar to the remix interface 4602 shown in FIG. 46 (without any lenses or augmentation elements).

It will be evident from FIG. 53 that, in some examples, the user may capture the second user input content item such that it is overlaid over the base item. Specifically, in FIG. 53, the active user captures a second user input content item 5308 in the example form of a video reaction to the video clip of the base item 5106. However, various other layout options may be applied, as shown, for example, in the remix interface 4602 of FIG. 46.

The media application on the active user's device includes a camera function, causing presentation a digital image feed from at least one camera of the user device in the remix interface 5302. The media application receives user capture input from the active user via the remix interface 5302 and, in response thereto, captures digital image content (in FIG. 53, this is in the form of a video clip) as the second user input content item 5308 and stores it to be accessible by the media application on the user device.

Once captured, this creates a combined user input content item 5310. In FIG. 53, the combined user input content item 5310 is a combined video clip, showing both the video of the base item 5106 and the active user's video reaction/response. Further, the audio content associated with the base item 5106 is carried over into the combined user input content item 5310 such that the "original" audio clip from the base item 5106 also plays when the combined user input content item 5310 is played. Accordingly, the audio identifier of the base item 5106 can be carried through to the combined user input content item 5310 such that, when the combined user input content item 5310 is presented to another user, it is presented in conjunction with the audio identifier.

After creating the combined user input content item 5310, the active user may be enabled to save the combined user input content item 5310, e.g., to a "Memories" tab, and may also share the combined user input content item 5310, e.g., to the public feed of the interaction system 100.

Figure 54:
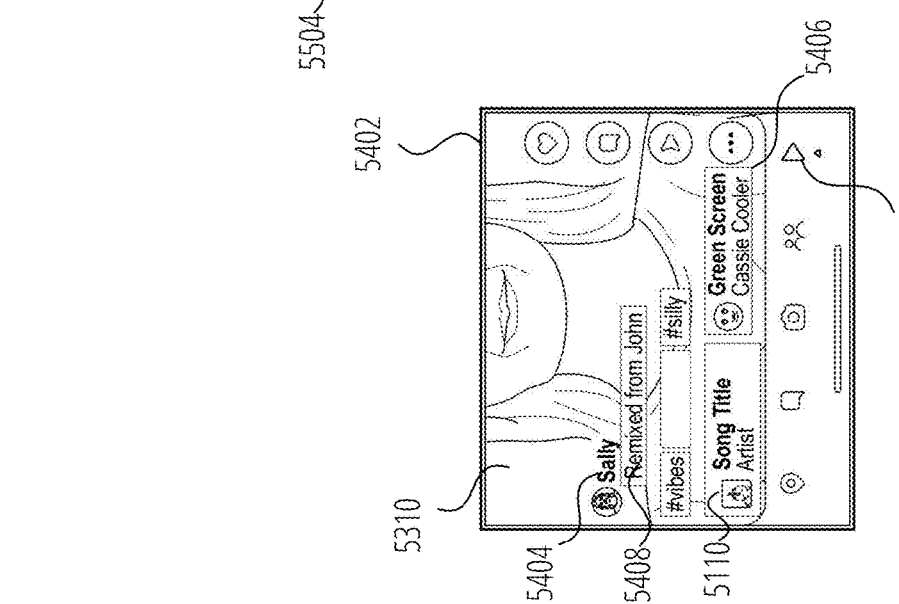
FIG. 54 is a user interface diagram, showing part of a user interface, illustrating aspects relating to sharing of combined user input content items to content collections.

FIG. 54 is a user interface diagram showing a bottom region of the finalized and published combined user input content item 5310, being viewed by a third-party user in a viewing interface 5402. The third-party user views the combined user input content item 5310 via the public feed tab 5116 providing access to the public feed.

The viewing interface 5402 includes a profile data element 5404 identifying the user responsible for creating the "remix" (in this case, "Sally"), as well as a base item attribution element 5408. The attribution element 5408 identifies the creator of the base item ("first user", in this case, "John"), being the original content that was "remixed." In some examples, the base item attribution element 5408 may identify the base item itself. The elements 5404 and 5408 are user-selectable to enable the third-party user to view the profile of the user associated with the element 5404/5408. In some examples, the base item attribution element 5408 is user-selectable to cause presentation of the (original) base item. In other words, the third-party user can select the base item attribution element 5408 to view the base item without any combination content.

The viewing interface 5402 further includes an audio attribution data element 5110 (as an example of an audio identifier) identifying the audio clip. This is the same audio clip as the audio clip identified in FIG. 51. As mentioned above, in examples where a third-party song is used, the audio identifier gives the appropriate credit to the artist. An augmentation identifier 5406 identifies an augmentation applied to the combined user input content item.

The interaction system 100 may be configured to handle attribution data differently for users with different profile types. For example, if a user has a public profile, an attribution element like the base item attribution element 5408 may be shown, which includes the identity of the creator. If a user has a private profile, the attribution element may simply indicate, for example, that the content item has been "remixed from the public feed," without revealing the identity of the creator.

Figure 56:
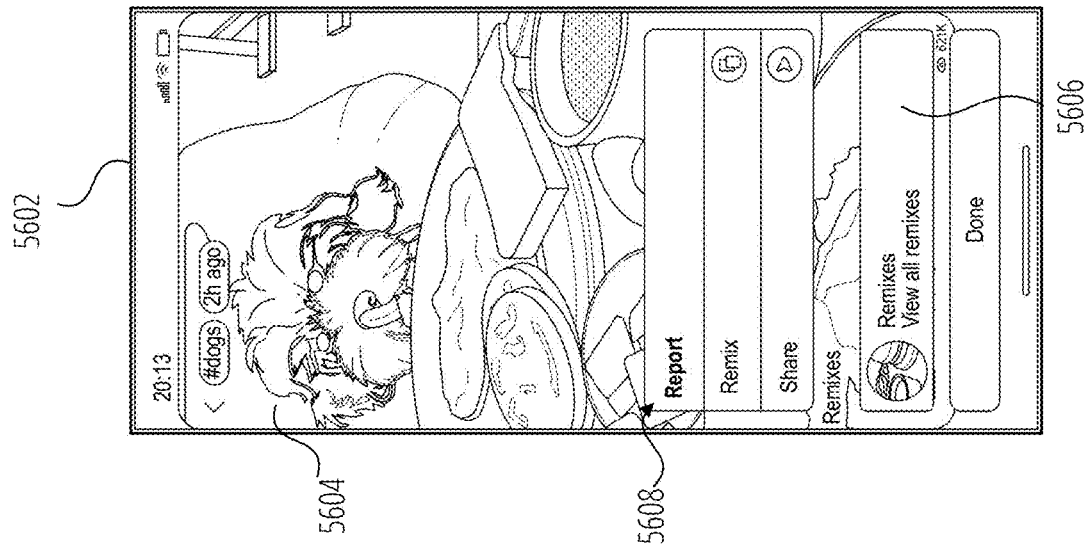
FIG. 56 is a user interface diagram illustrating aspects relating to sharing of combined user input content items to content collections.
Figure 55:
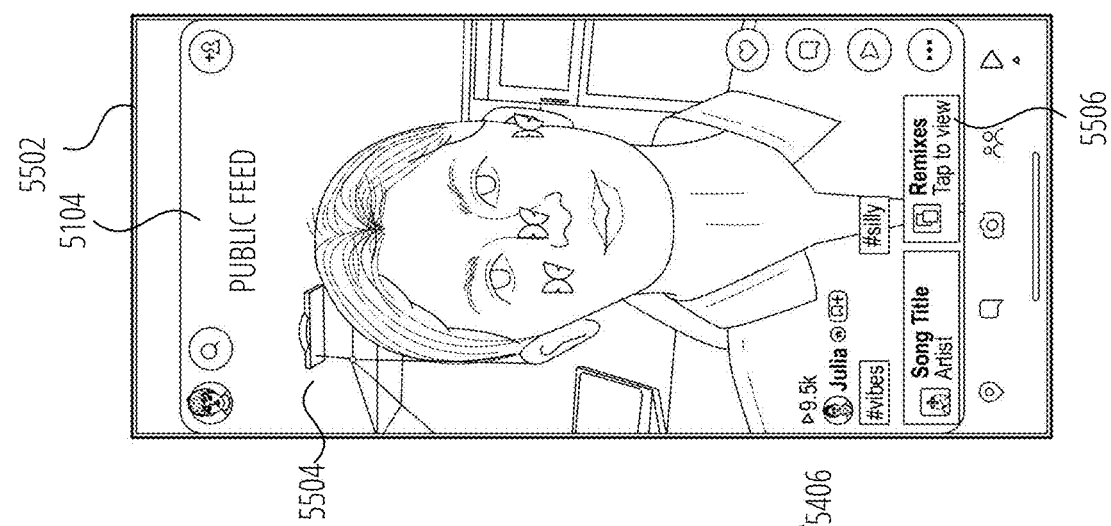
FIG. 55 is a user interface diagram illustrating aspects relating to sharing of combined user input content items to content collections.

As alluded to above, an active user may wish to view combined user input content items ("remixes") made from a particular base item in a consolidated location. FIG. 55 and FIG. 56 are user interface diagrams showing different entry points to a collection interface that provides such a view, together with further functionality, according to some examples.

In FIG. 55, a viewing interface 5502 displays a base item 5504 being viewed on the public feed 5104. The viewing interface 5502 presents, to the active user, a combination collection presentation graphical element 5506. The combination collection presentation graphical element 5506 is shown in conjunction with the base item 5504, and is user-selectable to invoke a combination collection presentation function. In other words, responsive to receiving combination collection presentation user input in the example form of user selection of the combination collection presentation graphical element 5506, the combination collection presentation function is invoked.

In some examples, the interaction system 100 may thus determine that a base item has been used to create one or more combined user input content items that were shared publicly in the interaction system 100, and in response, cause the combination collection presentation graphical element 5506 to be presented automatically in the viewing interface 5502. If a base item was not shared publicly, e.g., was only shared as a direct message to a specific user or to the sharing user's private story, no combination collection presentation graphical element is presented.

In FIG. 56, a viewing interface 5602 does not display a combination collection presentation graphical element automatically. Instead, in response to user selection of an action menu button (similar to the action menu button 5114) while viewing a base item 5604, an action menu 5608 is presented. The action menu 5608 includes a combination collection presentation graphical element 5606.

FIG. 57 is a user interface diagram showing a collection interface 5702, according to some examples. The collection interface 5702 is presented in response to user selection of the combination collection presentation graphical element 5606, and allows the viewing user to navigate all combined user input content items created from the base item 5604.

The collection interface 5702 includes, in a top section, a base item thumbnail 5704 identifying the base item 5604, together with a written base item identifier 5706. Combination data 5710, in the case of FIG. 57 indicating that the base item 5604 has been "remixed" a total of 106 times, is also displayed in the top section.

Below the top section, the collection interface 5702 presents a scrollable (or otherwise navigable) grid 5708 of all "remixes" created from the base item 5604. In the case of FIG. 57, the viewing user can scroll through all the "remixes," select them, react to them, etc. This collection of "remixes," all linked to the same base item, is referred to in some examples as a "second public content collection" (the general public feed being the "first public content collection" in some examples).

The collection interface 5702 presents a remix button 5712 to allow the viewing user to create a further "remix" of the base item 5604 and, if the user opts to do so, add it to the second public content collection. Accordingly, in some examples, activating the combination collection presentation function of the media application on a user device (e.g., user system 104) may include causing presentation of a combination graphical element, e.g., a remix button, within the collection interface, with the combination graphical element being user-selectable to invoke the combination function to allow the user to access (e.g., capture) a further user input content item and combine the original (base) user input content item with the further user input content item to create another combined user input content item. This provides a convenient way for a viewing user not only to view all "remixes" linked to a certain original content item, but also to automatically have the option to create their own "remix." A "remix" may be seen as a way of responding, reacting or replying to another user's post, and examples of the present disclosure thus provide a technological tool facilitating community creativity, allowing users to express themselves and interact across such a community. In some examples, e.g., in the case of FIG. 57, the "remixes" are visual combinatory responses to a creator's original/base item, and each user creating a combined user input content item can add new visual content in response to the original/base item.

FIG. 58 is a user interface diagram showing a viewing interface 5802, according to some examples, presenting a view of a base item from which combined user input content items have been made. The viewing interface 5802 is presented to the creator of the base item. In other words, when a user is viewing their own user input content item that has been posted to the public feed, an interface such as the viewing interface 5802 may be presented.

The viewing interface 5802 includes a combination information cell 5804. In some examples, the combination information cell 5804 displays a count of all "remixes" made by users from the base item. This count may include all "remixes," irrespective of whether they were shared publicly. In other words, private content such as a "remix" shared only via direct message may also be added to the count. This provides a creator with an indication of the degree of interaction with the base item by users, together with other counts, such as the number of likes (see the element 5806) and the number of shares (see the element 5808).

In some examples, the combination information cell 5804 is user-selectable to invoke the combination collection presentation function. In other words, responsive to receiving combination collection presentation user input in the example form of user selection of the combination information cell 5804, the combination collection presentation function is invoked to present, to the creator of the base item, a collection interface. The collection interface, however, only includes "remixes" that have been publicly shared or posted, hence the number of combined user input content items in the second public content collection may be less than the count shown to the creator in FIG. 58.

In order to inform users and facilitate use of the aforementioned features, a tooltip may be displayed to users to alert them of the option to create a combined user input content item from a base item being viewed in the public feed. FIG. 59 is a user interface diagram showing a viewing interface 5902, according to some examples, presenting a view of a base item in the public feed tab 5116. The action menu button 5114 is presented together with a tooltip 5904 pointing to the action menu button 5114. This alerts the user to the option available in the action menu, as described with reference to FIG. 52.

Data Communications Architecture

Figure 60:
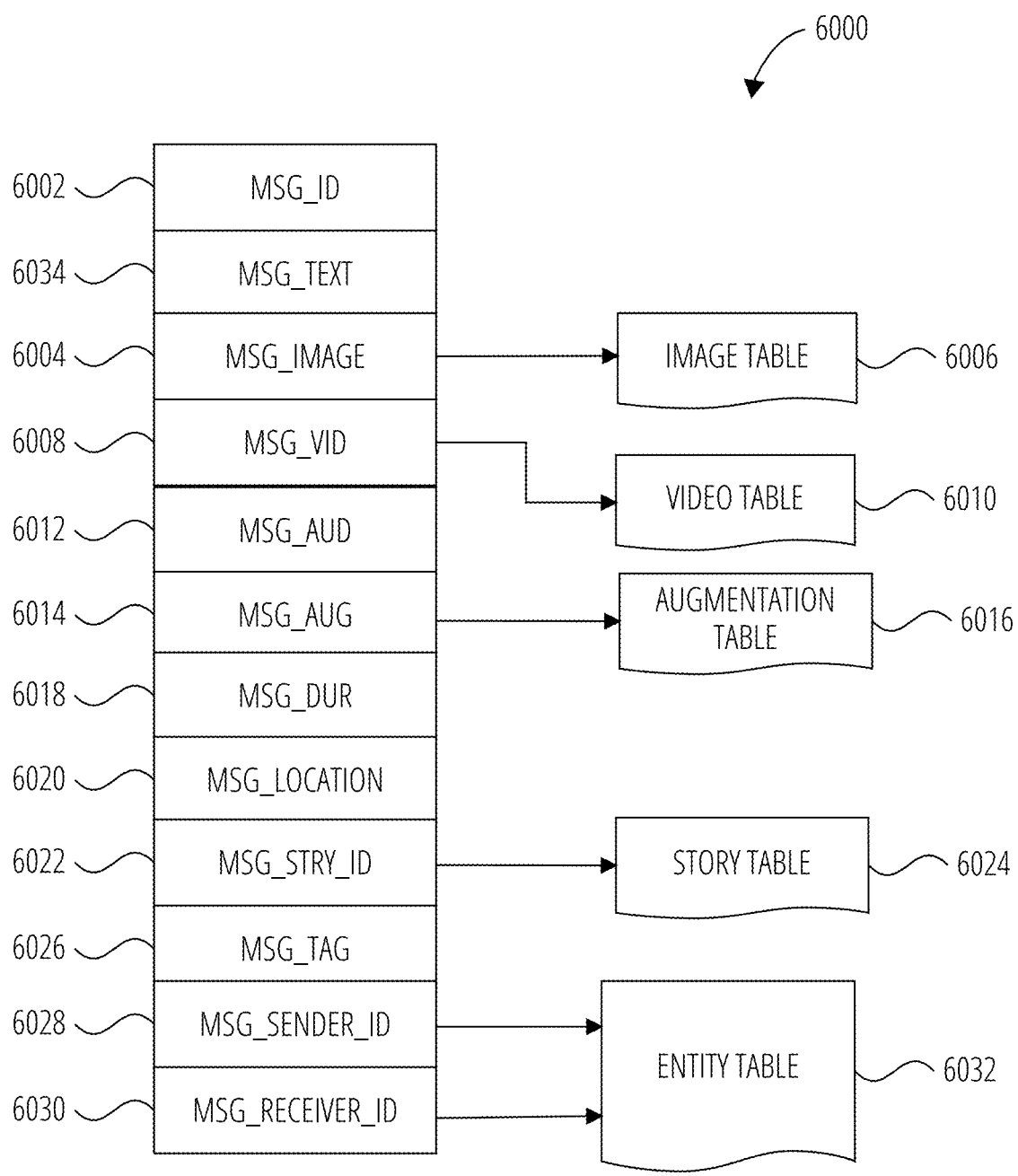
FIG. 60 is a diagrammatic representation of a message, according to some examples.

FIG. 60 is a schematic diagram illustrating a structure of a message 6000, according to some examples, generated by an interaction client 106 for communication to a further interaction client 106 via the interaction servers 124. The content of a particular message 6000 is used to populate the message table 306 stored within the database 304, accessible by the interaction servers 124. Similarly, the content of a message 6000 is stored in memory as "in-transit" or "in-flight" data of the user system 104 or the interaction servers 124. A message 6000 is shown to include the following example components:

- Message identifier 6002: a unique identifier that identifies the message 6000.
- Message text payload 404: text, to be generated by a user via a user interface of the user system 104, and that is included in the message 6000.
- Message image payload 6004: image data, captured by a camera component of a user system 104 or retrieved from a memory component of a user system 104, and that is included in the message 6000. Image data for a sent or received message 6000 may be stored in the image table 6006.
- Message video payload 6008: video data, captured by a camera component or retrieved from a memory component of the user system 104, and that is included in the message 6000. Video data for a sent or received message 6000 may be stored in the video table 6010.
- Message audio payload 6012: audio data, captured by a microphone or retrieved from a memory component of the user system 104, and that is included in the message 6000.
- Message augmentation data 6014: augmentation data (e.g., filters, stickers, or other annotations or enhancements) that represents augmentations to be applied to message image payload 6004, message video payload 6008, or message audio payload 6012 of the message 6000. Augmentation data for a sent or received message 6000 may be stored in the augmentation table 6016.
- Message duration parameter 6018: parameter value indicating, in seconds, the amount of time for which content of the message (e.g., the message image payload 6004, message video payload 6008, message audio payload 6012) is to be presented or made accessible to a user via the interaction client 106.
- Message geolocation parameter 6020: geolocation data (e.g., latitudinal and longitudinal coordinates) associated with the content payload of the message. Multiple message geolocation parameter 6020 values may be included in the payload, each of these parameter values being associated with respect to content items included in the content (e.g., a specific image within the message image payload 6004, or a specific video in the message video payload 6008).

Message story identifier 6022: identifier values identifying one or more content collections (e.g., "stories" identified in the story table 6024) with which a particular content item in the message image payload 6004 of the message 6000 is associated. For example, multiple images within the message image payload 6004 may each be associated with multiple content collections using identifier values.

Message tag 6026: each message 6000 may be tagged with multiple tags, each of which is indicative of the subject matter of content included in the message payload. For example, where a particular image included in the message image payload 6004 depicts an animal (e.g., a lion), a tag value may be included within the message tag 6026 that is indicative of the relevant animal. Tag values may be generated manually, based on user input, or may be automatically generated using, for example, image recognition.

Message sender identifier 6028: an identifier (e.g., a messaging system identifier, email address, or device identifier) indicative of a user of the user system 104 on which the message 6000 was generated and from which the message 6000 was sent.

Message receiver identifier 6030: an identifier (e.g., a messaging system identifier, email address, or device identifier) indicative of a user of the user system 104 to which the message 6000 is addressed.

The contents (e.g., values) of the various components of message 6000 may be pointers to locations in tables within which content data values are stored. For example, an image value in the message image payload 6004 may be a pointer to (or address of) a location within an image table 6006. Similarly, values within the message video payload 6008 may point to data stored within a video table 6010, values stored within the message augmentation data 6014 may point to data stored in an augmentation table 6016, values stored within the message story identifier 6022 may point to data stored in a story table 6024, and values stored within the message sender identifier 6028 and the message receiver identifier 6030 may point to user records stored within an entity table 6032.

Machine Architecture

Figure 61:
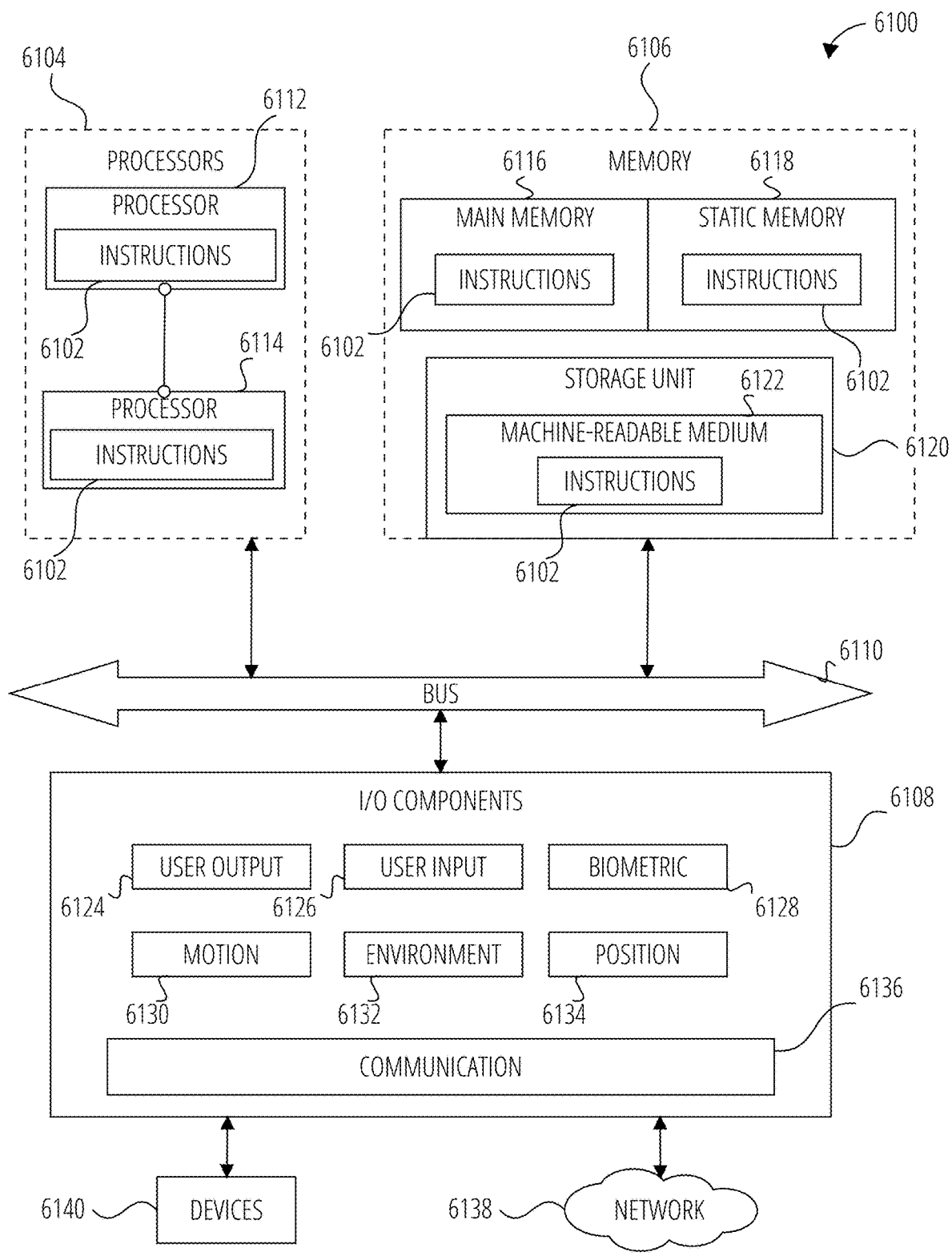
FIG. 61 is a diagrammatic representation of a machine in the form of a computer system within which a set of instructions may be executed for causing the machine to perform any one or more of the methodologies discussed herein, according to some examples.

FIG. 61 is a diagrammatic representation of the machine 6100 within which instructions 6102 (e.g., software, a program, an application, an applet, an app, or other executable code) for causing the machine 6100 to perform any one or more of the methodologies discussed herein may be executed. For example, the instructions 6102 may cause the machine 6100 to execute any one or more of the methods described herein. The instructions 6102 transform the general, non-programmed machine 6100 into a particular machine 6100 programmed to carry out the described and illustrated functions in the manner described. The machine 6100 may operate as a standalone device or may be coupled (e.g., networked) to other machines. In a networked deployment, the machine 6100 may operate in the capacity of a server machine or a client machine in a server-client network environment, or as a peer machine in a peer-to-peer (or distributed) network environment. The machine 6100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 6102, sequentially or otherwise, that specify actions to be taken by the machine 6100. Further, while a single machine 6100 is illustrated, the term "machine" shall also be taken to include a collection of machines that individually or jointly execute the instructions 6102 to perform any one or more of the methodologies discussed herein. The machine 6100, for example, may comprise the user system 104 or any one of multiple server devices forming part of the interaction server system 102. In some examples, the machine 6100 may also comprise both client and server systems, with certain operations of a particular method or algorithm being performed on the server-side and with certain operations of the particular method or algorithm being performed on the client-side.

The machine 6100 may include processors 6104, memory 6106, and input/output I/O components 6108, which may be configured to communicate with each other via a bus 6110. In an example, the processors 6104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 6112 and a processor 6114 that execute the instructions 6102. The term "processor" is intended to include multi-core processors that may comprise two or more independent processors (sometimes referred to as "cores") that may execute instructions contemporaneously. Although FIG. 61 shows multiple processors 6104, the machine 6100 may include a single processor with a single-core, a single processor with multiple cores (e.g., a multi-core processor), multiple processors with a single core, multiple processors with multiples cores, or any combination thereof.

The memory 6106 includes a main memory 6116, a static memory 6118, and a storage unit 6120, both accessible to the processors 6104 via the bus 6110. The main memory 6106, the static memory 6118, and storage unit 6120 store the instructions 6102 embodying any one or more of the methodologies or functions described herein. The instructions 6102 may also reside, completely or partially, within the main memory 6116, within the static memory 6118, within machine-readable medium 6122 within the storage unit 6120, within at least one of the processors 6104 (e.g., within the processor's cache memory), or any suitable combination thereof, during execution thereof by the machine 6100.

The I/O components 6108 may include a wide variety of components to receive input, provide output, produce output, transmit information, exchange information, capture measurements, and so on. The specific I/O components 6108 that are included in a particular machine will depend on the type of machine. For example, portable machines such as mobile phones may include a touch input device or other such input mechanisms, while a headless server machine will likely not include such a touch input device. It will be appreciated that the I/O components 6108 may include many other components that are not shown in FIG. 61. In various examples, the I/O components 6108 may include user output components 6124 and user input components 6126. The user output components 6124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 6126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 6108 may include biometric components 6128, motion components 6130, environmental components 6132, or position components 6134, among a wide array of other components. For example, the biometric components 6128 include components to determine expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 6130 include acceleration sensor components (e.g., accelerometer), gravitation sensor components, rotation sensor components (e.g., gyroscope).

The environmental components 6132 include, for example, one or cameras (with still image/photograph and video capabilities), illumination sensor components (e.g., photometer), temperature sensor components (e.g., one or more thermometers that determine ambient temperature), humidity sensor components, pressure sensor components (e.g., barometer), acoustic sensor components (e.g., one or more microphones that determine background noise), proximity sensor components (e.g., infrared sensors that determine nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 104 may have a camera system comprising, for example, front cameras on a front surface of the user system 104 and rear cameras on a rear surface of the user system 104. The front cameras may, for example, be used to capture still images and video of a user of the user system 104 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 104 may also include a 360° camera for capturing 360° photographs and videos.

Further, the camera system of the user system 104 may include dual rear cameras (e.g., a primary camera as well as a depth-sensing camera), or even triple, quad or penta rear camera configurations on the front and rear sides of the user system 104. These multiple cameras systems may include a wide camera, an ultra-wide camera, a telephoto camera, a macro camera, and a depth sensor, for example.

The position components 6134 include location sensor components (e.g., a GPS receiver component), altitude sensor components (e.g., altimeters or barometers that determine air pressure from which altitude may be derived), orientation sensor components (e.g., magnetometers), and the like.

Communication may be implemented using a wide variety of technologies. The I/O components 6108 further include communication components 6136 operable to couple the machine 6100 to a network 6138 or devices 6140 via respective coupling or connections. For example, the communication components 6136 may include a network interface component or another suitable device to interface with the network 6138. In further examples, the communication components 6136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 6140 may be another machine or any of a wide variety of peripheral devices (e.g., a peripheral device coupled via a USB).

Moreover, the communication components 6136 may determine identifiers or include components operable to determine identifiers. For example, the communication components 6136 may include Radio Frequency Identification (RFID) tag reader components, NFC smart tag detection components, optical reader components (e.g., an optical sensor to determine one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 6136, such as location via Internet Protocol (IP) geolocation, location via Wi-Fi® signal triangulation, location via determining an NFC beacon signal that may indicate a particular location, and so forth.

The various memories (e.g., main memory 6116, static memory 6118, and memory of the processors 6104) and storage unit 6120 may store one or more sets of instructions and data structures (e.g., software) embodying or used by any one or more of the methodologies or functions described herein. These instructions (e.g., the instructions 6102), when executed by processors 6104, cause various operations to implement the disclosed examples.

The instructions 6102 may be transmitted or received over the network 6138, using a transmission medium, via a network interface device (e.g., a network interface component included in the communication components 6136) and using any one of several well-known transfer protocols (e.g., hypertext transfer protocol (HTTP)). Similarly, the instructions 6102 may be transmitted or received using a transmission medium via a coupling (e.g., a peer-to-peer coupling) to the devices 6140.

System with Head-Wearable Apparatus

Figure 62:
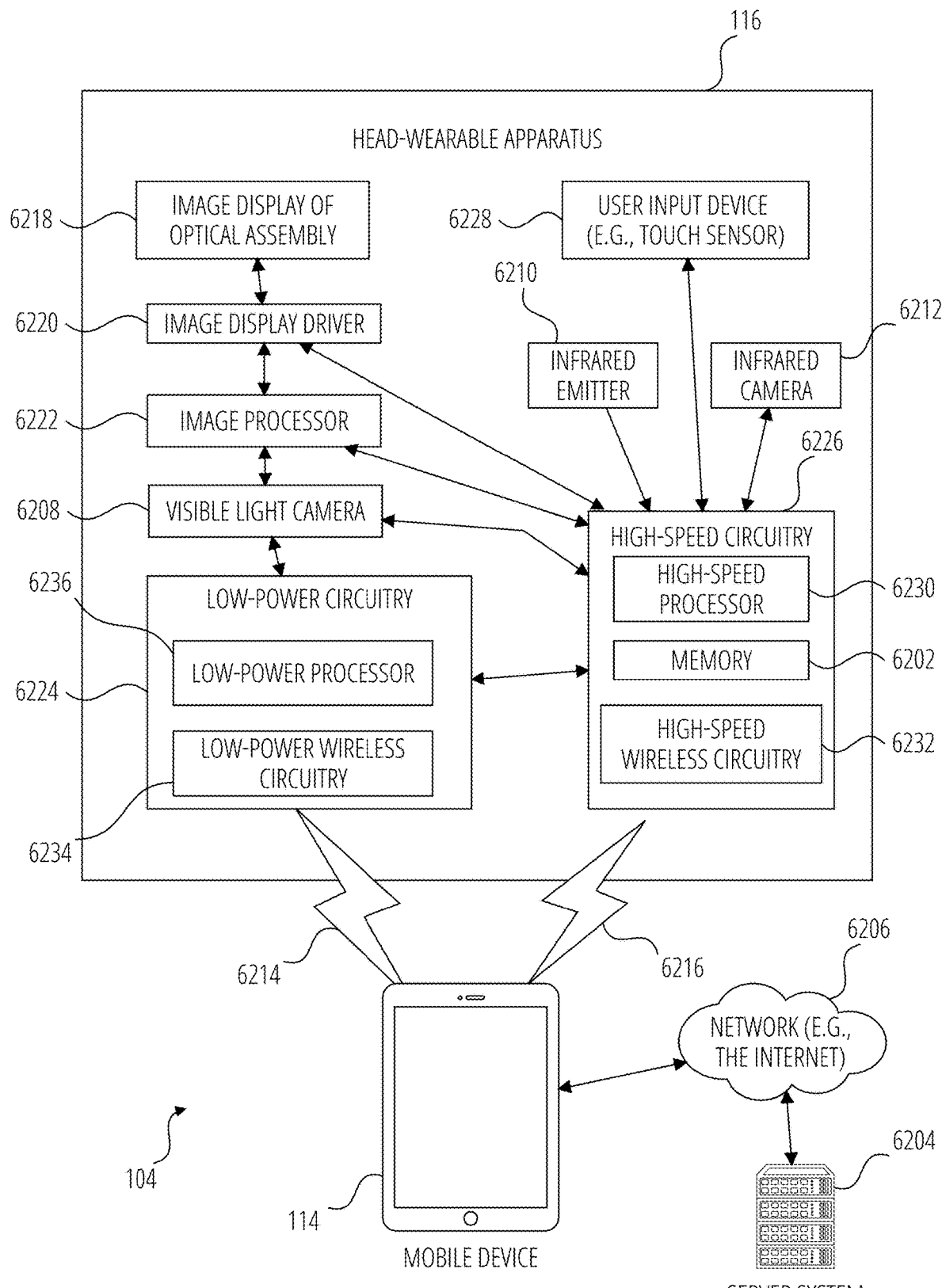
FIG. 62 illustrates a system in which the head-wearable apparatus, according to some examples.

FIG. 62 illustrates a user system 104 including a head-wearable apparatus 116 with a selector input device, according to some examples. FIG. 62 is a high-level functional block diagram of an example head-wearable apparatus 116 communicatively coupled to a mobile device 114 and a server system 6204 via various network 6206.

The head-wearable apparatus 116 includes one or more cameras, each of which may be, for example, a visible light camera 6208, an infrared emitter 6210, and an infrared camera 6212.

The mobile device 114 connects with head-wearable apparatus 116 using both a low-power wireless connection 6214 and a high-speed wireless connection 6216. The mobile device 114 is also connected to the server system 6204 and the network 6206.

The head-wearable apparatus 116 further includes two image displays of the image display of optical assembly 6218. The two image displays of optical assembly 6218 include one associated with the left lateral side and one associated with the right lateral side of the head-wearable apparatus 116. The head-wearable apparatus 116 also includes an image display driver 6220, an image processor 6222, low-power circuitry 6224, and high-speed circuitry 6226. The image display of optical assembly 6218 is for presenting images and videos, including an image that can include a graphical user interface to a user of the head-wearable apparatus 116.

The image display driver 6220 commands and controls the image display of optical assembly 6218. The image display driver 6220 may deliver image data directly to the image display of optical assembly 6218 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 6228 (e.g., a touch sensor or push button), including an input surface on the head-wearable apparatus 116. The user input device 6228 (e.g., touch sensor or push button) is to receive from the user an input selection to manipulate the graphical user interface of the presented image.

The components shown in FIG. 62 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 6208 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 6202, which stores instructions to perform a subset or all of the functions described herein. The memory 6202 can also include storage device.

As shown in FIG. 62, the high-speed circuitry 6226 includes a high-speed processor 6230, a memory 6202, and high-speed wireless circuitry 6232. In some examples, the image display driver 6220 is coupled to the high-speed circuitry 6226 and operated by the high-speed processor 6230 in order to drive the left and right image displays of the image display of optical assembly 6218. The high-speed processor 6230 may be any processor capable of managing high-speed communications and operation of any general computing system needed for the head-wearable apparatus 116. The high-speed processor 6230 includes processing resources needed for managing high-speed data transfers on a high-speed wireless connection 6216 to a wireless local area network (WLAN) using the high-speed wireless circuitry 6232. In certain examples, the high-speed processor 6230 executes an operating system such as a LINUX operating system or other such operating system of the head-wearable apparatus 116, and the operating system is stored in the memory 6202 for execution. In addition to any other responsibilities, the high-speed processor 6230 executing a software architecture for the head-wearable apparatus 116 is used to manage data transfers with high-speed wireless circuitry 6232. In certain examples, the high-speed wireless circuitry 6232 is configured to implement Institute of Electrical and Electronic Engineers (IEEE) 802.11 communication standards, also referred to herein as WiFi. In some examples, other high-speed communications standards may be implemented by the high-speed wireless circuitry 6232.

The low-power wireless circuitry 6234 and the high-speed wireless circuitry 6232 of the head-wearable apparatus 116 can include short-range transceivers (Bluetooth™) and wireless wide, local, or wide area network transceivers (e.g., cellular or WiFi). mobile device 114, including the transceivers communicating via the low-power wireless connection 6214 and the high-speed wireless connection 6216, may be implemented using details of the architecture of the head-wearable apparatus 116, as can other elements of the network 6206.

The memory 6202 includes any storage device capable of storing various data and applications, including, among other things, camera data generated by the left and right visible light cameras 6208, the infrared camera 6212, and the image processor 6222, as well as images generated for display by the image display driver 6220 on the image displays of the image display of optical assembly 6218. While the memory 6202 is shown as integrated with high-speed circuitry 6226, in some examples, the memory 6202 may be an independent standalone element of the head-wearable apparatus 116. In certain such examples, electrical routing lines may provide a connection through a chip that includes the high-speed processor 6230 from the image processor 6222 or the low-power processor 6236 to the memory 6202. In some examples, the high-speed processor 6230 may manage addressing of the memory 6202 such that the low-power processor 6236 will boot the high-speed processor 6230 any time that a read or write operation involving memory 6202 is needed.

As shown in FIG. 62, the low-power processor 6236 or high-speed processor 6230 of the head-wearable apparatus 116 can be coupled to the camera (visible light camera 6208, infrared emitter 6210, or infrared camera 6212), the image display driver 6220, the user input device 6228 (e.g., touch sensor or push button), and the memory 6202.

The head-wearable apparatus 116 is connected with a host computer. For example, the head-wearable apparatus 116 is paired with the mobile device 114 via the high-speed wireless connection 6216 or connected to the server system 6204 via the network 6206. The server system 6204 may be one or more computing devices as part of a service or network computing system, for example, that includes a processor, a memory, and network communication interface to communicate over the network 6206 with the mobile device 114 and the head-wearable apparatus 116.

The mobile device 114 includes a processor and a network communication interface coupled to the processor. The network communication interface allows for communication over the network 6206, low-power wireless connection 6214, or high-speed wireless connection 6216. mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 6220. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 6204, such as the user input device 6228, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to determine expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that determine air pressure from which altitude may be derived), orientation sensor components (e.g., magnetometers), and the like. Such positioning system coordinates can also be received over low-power wireless connections 6214 and high-speed wireless connection 6216 from the mobile device 114 via the low-power wireless circuitry 6234 or high-speed wireless circuitry 6232.

Software Architecture

Figure 63:
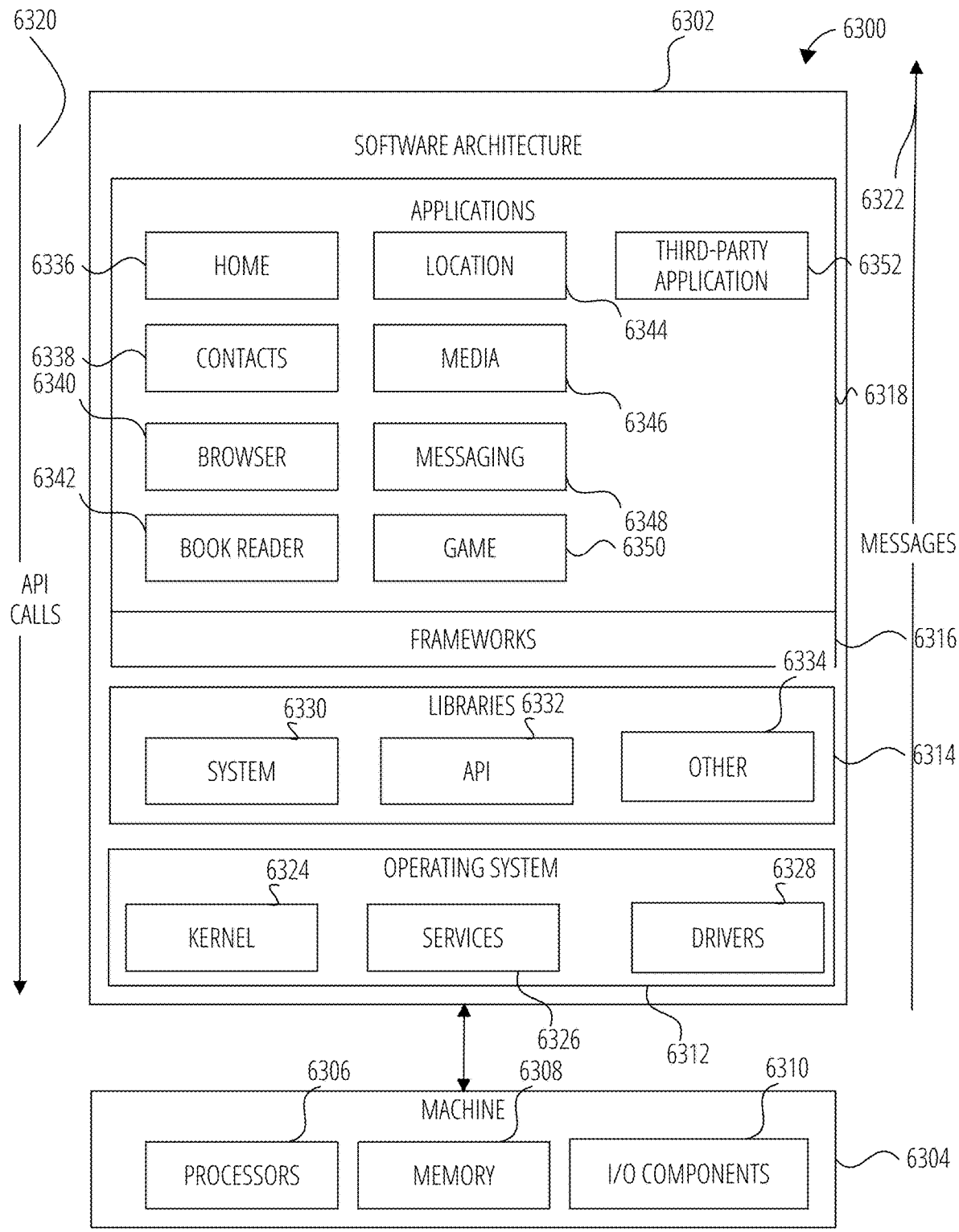
FIG. 63 is a block diagram showing a software architecture within which examples may be implemented.

FIG. 63 is a block diagram 6300 illustrating a software architecture 6302, which can be installed on any one or more of the devices described herein. The software architecture 6302 is supported by hardware such as a machine 6304 that includes processors 6306, memory 6308, and I/O components 6310. In this example, the software architecture 6302 can be conceptualized as a stack of layers, where each layer provides a particular functionality. The software architecture 6302 includes layers such as an operating system 6312, libraries 6314, frameworks 6316, and applications 6318.

Operationally, the applications 6318 invoke API calls 6320 through the software stack and receive messages 6322 in response to the API calls 6320.

The operating system 6312 manages hardware resources and provides common services. The operating system 6312 includes, for example, a kernel 6324, services 6326, and drivers 6328. The kernel 6324 acts as an abstraction layer between the hardware and the other software layers. For example, the kernel 6324 provides memory management, processor management (e.g., scheduling), component management, networking, and security settings, among other functionalities. The services 6326 can provide other common services for the other software layers. The drivers 6328 are responsible for controlling or interfacing with the underlying hardware. For instance, the drivers 6328 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 6314 provide a common low-level infrastructure used by the applications 6318. The libraries 6314 can include system libraries 6330 (e.g., C standard library) that provide functions such as memory allocation functions, string manipulation functions, mathematic functions, and the like. In addition, the libraries 6314 can include API libraries 6332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 6314 can also include a wide variety of other libraries 6334 to provide many other APIs to the applications 6318.

The frameworks 6316 provide a common high-level infrastructure that is used by the applications 6318. For example, the frameworks 6316 provide various graphical user interface (GUI) functions, high-level resource management, and high-level location services. The frameworks 6316 can provide a broad spectrum of other APIs that can be used by the applications 6318, some of which may be specific to a particular operating system or platform.

In an example, the applications 6318 may include a home application 6336, a contacts application 6338, a browser application 6340, a book reader application 6342, a location application 6344, a media application 6346, a messaging application 6348, a game application 6350, and a broad assortment of other applications such as a third-party application 6352. The applications 6318 are programs that execute functions defined in the programs. Various programming languages can be employed to create one or more of the applications 6318, structured in a variety of manners, such as object-oriented programming languages (e.g., Objective-C, Java, or C++) or procedural programming languages (e.g., C or assembly language). In a specific example, the third-party application 6352 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 6352 can invoke the API calls 6320 provided by the operating system 6312 to facilitate functionalities described herein.

CONCLUSION

Although the examples, including exemplary flow diagrams, may depict a particular sequence of operations, sequence/s may be altered without departing from the scope of the present disclosure. For example, some of the operations depicted may be performed in parallel or in a different sequence that does not materially affect the function of the described component, system or process. In other examples, different components of an example device or system that implements a method or process, may perform functions at substantially the same time or in a specific sequence.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

The terms "combined" and "combination", e.g., when used to refer to combined content items and/or combination functions, refer to content items or content data that have been, or may be, combined in any suitable manner. Examples may include combinations of two or more images, combinations of two or more video clips, or the like. Examples may also include combinations of different content types, e.g., a video clip combined with a still image, or a video clip combined with an audio item, or combinations thereof. Such combinations may be arranged in different ways, e.g., items may be displayed or played concurrently, sequentially, or in an overlapping fashion, and items may be arranged using different layout options, e.g., overlays, split screens, or the like, with examples being described herein.

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network. In a context where such a device is used by a user, a "client device" may be referred to as a "user device".

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User input content" refers to any form of content that may be posted, published, shared, sent, received or interacted with by a user, e.g., using an online platform. User input content may, for example, include digital content in the form of one or more image, photo, video clip, audio clip, or a combination thereof. A user input content item may, in some examples, be a UGC (user-generated content) item. User input content may, for example, have an augmentation applied to it (e.g., a lens, a filter, a media overlay, or other augmentation). A user input content item may be generated by a user, for example, where the content item is captured by a user using a digital camera of a user device, or, for example, where the content item is created by the user by applying an augmentation to another content item. A user input content item may be user-selected, for example, where the content item is selected from a media library or file storage, or, for example, sourced from a third party or third-party device. User input content may also include partially or fully computer-generated content, e.g., content created through generative artificial intelligence. A content item may, for example, be content data, such as a picture, video or audio data (or combinations thereof).

The invention claimed is:

1. A method to facilitate content sharing between a first user, a second user, and a third user, the method comprising:
 receiving, from a second device of the second user, a first selection associated with a first user input content item that forms part of a first content collection, the first user input content item having been shared to the first content collection by the first user using a first device;
 in response to receiving the first selection, enabling the second device to combine the first user input content item with a second user input content item to create a combined user input content item;
 in response to determining that the second device has shared the combined user input content item to the first content collection, causing the combined user input content item to become accessible in association with the first user input content item in a second content collection;
 receiving, from a third device of the third user, a second selection associated with the first user input content item; and
 in response to receiving the second selection, causing presentation of a collection interface on the third device, the collection interface enabling the third device to navigate the second content collection.

2. The method of claim 1, wherein the combined user input content item is a first combined user input content item, the method further comprising:
 causing presentation of the first content collection on a fourth device of a fourth user;
 receiving, from the fourth device, a third selection associated with the first user input content item; and
 in response to receiving the third selection, enabling the fourth device to combine the first user input content item with a third user input content item to create a second combined user input content item.

3. The method of claim 2, further comprising:
 in response to determining that the fourth device has shared the second combined user input content item to the first content collection, causing the second combined user input content item to become accessible in association with the first user input content item in the second content collection, wherein the second content collection becomes navigable to view the first combined user input content item and the second combined user input content item.

4. The method of claim 1, further comprising:
 causing presentation of a combination graphical element within the collection interface, the combination graphical element being user-selectable to enable the third device to access a further user input content item and combine the first user input content item with the further user input content item to create a further combined user input content item.

5. The method of claim 1, wherein the second content collection comprises a plurality of visual combinatory responses to the first user input content item.

6. The method of claim 1, wherein the second content collection consists exclusively of combined user input content items created using the first user input content item as a base item.

7. The method of claim 6, wherein each combined user input content item in the second content collection was shared to the first content collection.

8. The method of claim 1, further comprising causing the combined user input content item to be shared to the first content collection.

9. The method of claim 1, further comprising causing, on the second device, presentation of a combination graphical element in conjunction with the first user input content item, the combination graphical element being user-selectable to enable the second device to combine the first user input content item with the second user input content item, and wherein the first selection comprises a selection of the combination graphical element.

10. The method of claim 1, further comprising causing, on the third device, presentation of a combination collection presentation graphical element in conjunction with the first user input content item, the combination collection presentation graphical element being user-selectable to enable the third device to access the collection interface, and wherein the second selection comprises a selection of the combination collection presentation graphical element.

11. The method of claim 1, wherein the combined user input content item comprises an attribution element, the attribution element identifying at least one of the first user or the first user input content item.

12. The method of claim 1, further comprising allowing the third device to access the combined user input content item via the second content collection.

13. The method of claim 12, wherein, in response to the third device accessing the combined user input content item, the combined user input content item is presented on the third device in conjunction with an augmentation identifier that identifies an augmentation applied to at least one of image content or video content in the combined user input content item.

14. The method of claim 13, wherein the first user input content item comprises audio content.

15. The method of claim 14, wherein the combined user input content item comprises the audio content of the first user input content item, the combined user input content item being presented on the third device in conjunction with an audio identifier that identifies the audio content.

16. The method of claim 1, wherein the first user input content item is presented on the second device in conjunction with an augmentation identifier that identifies an augmentation applied to image content or video content in the first user input content item.

17. The method of claim 1, wherein at least one of the first content collection or the second content collection is a public content collection of an interaction application provided by an interaction system.

18. The method of claim 1, further comprising:
 causing presentation of a digital image feed from at least one camera of the second device in a camera interface;
 receiving a user capture input from the second user via the camera interface; and
 in response to receiving the user capture input, capturing digital image content from the digital image feed on the second device, wherein the second user input content item includes the digital image content.

19. A system comprising:
at least one processor; and
at least one memory storing instructions that, when executed by the at least one processor, configure the system to perform operations to facilitate content sharing between a first user, a second user, and a third user, the operations comprising:
receiving, from a second device of the second user, a first selection associated with a first user input content item that forms part of a first content collection, the first user input content item having been shared to the first content collection by the first user using a first device;
in response to receiving the first selection, enabling the second device to combine the first user input content item with a second user input content item to create a combined user input content item;
in response to determining that the second device has shared the combined user input content item to the first content collection, causing the combined user input content item to become accessible in association with the first user input content item in a second content collection;
receiving, from a third device of the third user, a second selection associated with the first user input content item; and
in response to receiving the second selection, causing presentation of a collection interface on the third device, the collection interface enabling the third device to navigate the second content collection.

20. At least one non-transitory computer-readable storage medium, the at least one non-transitory computer-readable storage medium including instructions that when executed by at least one computer, cause the at least one computer to perform operations to facilitate content sharing between a first user, a second user, and a third user, the operations comprising:
receiving, from a second device of the second user, a first selection associated with a first user input content item that forms part of a first content collection, the first user input content item having been shared to the first content collection by the first user using a first device;
in response to receiving the first selection, enabling the second device to combine the first user input content item with a second user input content item to create a combined user input content item;
in response to determining that the second device has shared the combined user input content item to the first content collection, causing the combined user input content item to become accessible in association with the first user input content item in a second content collection;
receiving, from a third device of the third user, a second selection associated with the first user input content item; and
in response to receiving the second selection, causing presentation of a collection interface on the third device, the collection interface enabling the third device to navigate the second content collection.

* * * * *